(12) United States Patent
Okazaki et al.

(10) Patent No.: US 7,260,450 B2
(45) Date of Patent: Aug. 21, 2007

(54) APPARATUS AND METHOD FOR CONTROLLING ELASTIC ACTUATOR

(75) Inventors: Yasunao Okazaki, Shiga (JP); Masaki Yamamoto, Nara (JP); Yuji Adachi, Osaka (JP); Katsuhiko Asai, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/654,569

(22) Filed: Jan. 18, 2007

(65) Prior Publication Data
US 2007/0118252 A1    May 24, 2007

Related U.S. Application Data

(60) Division of application No. 11/384,568, filed on Mar. 21, 2006, now Pat. No. 7,184,858, which is a continuation of application No. PCT/JP2004/013788, filed on Sep. 22, 2004.

(30) Foreign Application Priority Data

Sep. 22, 2003   (JP)   ............... 2003-329321
Jun. 4, 2004    (JP)   ............... 2004-166688

(51) Int. Cl.
G05B 19/00     (2006.01)
G05B 19/18     (2006.01)

(52) U.S. Cl. ............. 700/254; 700/217; 700/218; 700/189; 700/190; 700/245; 700/258; 700/259; 700/260; 700/261; 700/262; 318/560; 901/15; 901/16; 901/21; 901/39; 701/23

(58) Field of Classification Search ............. 700/189, 700/190, 217, 218, 45, 245, 254, 258, 259, 700/260, 261, 262; 118/712, 715, 728; 318/560
See application file for complete search history.

(56) References Cited

U.S. PATENT DOCUMENTS

6,199,271 B1   3/2001   Hahn et al.
6,408,225 B1   6/2002   Ortmeier et al.
6,424,886 B1   7/2002   Iversen et al.

(Continued)

FOREIGN PATENT DOCUMENTS

JP        2-116308        9/1990

(Continued)

OTHER PUBLICATIONS

Pratt, Low Impedance Walking Robots, Integrative and Comparative Biology: 2002, Internet, vol. 42, No. 1 pp. 174-181.*

(Continued)

Primary Examiner—Thomas Black
Assistant Examiner—McDieunel Marc
(74) Attorney, Agent, or Firm—Wenderoth, Lind & Ponack, L.L.P.

(57) ABSTRACT

An internal pressure of a hydropneumatic drive actuator is measured by a pressure measurement device, a displacement amount of a movable mechanism is measured, a desired value and a measurement value of the displacement are inputted so that a position error is compensated by a position error compensation device, a desired value of a pressure difference of the actuator to which antagonistic driving is performed by the desired value is calculated by a desired pressure difference calculation device, outputs from the position error compensation device, the desired pressure difference calculation device, and the pressure measurement device are inputted, and a pressure difference error is compensated by pressure difference error compensation device.

7 Claims, 31 Drawing Sheets

U.S. PATENT DOCUMENTS

| | | |
|---|---|---|
| 6,532,400 B1 | 3/2003 | Jacobs |
| 6,917,176 B2 * | 7/2005 | Schempf et al. ....... 318/568.11 |
| 6,934,606 B1 | 8/2005 | Genetti et al. |
| 6,980,881 B2 * | 12/2005 | Greenwood et al. ........ 700/193 |
| 6,999,850 B2 | 2/2006 | McDonald |
| 7,184,858 B2 * | 2/2007 | Okazaki et al. ............. 700/254 |
| 2006/0207419 A1 * | 9/2006 | Okazaki et al. ................ 91/35 |

FOREIGN PATENT DOCUMENTS

| | | |
|---|---|---|
| JP | 3-3791 | 1/1991 |
| JP | 4-157203 | 5/1992 |
| JP | 7-319507 | 12/1995 |
| JP | 8-118275 | 5/1996 |
| JP | 2583272 | 2/1997 |
| JP | 3324298 | 9/2002 |

OTHER PUBLICATIONS

Gill et al., *Series Elastic Actuators*, 1995, IEEE, vol. 1, Aug. 5-9, 1995, pp. 399-406.

Robinson et al., *Series Elastic Actuator Development for a Biomimetic Walking Robot*, Sep. 19-23, 1999, pp. 561-568.

* cited by examiner

APPARATUS AND METHOD FOR CONTROLLING ELASTIC ACTUATOR

This is a divisional application of Ser. No. 11/384,568, filed Mar. 21, 2006 now U.S. Pat. No. 7,184,858, which is a continuation application of International Application No. PCT/JP2004/013788, filed Sep. 22, 2004.

BACKGROUND OF THE INVENTION

The present invention relates to elastic actuator control apparatus and method that control the operation of an elastic actuator such as a hydropneumatic drive actuator driven by deformation of an elastic body. The present invention also relates to elastic actuator drive-type movable mechanism control apparatus and method that control a movable mechanism driven by the elastic actuator.

Recently, domestic robots such as a pet robot are actively developed, and practical realization of the practical domestic robots such as a household assistance robot is expected in the future. Because it is necessary that the domestic robot go in a home to live with a human, the domestic robot differs from the conventional industrial robot and the like in the required specifications.

In the industrial robot, an electric motor and a speed reducer are used, and high hand position accuracy of repeatability of 0.1 mm or the like is realized by high-gain feedback control. However, because a mechanism driven by the electric motor often has high rigidity and poor flexibility, there are many issues from a safety standpoint.

On the other hand, the high accuracy of the repeatability of 0.1 mm or the like is not always necessary in the domestic robot, but the safety is emphasized such that the domestic robot does no injury to a human when the domestic robot comes into contact with the human. Accordingly, the electric-motor driven mechanism used in the conventional industrial robot is not suitable to the domestic-robot field in which the safety is emphasized, and the flexible and safe robot arm is required.

In order to solve the above issues, for example, there has been proposed a robot arm in which a McKibben type pneumatic actuator is utilized. In a configuration of the McKibben type pneumatic actuator, constraint means including a fiber cord is arranged in an outer surface of a tubular elastic body made of a rubber material, and both end portions of the tubular elastic body are adapted to be sealed in an air-tight manner with sealing members. When internal pressure is applied to an internal space of the tubular elastic body through fluid injection/discharge means using a compressible fluid such as air, although the tubular elastic body may try to be mainly expanded in a radial direction, the expansion is transformed into motion in a central axis direction of the tubular elastic body by action of the constraint means, which contracts a total length of the tubular elastic body. Because the McKibben type actuator is mainly formed by an elastic body, the McKibben type actuator has advantages such as the flexibility, the safety, and light weight.

However, the hydropneumatic drive actuator such as the McKibben type actuator, which is operated by the fluid pressure such as air, has an issue that generally the elastic actuator is difficult to control, for example, in the elastic actuator, the responsivity is worsened due to the elastic property generated by the fluid compressibility, the influence of the channel resistance etc., and the like.

Conventionally, in order to solve the issue, Japanese Examined Patent No. 2583272 discloses a control apparatus in which a desired track can be drawn by including a delay circuit for the robot arm driven by combination of a servomotor and a hydropneumatic drive actuator.

However, in the above control apparatus including the delay circuit, since the delay is always generated for a desired operation, responsivity is worsened and the work necessary to be processed in real time cannot be performed. The control apparatus exerts the effect only in the case of the combination of the servomotor and the fluid drive actuator, and the control apparatus cannot exert the effect in the robot arm including only the fluid drive actuator.

An object of the present invention is to resolve the foregoing issues and provide elastic actuator control apparatus and method, by which a movable mechanism such as a robot arm driven by an elastic actuator can be controlled with good responsivity and the position arid force can be controlled with high accuracy.

SUMMARY OF THE INVENTION

In order to achieve the above object, the present invention is configured as follows.

According to a first aspect of the present invention, there is provided an apparatus for controlling an elastic actuator, comprising:

an internal state measurement means for measuring an internal state of said elastic actuator, the internal state being changed by drive of said elastic actuator;

an output measurement means for measuring an output of said elastic actuator;

an output error compensation means for compensating an output error by inputting a desired value of the output of said elastic actuator and a measurement value of the output of said elastic actuator, the measurement value being measured by said output measurement means;

a desired internal state determination means for determining a desired value of the internal state of said elastic actuator from the desired value of the output of said elastic actuator and the measurement value of the output of said elastic actuator; and an internal state error compensation means for compensating an internal state error by inputting an output from said output error compensation means, an output from said desired internal state determination means, and an output from said internal state measurement means, the apparatus performing control such that the measurement value of said output of said elastic actuator becomes the desired value of said output based on said internal state error compensated by said internal state error compensation means.

According to a second aspect of the present invention, there is provided an apparatus for controlling an elastic actuator, comprising:

an internal state measurement means for measuring an internal state of said elastic actuator, the internal state being changed by drive of said elastic actuator;

an output measurement means for measuring an output of said elastic actuator;

an output error compensation means for compensating an output error by inputting a desired value of the output of said elastic actuator and a measurement value of the output of said elastic actuator, the measurement value being measured by said output measurement means;

a desired internal state determination means for determining a desired value of the internal state of said elastic actuator from the desired value of the output of said elastic actuator and the measurement value of the internal state of said elastic actuator, the measurement value being measured by said internal state measurement means; and an internal state error compensation means for compensating an internal state error by inputting an output from said output error compensation means, an output from said desired internal state determination means, and an output from said internal state measurement means, the apparatus performing control such that the measurement value of said output of said elastic actuator becomes the desired value of said output based on said internal state error compensated by said internal state error compensation means.

According to an eleventh aspect of the present invention, there is provided a method for controlling an elastic actuator, comprising:

measuring an internal state of said elastic actuator with an internal state measurement means, the internal state being changed by drive of said elastic actuator;

measuring an output of said elastic actuator with an output measurement means;

compensating an output error with an output error compensation means by inputting a desired value of the output of said elastic actuator and a measurement value of the output of said elastic actuator to the output error compensation means, the measurement value being measured by said output measurement means;

determining a desired value of the internal state of said elastic actuator from the desired value of the output of said elastic actuator with a desired internal state determination means;

compensating an internal state error with said internal state error compensation means by inputting an output from said output error compensation means, an output from said desired internal state determination means, and an output from said internal state measurement means to an internal state error compensation means; and thereby performing control such that the measurement value of said output of said elastic actuator becomes the desired value of said output of said elastic actuator.

According to a twelfth aspect of the present invention, there is provided a method for controlling an elastic actuator, comprising:

measuring an internal state of said elastic actuator with an internal state measurement means, the internal state being changed by drive of said elastic actuator;

measuring an output of said elastic actuator with an output measurement means;

compensating an output error with an output error compensation means by inputting a desired value of the output of said elastic actuator and a measurement value of the output of said elastic actuator to the output error compensation means, the measurement value being measured by said output measurement means;

determining a desired value of the internal state of said elastic actuator from the desired value of the output of said elastic actuator and the measurement value of the internal state of said elastic actuator with a desired internal state determination means;

compensating an internal state error with an internal state error compensation means by inputting an output from said output error compensation means, an output from said desired internal state determination means, and an output from said internal state measurement means to the internal state error compensation means; and thereby performing control such that the measurement value of said output of said elastic actuator becomes the desired value of said output.

With the control apparatus according to the present invention, the internal state error compensation means is arranged to form the control system in which the elastic actuator internal state changed by the driving of the elastic actuator is fed back, and the desired internal state determination means is arranged to form the control system in which the feedforward of the desired internal state is performed. Therefore, the high-speed, high-accuracy control can be performed with good responsivity and low steady-state deviation.

With the control method according to the present invention, the internal state error compensation means performs the control in which the internal state is fed back, and the desired internal state determination means performs the control in which the feedforward of the desired internal state is performed. Therefore, the high-speed, high-accuracy control can be performed with good responsivity and low steady-state deviation.

According to a thirteenth aspect of the present invention, there is provided an apparatus for controlling an elastic actuator drive-type movable mechanism of an elastic actuator, comprising:

an internal state measurement means for measuring an internal state of said elastic actuator to output a measurement value of said internal state, the internal state being changed by drive of said elastic actuator;

driving force measurement means for measuring driving force to output a measurement value of said driving force, the driving force being generated by said elastic actuator;

an output measurement means for measuring output of said movable mechanism to output a measurement value of the output, the movable mechanism being driven by said elastic actuator;

an output error compensation means to which a desired value of said output of said movable mechanism driven by said elastic actuator and the measurement value of said output measured by said output measurement means are inputted, the output error compensation means outputting output error compensation information so as to compensate an output error;

a driving force error compensation means to which an output of said output error compensation information from said output error compensation means and an output of the measurement value of said driving force from said driving force measurement means are inputted, the driving force error compensation means outputting driving force error compensation information so as to compensate a driving force error; and an internal state error compensation means to which an output of said driving force error compensation information from said driving force error compensation means and an output of the measurement value of said internal state from said internal state measurement means are inputted, the internal state error compensation means outputting internal state error compensation information so as to compensate an internal state error, wherein the apparatus performs control such that the measurement value of said output of said movable mechanism driven by said elastic actuator becomes the desired value of said output based on said internal state error compensation information outputted by said internal state error compensation means.

According to a fourteenth aspect of the present invention, there is provided an apparatus for controlling an elastic actuator drive-type movable mechanism of an elastic actuator, comprising:

an internal state measurement means for measuring an internal state of said elastic actuator to output a measurement value of said internal state, the internal state being changed by drive of said elastic actuator;

a driving force measurement means for measuring driving force to output a measurement value of said driving force, the driving force being generated by said elastic actuator;

an output measurement means for measuring output of said movable mechanism to output a measurement value of said output, the movable mechanism being driven by said elastic actuator;

an output error compensation means to which a desired value of the output of said movable mechanism driven by said elastic actuator and the measurement value of said output measured by said output measurement means are inputted, the output error compensation means outputting output error compensation information so as to compensate an output error;

a driving force error compensation means to which an output of said output error compensation information from said output error compensation means and an output of the measurement value of said driving force from said driving force measurement means are inputted, the driving force error compensation means outputting driving force error compensation information so as to compensate a driving force error;

a desired internal state determination means for determining a desired value of said internal state of said elastic actuator to output the desired value of said internal state; and an internal state error compensation means to which an output of said driving force error compensation information from said driving force error compensation means, an output of the desired value of said internal state from said desired internal state determination means, and an output of the measurement value of said internal state from said internal state measurement means are inputted, the internal state error compensation means outputting internal state error compensation information so as to compensate an internal state error, wherein the apparatus performs control such that the measurement value of said output of said movable mechanism driven by said elastic actuator becomes the desired value of said output based on said internal state error compensation information outputted by said internal state error compensation means.

According to a fifteenth aspect of the present invention, there is provided an apparatus for controlling an elastic actuator drive-type movable mechanism of an elastic actuator, comprising:

an internal state measurement means for measuring an internal state of said elastic actuator to output a measurement value of said internal state, the internal state being changed by drive of said elastic actuator;

a driving force measurement means for measuring driving force to output a measurement value of said driving force, the driving force being generated by said elastic actuator;

an output measurement means for measuring output of said movable mechanism to output a measurement value of said output, the movable mechanism being driven by said elastic actuator;

an output error compensation means to which a desired value of the output of said movable mechanism driven by said elastic actuator and the measurement value of said output measured by said output measurement means are inputted, the output error compensation means outputting output error compensation information so as to compensate an output error;

a driving force error compensation means to which an output of said output error compensation information from said output error compensation means and an output of the measurement value of said driving force from said driving force measurement means are inputted, the driving force error compensation means outputting driving force error compensation information so as to compensate a driving force error;

a desired internal state determination means for determining a desired value of said internal state of said elastic actuator to output the desired value of said internal state; and an internal state error compensation means to which an output of the desired value of said internal state from said desired internal state determination means and an output of the measurement value of said internal state from said internal state measurement means are inputted, the internal state error compensation means outputting internal state error compensation information so as to compensate an internal state error, wherein the apparatus performs control such that the measurement value of said output of said movable mechanism driven by said elastic actuator becomes the desired value of said output based on said internal state error compensation information outputted by said internal state error compensation means and said driving force error compensation information compensated by said driving force error compensation means.

According to a seventeenth aspect of the present invention, there is provided a method for controlling an elastic actuator drive-type movable mechanism of an elastic actuator, comprising:

measuring an internal state of said elastic actuator to obtain a measurement value of said internal state, the internal state being changed by drive of said elastic actuator;

measuring driving force to obtain a measurement value of said driving force, the driving force being generated by said elastic actuator;

measuring output of said movable mechanism to obtain a measurement value of said output, the movable mechanism being driven by said elastic actuator;

obtaining output error compensation information so as to compensate an output error from a desired value of said output of said elastic actuator and the measurement value of said output of said elastic actuator;

obtaining driving force error compensation information so as to compensate a driving force error from an output of said output error compensation information and an output of the measurement value of said driving force;

obtaining internal state error compensation information so as to compensate an internal state error from the output of said driving force error compensation information and the output of the measurement value of said internal state; and thereby performing control such that the measurement value of said output of said movable mechanism driven by said elastic actuator becomes the desired value of said output based on the internal state error compensation information.

According to an eighteenth aspect of the present invention, there is provided a method for controlling an elastic actuator drive-type movable mechanism of an elastic actuator, comprising:

measuring an internal state of said elastic actuator to obtain a measurement value of said internal state, the internal state being changed by drive of said elastic actuator;

measuring driving force to obtain a measurement value of said driving force, the driving force being generated by said elastic actuator;

measuring output of said movable mechanism to obtain a measurement value of said output, the movable mechanism being driven by said elastic actuator;

obtaining output error compensation information so as to compensate an output error from a desired value of the output of said movable mechanism driven by said elastic actuator and the measurement value of said measured output;

obtaining driving force error compensation information so as to compensate a driving force error from an output of said output error compensation information and an output of the measurement value of said driving force;

determining a desired value of said internal state of said elastic actuator to obtain the desired value of said internal state;

obtaining internal state error compensation information so as to compensate an internal state error from an output of said driving force error compensation information, an output of the desired value of said internal state, and an output of the measurement value of said internal state; and thereby performing control such that the measurement value of said output of said movable mechanism driven by the elastic actuator becomes the desired value of said output based on said internal state error compensation information.

According to a nineteenth aspect of the present invention, there is provided a method for controlling an elastic actuator drive-type movable mechanism of an elastic actuator, comprising:

measuring an internal state of said elastic actuator to obtain a measurement value of said internal state, the internal state being changed by drive of said elastic actuator;

measuring driving force to obtain a measurement value of said driving force, the driving force being generated by said elastic actuator;

measuring output of said movable mechanism to obtain a measurement value of said output, the movable mechanism being driven by said elastic actuator;

obtaining output error compensation information so as to compensate an output error from a desired value of the output of said movable mechanism driven by said elastic actuator and the measurement value of said output;

obtaining driving force error compensation information so as to compensate a driving force error from an output of said output error compensation information and an output of the measurement value of said driving force;

determining a desired value of said internal state of said elastic actuator to obtain the desired value of said internal state;

obtaining internal state error compensation information so as to compensate an internal state error from an output of the desired value of said internal state and an output of the measurement value of said internal state; and thereby performing control such that the measurement value of said output of said movable mechanism driven by said elastic actuator becomes the desired value of said output based on said internal state error compensation information and said driving force error compensation information.

With the control apparatus according to the thirteenth aspect of the present invention, the driving force error compensation means is arranged to form the driving force feedback control system in which the driving force generated by the elastic actuator is fed back, and the internal state error compensation means is arranged to form the internal state feedback control system in which the elastic actuator internal state changed by the driving of the elastic actuator is fed back. Therefore, the elastic actuator drive-type movable mechanism can be controlled with good responsivity, low dynamic influence, and high accuracy.

With the control apparatus according to the fourteenth aspect of the present invention, the driving force error compensation means is arranged to form the driving force feedback control system in which the driving force generated by the elastic actuator is fed back, the internal state error compensation means is arranged to form, inside the above driving force feedback control system, the internal state feedback control system in which the elastic actuator internal state changed by the driving of the elastic actuator is fed back, and the desired internal state determination means is arranged to perform the feedforward of the desired internal state. Therefore, the elastic actuator drive-type movable mechanism can be controlled with good responsivity, low dynamic influence, low steady-state deviation, and high accuracy.

With the control apparatus according to the fifteenth aspect of the present invention, the driving force error compensation means is arranged to form the driving force feedback control system in which the driving force generated by the elastic actuator is fed back, the internal state error compensation means is arranged to form the internal state feedback control system of the elastic actuator changed by the driving of the elastic actuator for the feedback of the internal state, independently of the driving force feedback control system, and the desired internal state determination means is arranged to perform the feedforward of the desired internal state. Therefore, the elastic actuator drive-type movable mechanism can be controlled with good responsivity, low dynamic influence, low steady-state deviation, and high accuracy.

With the control method according to the seventeenth aspect of the present invention, the driving force feedback control system in which the driving force generated by the elastic actuator is fed back is configured while the driving force error compensation operation is performed, and the internal state feedback control system in which the elastic actuator internal state changed by the driving of the elastic actuator is fed back is configured while the internal state error compensation operation is performed. Therefore, the elastic actuator drive-type movable mechanism can be controlled with good responsivity, low dynamic influence, and high accuracy.

With the control method according to the eighteenth aspect of the present invention, the driving force feedback control system in which the driving force generated by the elastic actuator is fed back is configured while the driving force error compensation operation is performed, the internal state feedback control system in which the elastic actuator internal state changed by the driving of the elastic actuator is fed back is configured inside the driving force feedback control system while the internal state error compensation operation is performed, and the feedforward of the desired internal state is performed while the desired internal state determination operation is performed. Therefore, the elastic actuator drive-type movable mechanism can accurately be controlled with good responsivity, low dynamic influence, low steady-state deviation, and high accuracy.

With the control method according to the nineteenth aspect of the present invention, the driving force feedback control system in which the driving force generated by the elastic actuator is fed back is configured while the driving force error compensation operation is performed, the internal state feedback control system in which the elastic actuator internal state changed by the driving of the elastic actuator is fed back is configured independently of the driving force feedback control system while the internal state error compensation operation is performed, and the feedforward of the desired internal state is performed while the desired internal state determination operation is performed. Therefore, the elastic actuator drive-type movable mechanism can accurately be controlled with good responsivity, low dynamic influence, low steady-state deviation, and high accuracy.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
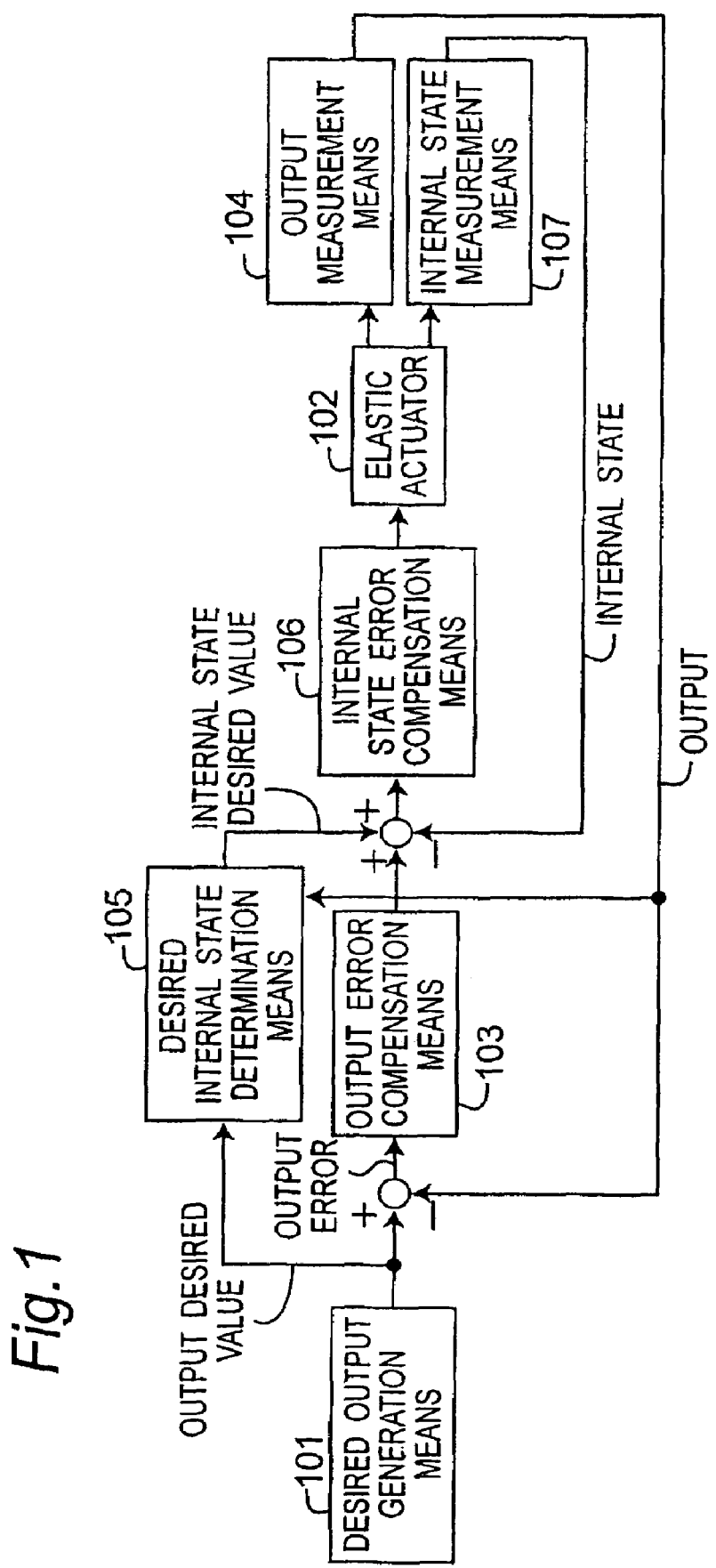
FIG. 1 is a block diagram showing a concept of an elastic actuator control apparatus according to a first embodiment of the present invention.

Before the description of the present invention proceeds, it is to be noted that like parts are designated by like reference numerals throughout the accompanying drawings.

The various aspects of the present invention will be described before embodiments according to the present invention are described.

According to a first aspect of the present invention, there is provided an apparatus for controlling an elastic actuator, comprising:
  an internal state measurement means for measuring an internal state of said elastic actuator, the internal state being changed by drive of said elastic actuator;
  an output measurement means for measuring an output of said elastic actuator;
  an output error compensation means for compensating an output error by inputting a desired value of the output of said elastic actuator and a measurement value of the output of said elastic actuator, the measurement value being measured by said output measurement means;
  a desired internal state determination means for determining a desired value of the internal state of said elastic actuator from the desired value of the output of said elastic actuator and the measurement value of the output of said elastic actuator; and
  an internal state error compensation means for compensating an internal state error by inputting an output from said output error compensation means, an output from said desired internal state determination means, and an output from said internal state measurement means,
  the apparatus performing control such that the measurement value of said output of said elastic actuator becomes the desired value of said output based on said internal state error compensated by said internal state error compensation means.

According to a second aspect of the present invention, there is provided an apparatus for controlling an elastic actuator, comprising:
  an internal state measurement means for measuring an internal state of said elastic actuator, the internal state being changed by drive of said elastic actuator;
  an output measurement means for measuring an output of said elastic actuator;
  an output error compensation means for compensating an output error by inputting a desired value of the output of said elastic actuator and a measurement value of the output of said elastic actuator, the measurement value being measured by said output measurement means;
  a desired internal state determination means for determining a desired value of the internal state of said elastic actuator from the desired value of the output of said elastic actuator and the measurement value of the internal state of said elastic actuator, the measurement value being measured by said internal state measurement means; and
  an internal state error compensation means for compensating an internal state error by inputting an output from said output error compensation means, an output from said desired internal state determination means, and an output from said internal state measurement means,
  the apparatus performing control such that the measurement value of said output of said elastic actuator becomes the desired value of said output based on said internal state error compensated by said internal state error compensation means.

According to a third aspect of the present invention, there is provided the apparatus for controlling an elastic actuator according to the first aspect, wherein said desired internal state determination means approximates a relationship between the output of the elastic actuator and the internal state of the elastic actuator using a polynomial, and calculates and determines the desired value of the internal state of said elastic actuator from the desired value of the output of said elastic actuator using said polynomial.

According to a fourth aspect of the present invention, there is provided the apparatus for controlling an elastic actuator according to the first aspect, wherein said desired internal state determination means stores the relationship between the output of said elastic actuator and the internal state of said elastic actuator in a memory in a form of a table, and determines the desired value of the internal state of said elastic actuator from the desired value of the output of said elastic actuator using said table.

According to a fifth aspect of the present invention, there is provided the apparatus for controlling an elastic actuator according to the first aspect, wherein said elastic actuator is a hydropneumatic drive actuator driven by a fluid pressure.

According to a sixth aspect of the present invention, there is provided the apparatus for controlling an elastic actuator according to the fifth aspect, wherein said hydropneumatic drive actuator is an elastic expansion/contraction structural member comprising a hollow elastic body, a set of sealing members for sealing said hollow elastic body in an air-tight manner, and a fluid passing member which enables fluid to be injected into and discharged from an hollow inside of said hollow elastic body.

According to a seventh aspect of the present invention, there is provided the apparatus for controlling an elastic actuator according to the fifth aspect, wherein the internal state of said elastic actuator is a fluid pressure, and said internal state measurement means for measuring said internal state of said elastic actuator is a pressure measurement means for measuring the fluid pressure.

According to an eighth aspect of the present invention, there is provided the apparatus for controlling an elastic actuator according to the first aspect, wherein the output of said elastic actuator is a displacement, and said output measurement means for measuring the output of said elastic actuator is a displacement measurement means for measuring the displacement.

According to a ninth aspect of the present invention, there is provided the apparatus for controlling an elastic actuator according to the first aspect, wherein the output of said elastic actuator is a displacement speed, and said output measurement means for measuring the output of said elastic actuator is a displacement speed measurement means for measuring the displacement speed.

According to a tenth aspect of the present invention, there is provided the apparatus for controlling an elastic actuator according to the first aspect, wherein the output of said elastic actuator is a force, and the output measurement means for measuring the output of said elastic actuator is a force measurement means for measuring the force.

According to an eleventh aspect of the present invention, there is provided a method for controlling an elastic actuator, comprising:
measuring an internal state of said elastic actuator with an internal state measurement means, the internal state being changed by drive of said elastic actuator;
measuring an output of said elastic actuator with an output measurement means;
compensating an output error with an output error compensation means by inputting a desired value of the output of said elastic actuator and a measurement value of the output of said elastic actuator to the output error compensation means, the measurement value being measured by said output measurement means;
determining a desired value of the internal state of said elastic actuator from the desired value of the output of said elastic actuator with a desired internal state determination means;
compensating an internal state error with said internal state error compensation means by inputting an output from said output error compensation means, an output from said desired internal state determination means, and an output from said internal state measurement means to an internal state error compensation means; and
thereby performing control such that the measurement value of said output of said elastic actuator becomes the desired value of said output of said elastic actuator.

According to a twelfth aspect of the present invention, there is provided a method for controlling an elastic actuator, comprising:
measuring an internal state of said elastic actuator with an internal state measurement means, the internal state being changed by drive of said elastic actuator;
measuring an output of said elastic actuator with an output measurement means;
compensating an output error with an output error compensation means by inputting a desired value of the output of said elastic actuator and a measurement value of the output of said elastic actuator to the output error compensation means, the measurement value being measured by said output measurement means;
determining a desired value of the internal state of said elastic actuator from the desired value of the output of said elastic actuator and the measurement value of the internal state of said elastic actuator with a desired internal state determination means;
compensating an internal state error with an internal state error compensation means by inputting an output from said output error compensation means, an output from said desired internal state determination means, and an output from said internal state measurement means to the internal state error compensation means; and
thereby performing control such that the measurement value of said output of said elastic actuator becomes the desired value of said output.

According to a thirteenth aspect of the present invention, there is provided an apparatus for controlling an elastic actuator drive-type movable mechanism of an elastic actuator, comprising:
an internal state measurement means for measuring an internal state of said elastic actuator to output a measurement value of said internal state, the internal state being changed by drive of said elastic actuator;
driving force measurement means for measuring driving force to output a measurement value of said driving force, the driving force being generated by said elastic actuator;
an output measurement means for measuring output of said movable mechanism to output a measurement value of the output, the movable mechanism being driven by said elastic actuator;
an output error compensation means to which a desired value of said output of said movable mechanism driven by said elastic actuator and the measurement value of said output measured by said output measurement means are inputted, the output error compensation means outputting output error compensation information so as to compensate an output error;
a driving force error compensation means to which an output of said output error compensation information from said output error compensation means and an output of the measurement value of said driving force from said driving force measurement means are inputted, the driving force error compensation means outputting driving force error compensation information so as to compensate a driving force error; and
an internal state error compensation means to which an output of said driving force error compensation information from said driving force error compensation means and an output of the measurement value of said internal state from said internal state measurement means are inputted, the internal state error compensation means outputting internal state error compensation information so as to compensate an internal state error,
wherein the apparatus performs control such that the measurement value of said output of said movable mechanism driven by said elastic actuator becomes the desired value of said output based on said internal state error compensation information outputted by said internal state error compensation means.

According to a fourteenth aspect of the present invention, there is provided an apparatus for controlling an elastic actuator drive-type movable mechanism of an elastic actuator, comprising:
an internal state measurement means for measuring an internal state of said elastic actuator to output a measurement value of said internal state, the internal state being changed by drive of said elastic actuator;

a driving force measurement means for measuring driving force to output a measurement value of said driving force, the driving force being generated by said elastic actuator;

an output measurement means for measuring output of said movable mechanism to output a measurement value of said output, the movable mechanism being driven by said elastic actuator;

an output error compensation means to which a desired value of the output of said movable mechanism driven by said elastic actuator and the measurement value of said output measured by said output measurement means are inputted, the output error compensation means outputting output error compensation information so as to compensate an output error;

a driving force error compensation means to which an output of said output error compensation information from said output error compensation means and an output of the measurement value of said driving force from said driving force measurement means are inputted, the driving force error compensation means outputting driving force error compensation information so as to compensate a driving force error;

a desired internal state determination means for determining a desired value of said internal state of said elastic actuator to output the desired value of said internal state; and an internal state error compensation means to which an output of said driving force error compensation information from said driving force error compensation means, an output of the desired value of said internal state from said desired internal state determination means, and an output of the measurement value of said internal state from said internal state measurement means are inputted, the internal state error compensation means outputting internal state error compensation information so as to compensate an internal state error, wherein the apparatus performs control such that the measurement value of said output of said movable mechanism driven by said elastic actuator becomes the desired value of said output based on said internal state error compensation information outputted by said internal state error compensation means.

According to a fifteenth aspect of the present invention, there is provided an apparatus for controlling an elastic actuator drive-type movable mechanism of an elastic actuator, comprising:

an internal state measurement means for measuring an internal state of said elastic actuator to output a measurement value of said internal state, the internal state being changed by drive of said elastic actuator;

a driving force measurement means for measuring driving force to output a measurement value of said driving force, the driving force being generated by said elastic actuator;

an output measurement means for measuring output of said movable mechanism to output a measurement value of said output, the movable mechanism being driven by said elastic actuator;

an output error compensation means to which a desired value of the output of said movable mechanism driven by said elastic actuator and the measurement value of said output measured by said output measurement means are inputted, the output error compensation means outputting output error compensation information so as to compensate an output error;

a driving force error compensation means to which an output of said output error compensation information from said output error compensation means and an output of the measurement value of said driving force from said driving force measurement means are inputted, the driving force error compensation means outputting driving force error compensation information so as to compensate a driving force error;

a desired internal state determination means for determining a desired value of said internal state of said elastic actuator to output the desired value of said internal state; and an internal state error compensation means to which an output of the desired value of said internal state from said desired internal state determination means and an output of the measurement value of said internal state from said internal state measurement means are inputted, the internal state error compensation means outputting internal state error compensation information so as to compensate an internal state error, wherein the apparatus performs control such that the measurement value of said output of said movable mechanism driven by said elastic actuator becomes the desired value of said output based on said internal state error compensation information outputted by said internal state error compensation means and said driving force error compensation information compensated by said driving force error compensation means.

According to a sixteenth aspect of the present invention, there is provided the apparatus for controlling an elastic actuator drive-type movable mechanism according to the fourteenth aspect, wherein the desired value of said output is inputted to said desired internal state determination means, and said desired internal state determination means determines the desired value of said internal state.

According to another aspect of the present invention, there is provided the elastic actuator drive-type movable mechanism control apparatus described in the second or third aspect, in which the desired internal state determination means approximates the relationship between the output of the elastic actuator and the internal state of the elastic actuator using a polynomial, and calculates and determines the desired value of the internal state of the elastic actuator from the output desired value of the elastic actuator using the polynomial.

According to still another aspect of the present invention, there is provided the elastic actuator drive-type movable mechanism control apparatus described in the second or third aspect, in which the desired internal state determination means further includes a memory for storing, as a table, the relationship between the output of the elastic actuator and the internal state of the elastic actuator, and determines the desired value of the internal state of the elastic actuator from the output desired value of the elastic actuator using the table.

According to yet another aspect of the present invention, there is provided the elastic actuator drive-type movable mechanism control apparatus described in any one of the first to sixteenth aspects and the above another aspects, in which the elastic actuator is a hydropneumatic drive actuator driven by fluid pressure.

According to yet another aspect of the present invention, there is provided the elastic actuator drive-type movable mechanism control apparatus described in the above another aspects, in which the hydropneumatic drive actuator has an elastic expansion/contraction structural member having a hollow elastic body, a set of sealing members for airtightsealing the hollow elastic body in an air-tight manner, and a fluid passing member enabling the fluid to be injected into or discharged from the hollow inside of the hollow elastic body.

According to yet another aspect of the present invention, there is provided the elastic actuator drive-type movable mechanism control apparatus described in the above another aspects, in which the internal state of the elastic actuator is fluid pressure, and the internal state measurement means is a pressure measurement means for measuring the fluid pressure of the elastic actuator.

According to yet another aspect of the present invention, there is provided the elastic actuator drive-type movable mechanism control apparatus described in the first, second, or third aspect, in which the output of the elastic actuator is a displacement of the elastic actuator, and the output measurement means is a displacement measurement means for measuring the displacement of the elastic actuator.

According to yet another aspect of the present invention, there is provided the elastic actuator drive-type movable mechanism control apparatus described in the first, second, or third aspect, in which the output of the elastic actuator is a displacement speed of the elastic actuator, and the output measurement means is a displacement speed measurement means for measuring the displacement speed of the elastic actuator.

According to yet another aspect of the present invention, there is provided the elastic actuator drive-type movable mechanism control apparatus described in the first, second, or third aspect, in which the output of the elastic actuator is a force of the elastic actuator, and the output measurement means is a force measurement means for measuring the force of the elastic actuator.

According to a seventeenth aspect of the present invention, there is provided a method for controlling an elastic actuator drive-type movable mechanism of an elastic actuator, comprising:
  measuring an internal state of said elastic actuator to obtain a measurement value of said internal state, the internal state being changed by drive of said elastic actuator;
  measuring driving force to obtain a measurement value of said driving force, the driving force being generated by said elastic actuator;
  measuring output of said movable mechanism to obtain a measurement value of said output, the movable mechanism being driven by said elastic actuator;
  obtaining output error compensation information so as to compensate an output error from a desired value of said output of said elastic actuator and the measurement value of said output of said elastic actuator;
  obtaining driving force error compensation information so as to compensate a driving force error from an output of said output error compensation information and an output of the measurement value of said driving force;
  obtaining internal state error compensation information so as to compensate an internal state error from the output of said driving force error compensation information and the output of the measurement value of said internal state; and
  thereby performing control such that the measurement value of said output of said movable mechanism driven by said elastic actuator becomes the desired value of said output based on the internal state error compensation information.

According to an eighteenth aspect of the present invention, there is provided a method for controlling an elastic actuator drive-type movable mechanism of an elastic actuator, comprising:
  measuring an internal state of said elastic actuator to obtain a measurement value of said internal state, the internal state being changed by drive of said elastic actuator;
  measuring driving force to obtain a measurement value of said driving force, the driving force being generated by said elastic actuator;
  measuring output of said movable mechanism to obtain a measurement value of said output, the movable mechanism being driven by said elastic actuator;
  obtaining output error compensation information so as to compensate an output error from a desired value of the output of said movable mechanism driven by said elastic actuator and the measurement value of said measured output;
  obtaining driving force error compensation information so as to compensate a driving force error from an output of said output error compensation information and an output of the measurement value of said driving force;
  determining a desired value of said internal state of said elastic actuator to obtain the desired value of said internal state;
  obtaining internal state error compensation information so as to compensate an internal state error from an output of said driving force error compensation information, an output of the desired value of said internal state, and an output of the measurement value of said internal state; and
  thereby performing control such that the measurement value of said output of said movable mechanism driven by the elastic actuator becomes the desired value of said output based on said internal state error compensation information.

According to a nineteenth aspect of the present invention, there is provided a method for controlling an elastic actuator drive-type movable mechanism of an elastic actuator, comprising:
  measuring an internal state of said elastic actuator to obtain a measurement value of said internal state, the internal state being changed by drive of said elastic actuator;
  measuring driving force to obtain a measurement value of said driving force, the driving force being generated by said elastic actuator;
  measuring output of said movable mechanism to obtain a measurement value of said output, the movable mechanism being driven by said elastic actuator;
  obtaining output error compensation information so as to compensate an output error from a desired value of the output of said movable mechanism driven by said elastic actuator and the measurement value of said output;
  obtaining driving force error compensation information so as to compensate a driving force error from an output of said output error compensation information and an output of the measurement value of said driving force;
  determining a desired value of said internal state of said elastic actuator to obtain the desired value of said internal state;
  obtaining internal state error compensation information so as to compensate an internal state error from an output of the desired value of said internal state and an output of the measurement value of said internal state; and thereby performing control such that the measurement value of said output of said movable mechanism driven by said elastic actuator becomes the desired value of said output based on said internal state error compensation information and said driving force error compensation information.

Then, embodiments according to the present invention will be described with reference to the drawings.

FIRST EMBODIMENT

FIG. 1 is a block diagram showing a concept of an elastic actuator control apparatus according to a first embodiment of the present invention. In FIG. 1, the reference numeral 101 designates a desired output generation means for generating an output desired value of an elastic actuator 102 which is a hydropneumatic drive actuator driven by fluid pressure. The reference numeral 104 designates an output measurement means connected to the elastic actuator 102. The output measurement means 104 measures the output measurement value of the elastic actuator 102 to input the measurement value to a desired internal state determination means 105 and an output error compensation means 103, respectively. The reference numeral 103 designates the output error compensation means to which the desired value is inputted from the desired output generation means 101. The output error compensation means 103 performs control such that the output measurement value of the elastic actuator 102 measured by the output measurement means 104 is caused to follow the desired value. The reference numeral 105 designates the desired internal state determination means to which the output information of the desired output generation means 101 is inputted. The desired internal state determination means 105 determines an internal state desired value which is a desired value of the internal state (for example, pressure state, charge state, or electric potential state) of the elastic actuator 102 from the output desired value and the output measurement value. The internal state can be changed by the driving of the elastic actuator 102, and does not mean a mechanical structure state which is not changed by the driving of the elastic actuator 102. The reference numeral 106 designates an internal state error compensation means. The output information from the output error compensation means 103, the internal state desired value from the desired internal state determination means 105, and an internal state measurement value from an internal state measurement means 107 are inputted to the internal state error compensation means 106. The output information is inputted to the elastic actuator 102 from the internal state error compensation means 106, and the internal state error compensation means 106 performs control such that the internal state measurement value of the elastic actuator 102 is caused to follow the desired value. The reference numeral 107 designates the internal state measurement means connected to each elastic actuator 102. The internal state measurement means 107 measures the internal state measurement value which is the internal pressure of each elastic expansion/contraction structural member 1, and inputs the internal state measurement value to the internal state error compensation means 106.

A specific example of the apparatus for controlling the elastic actuator 102 according to the first embodiment will be described below while a robot arm 10 is taken as an example of the control object.

Figure 2:
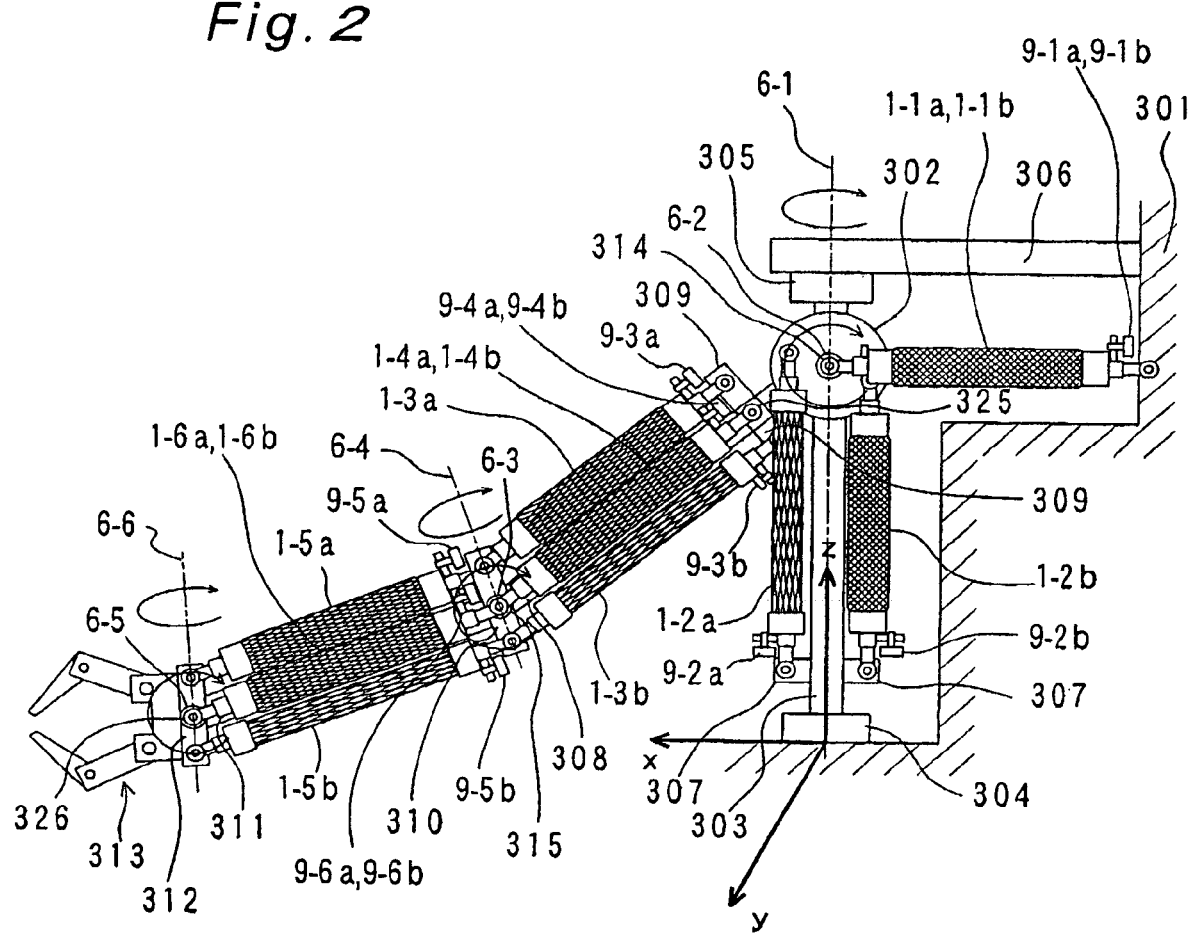
FIG. 2 is a view showing a structure of a robot arm which is a control object of the elastic actuator control apparatus according to the first embodiment of the present invention.
Figure 3:
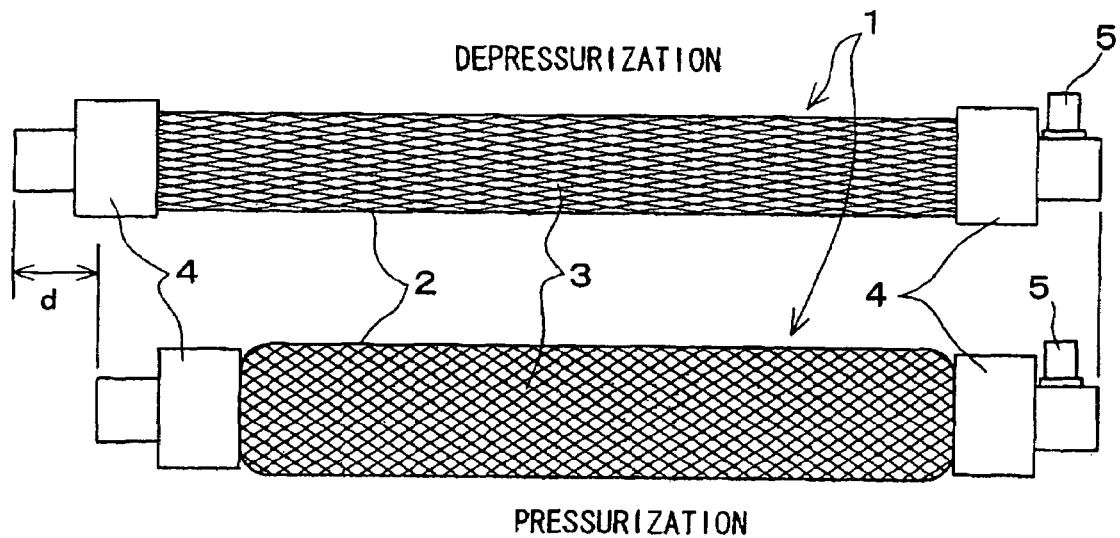
FIG. 3 is a view showing a structure and operation of an elastic expansion/contraction structural member for driving the robot arm which is the control object of the elastic actuator control apparatus according to the first embodiment of the present invention.

FIG. 2 is a view showing a configuration of the robot arm 10 which is a control object of the apparatus for controlling the elastic actuator 102 according to the first embodiment of the present invention. In FIG. 2, the reference numerals 1-1a, 1-1b, 1-2a, 1-2b, 1-3a, 1-3b, 1-4a, 1-4b, 1-5a, 1-5b, 1-6a, and 1-6b (these are the reference numerals for individual elastic expansion/contraction structural member, and reference numeral 1 is used when the elastic expansion/contraction structural member is representatively indicated) designate an elastic expansion/contraction structural member. As shown in FIG. 3, in the structure of the elastic expansion/contraction structural member 1, a deformation direction regulating member 3 is arranged in an outer surface of a tubular, hollow elastic body 2 which is made of a rubber material to function as a driving portion, and both end portions of the tubular elastic body 2 are sealed in an air-tight manner with sealing members 4. The deformation direction regulating member 3 is formed in a mesh shape by weaving resin or metal fiber cords which material is difficult to stretch. In the deformation direction regulating member 3, while the deformation in a radial direction thereof caused by the expansion of the tubular elastic body 2 is transformed into the length contraction in an axial direction thereof, the deformation in the radial direction caused by the contraction of the tubular elastic body 2 is transformed into the length expansion in the axial direction. A compressible fluid such as air is supplied to the elastic expansion/contraction structural member 1 through a tubular fluid passing member 5. The tubular fluid passing member 5 has a fluid channel through which the compressible fluid passes, and enables the fluid to be injected into or discharged from the hollow inside of the elastic body 2. When internal pressure is applied to an inside space of the tubular elastic body 2 by the supplied compressible fluid, the tubular elastic body 2 may try to be mainly expanded in the radial direction. However, the internal pressure of the tubular elastic body 2 is transformed into motion in a central axis direction of the tubular elastic body 2 by action of the deformation direction regulating member 3, which contract a total length of the tubular elastic body 2. Therefore, the elastic expansion/contraction structural member 1 having the above structure can be utilized as the direct driving elastic actuator 102.

In the robot arm 10 of FIG. 2, a set of elastic expansion/contraction structural members 1 and 1 is arranged so as to face each other while a joint axis serves as a fulcrum, and an antagonistic type driving structure is formed. In the antagonistic type driving structure, when one of the set of elastic expansion/contraction structural members 1 and 1 is contracted while the other elastic expansion/contraction structural member 1 is expanded, the force is applied through the fulcrum to perform the joint axis rotation, which allows normal and reverse rotation movements to be realized at the joint axis. Specifically, normal and reverse rotations at a first joint axis 6-1 are performed by antagonistic driving of the elastic expansion/contraction structural member 1-1a and the elastic expansion/contraction structural member 1-1b (the elastic expansion/contraction structural member 1-1b is not shown because elastic expansion/contraction structural member 1-1b is located at the back of elastic expansion/contraction structural member 1-1a), normal and reverse rotations at a second joint axis 6-2 are performed by the antagonistic driving of the elastic expansion/contraction structural member 1-2a and the elastic expansion/contraction structural member 1-2b, normal and reverse rotations at a third joint axis 6-3 are performed by the antagonistic driving of the elastic expansion/contraction structural member 1-3a and the elastic expansion/contraction structural member 1-3b, normal and reverse rotations at a fourth joint axis 6-4 are performed by the antagonistic driving of the elastic expansion/contraction structural member 1-4a and the elastic expansion/contraction structural member 1-4b, normal and reverse rotations at a fifth joint axis 6-5 are performed by the antagonistic driving of the elastic expansion/contraction structural member 1-5a and the elastic expansion/contraction structural member 1-5b, and normal and reverse rotations at a sixth joint axis 6-6 are performed by the antagonistic driving of the elastic expansion/contraction structural member 1-6a and the elastic expansion/contraction structural member 1-6b.

The reference numerals 9-1a, 9-1b, 9-2a, 9-2b, 9-3a, 9-3b, 9-4a, 9-4b, 9-5a, 9-5b, 9-6a, and 9-6b of FIG. 2 designate pressure sensors which are an example of the internal state measurement means of each of the elastic expansion/contraction structural members 1-1a, 1-1b, 1-2a, 1-2b, 1-3a, 1-3b, 1-4a, 1-4b, 1-5a, 1-5b, 1-6a, and 1-6b. The pressure sensors 9-1a, 9-1b, 9-2a, 9-2b, 9-3a, 9-3b, 9-4a, 9-4b, 9-5a, 9-5b, 9-6a, and 9-6b are arranged in the fluid passing members 5 (fluid injection/discharge ports) to measure the pressures in the elastic expansion/contraction structural members, respectively.

For details, the robot arm 10 is a robot arm having six degrees of freedom, and includes the first joint axis 6-1, the second joint axis 6-2, the third joint axis 6-3, the fourth joint axis 6-4, the fifth joint axis 6-5, and the sixth joint axis 6-6. At the first joint axis 6-1, normal and reverse rotations are performed along a vertical axis and in a plane along a transverse direction with respect to a fixed wall 301. At the second joint axis 6-2, normal and reverse rotations are performed in the plane along a vertical direction with respect to the fixed wall 301. At the third joint axis 6-3, mutually normal and reverse rotations are performed in the plane along the vertical direction between a second arm 308 and a first arm 311 with respect to the fixed wall 301. At the fourth joint axis 6-4, normal and reverse rotations are performed in an axial direction orthogonal to the third joint axis 6-3 between the second arm 308 and the first arm 311 with respect to the fixed wall 301. At the fifth joint axis 6-5, mutually normal and reverse rotations are performed in the plane along the vertical direction between the first arm 311 and a hand 313 with respect to the fixed wall 301. At the sixth joint axis 6-6, normal and reverse rotations are performed in the axial direction orthogonal to the fifth joint axis 6-5 between the first arm 311 and the hand 313 with respect to the fixed wall 301.

In the first joint axis 6-1, circular supports 302 and 302 are rotatably coupled to both sides of the rotation shaft 303 whose upper and lower end portions are rotatably supported in the vertical direction by bearings 304 and 305, and each one end portion of the elastic expansion/contraction structural members 1-1a and 1-1b (however, the elastic expansion/contraction structural member 1-1b is not shown because the elastic expansion/contraction structural member 1-1b is arranged at the back of the elastic expansion/contraction structural member 1-1a) is coupled to the fixed wall 301 while the other end portion of each of the elastic expansion/contraction structural members 1-1a and 1-1b is coupled to a support shaft 314 of each circular support 302. Therefore, the antagonistic driving of the elastic expansion/contraction structural members 1-1a and 1-1b enables the first arm 311, second arm 308, and hand 313 of the robot arm to be integrally normally and reversely rotated in the plane along the transverse direction about a vertical axis Z of the rotation shaft 303 of the first joint axis 6-1. The upper-side bearing 305 is supported to the fixed wall 301 by a support rod 306.

In the second joint axis 6-2, the elastic expansion/contraction structural members 1-2a and 1-2b are coupled between the two circular supports 302 and 302 fixed onto the both sides of the rotation shaft 303 and supports 307 and 307, which are fixed onto the side of the fixed wall 301 of the rotation shaft 303 while being orthogonal to the longitudinal direction of the rotation shaft 303, respectively, and the antagonistic driving of the elastic expansion/contraction structural members 1-2a and 1-2b enables the first arm 311, second arm 308, and hand 313 of the robot arm 10 to be integrally normally and reversely rotated in the plane along the vertical direction about the transverse axis of the support shaft 314 of the second joint axis 6-2.

In the third joint axis 6-3, supports 309 and 309 are fixed onto the side of the circular support 302 of a second arm link 308 whose one end is fixed to the two circular supports 302 and 302 while the supports 309 and 309 are orthogonal to the longitudinal direction of the second arm link 308, and a support 310 is rotatably coupled to one end of a first arm link 311 on the front end side of the second arm link 308 while being orthogonal to the longitudinal direction of the first arm link 311. The elastic expansion/contraction structural members 1-3a and 1-3b are coupled between the supports 309 and 309 of the second arm link 308 and the support 310 fixed onto one end of the first arm link 311, respectively, and the antagonistic driving of the elastic expansion/contraction structural members 1-3a and 1-3b enables the first arm 311 and the second arm 308 of the robot arm 10 to be relatively normally and reversely rotated in the plane along the vertical direction about the transverse shaft of a support shaft 315 of the third joint axis 6-3.

In the fourth joint axis 6-4, supports 325 and 325 are fixed onto the side of the circular support 302 of the second arm link 308 whose one end is fixed to the two circular supports 302 and 302 while the supports 325 and 325 are orthogonal to the longitudinal directions of the supports 309 and 309 and second arm link 308, and the elastic expansion/contraction structural members 1-4a and 1-4b are coupled between the supports 325 and 325 and the support 310 fixed to one end of the first arm link 311 respectively. Therefore, the antagonistic driving of the elastic expansion/contraction structural members 1-4a and 1-4b enables the first arm 311 and second arm 308 of the robot arm 10 to be relatively normally and reversely rotated about the fourth joint axis 6-4 orthogonal to the third joint axis 6-3.

In the fifth joint axis 6-5, the elastic expansion/contraction structural members 1-5a and 1-5b are coupled between the support 310 of the first arm 311 and the support 312 which is fixed to one end of the hand 313 while rotatably coupled to the first arm 311, and the antagonistic driving of the elastic expansion/contraction structural members 1-5a and 1-5b enables the hand 313 to be normally and reversely rotated with respect to the first arm 311 in the plane along the vertical direction about the transverse axis of a support shaft 326 of the fifth joint axis 6-5.

In the sixth joint axis 6-6, the elastic expansion/contraction structural members 1-6a and 1-6b are coupled between the support 310 of the first arm 311 and the support 312, which is fixed to one end of the hand 313 and rotatably coupled to the first arm 311, while the elastic expansion/contraction structural members 1-6a and 1-6b differ from the elastic expansion/contraction structural members 1-5a and 1-5b in a phase by 90 degrees. Therefore, the antagonistic driving of the elastic expansion/contraction structural members 1-6a and 1-6b enables the hand 313 to be normally and reversely rotated with respect to the first arm 311 about the fifth joint axis 6-6 orthogonal to the fifth joint axis 6-5.

As described later, a flow proportional solenoid valve 18 is connected to each of the elastic expansion/contraction structural members 1-1a and 1-1b, the elastic expansion/ contraction structural member 1-2a and 1-2b, the elastic expansion/contraction structural members 1-3a and 1-3b, the elastic expansion/contraction structural members 1-4a and 1-4b, the elastic expansion/contraction structural members 1-5a and 1-5b and the elastic expansion/contraction structural members 1-6a and 1-6b, and all the flow proportional solenoid valves 18 are connected to a control computer 19. The control computer 19 controls the contraction/expansion operations of each of the elastic expansion/contraction structural members 1-1a and 1-1b, the elastic expansion/contraction structural members 1-2a and 1-2b, the elastic expansion/contraction structural members 1-3a and 1-3b, the elastic expansion/contraction structural members 1-4a and 1-4b, the elastic expansion/contraction structural members 1-5a and 1-5b, and the elastic expansion/contraction structural members 1-6a and 1-6b through the flow proportional solenoid valves 18. An encoder 8 is arranged for each joint axis. The encoder 8 is an example of a displacement measurement means which is an example of the output measurement means. A joint angle of the joint axis can be measured by the encoder 8. A pressure sensor 9 is arranged in each elastic expansion/contraction structural member 1. The pressure sensor 9 is an example of a pressure measurement means which is an example of the internal state measurement means 107. The internal pressure of each elastic expansion/contraction structural member 1 can be measured by the pressure sensor 9. According to the above structure, basic functions of the robot arm 10 such as grasp and carry of an object can be realized by utilizing the multi degrees of freedom.

Figure 4:
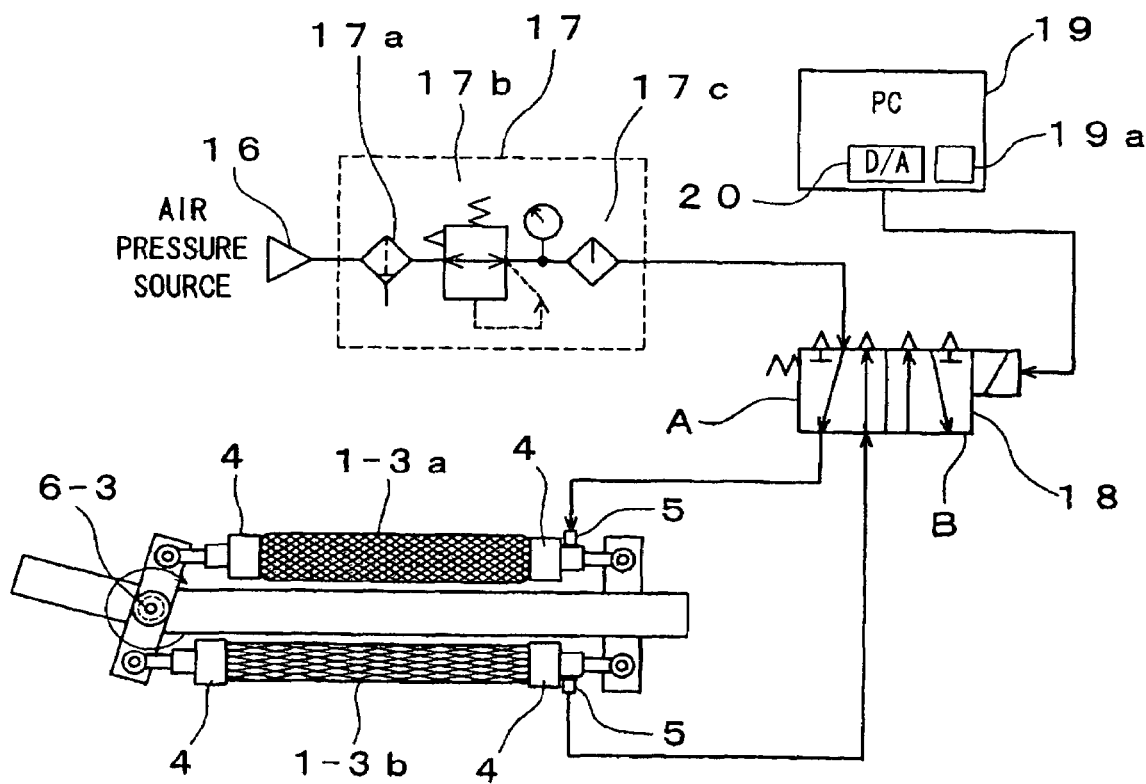
FIG. 4 is a view showing operation of a pneumatic supply system for driving the robot arm which is the control object of the elastic actuator control apparatus according to the first embodiment of the present invention using air which is a compressible fluid.

FIG. 4 is a view showing a configuration of a pneumatic supply system for driving the robot arm 10 which is the control object of the elastic actuator control apparatus according to the first embodiment of the present invention. FIG. 4 shows only the driving section which normally and reversely rotates the third joint axis of the robot arm 10, and other sections are omitted. In FIG. 4, the reference numeral 16 designates an air pressure source such as a compressor, and the reference numeral 17 designates a pneumatic adjustment unit in which a pneumatic filter 17a, a pneumatic regulator 17b, and a pneumatic lubricator 17c are grouped. The reference numeral 18 designates a five-port flow rate control solenoid valve which controls a flow rate by, e.g., driving a spool valve with force of an electromagnet. The reference numeral 19 designates a control computer which is an example of the control unit formed by, e.g., a general-purpose personal computer, and a D/A board 20 is mounted on the control computer 19. Each flow rate of air passing through the fluid passing member 5 can independently be controlled by outputting a voltage instruction value to the five-port flow rate control solenoid valve 18. A memory 19a in which an operation program of the robot arm 10 and the like are previously stored is also mounted on the control computer 19.

Then, the operation of the pneumatic supply system shown in FIG. 4 will be described. The high-pressure air generated by the air pressure source 16 is depressurized by the pneumatic adjustment unit 17 and adjusted to a constant pressure of, e.g., 600 kPa, and the air is supplied to the five-port flow rate control solenoid valve 18. An opening degree of the five-port flow rate control solenoid valve 18 is controlled in proportion to the voltage instruction value outputted from the control computer 19 through the D/A board 20. When the positive voltage instruction value is inputted from the control computer 19 to the five-port flow rate control solenoid valve 18, the opening becomes the state shown by A of a pneumatic circuit sign in which a channel is opened from the side of the air pressure source 16 to the side of the elastic expansion/contraction structural member 1-3a to supply the air having the flow rate proportional to an absolute value of the voltage instruction value to the side of the elastic expansion/contraction structural member 1-3a. A channel is opened to atmospheric pressure on the side of the elastic expansion/contraction structural member 1-3b, and the air flow having the flow rate proportional to the absolute value of the voltage instruction value is exhausted from the side of the elastic expansion/contraction structural member 1-3b into atmosphere. Accordingly, as shown in FIG. 4, the total length of the elastic expansion/contraction structural member 1-3a is contracted and the total length of the elastic expansion/contraction structural member 1-3b is expanded, which allows clockwise rotation to be performed at the third joint axis 6-3 at speed proportional to the absolute value of the voltage instruction value. On the other hand, when the negative voltage instruction value is inputted from the control computer 19 to the five-port flow rate control solenoid valve 18, the opening becomes the state shown by B of the pneumatic circuit sign, and the elastic expansion/contraction structural members are reversely operated. That is, the total length of the elastic expansion/contraction structural member 1-3a is expanded and the total length of the elastic expansion/contraction structural member 1-3b is contracted, which allows counterclockwise rotation to be performed at the third joint axis 6-3.

The air flow supplied from the five-port flow rate control solenoid valve 18 to the side of the elastic expansion/contraction structural member 1 passes through the sealing member 4 through the fluid passing member 5, and the air flow reaches the inside of the tubular elastic body 2 to create the internal pressure in the tubular elastic body 2. The tubular elastic body 2 is expanded by the created internal pressure. However, the deformation in the radial direction by the expansion is regulated and transformed into the length contraction in the axial direction by the constraint action (regulating action) of the fiber cords woven in the mesh shape in the deformation direction regulating member 3, and the total length of the elastic expansion/contraction structural member 1 is shortened as shown in the lower portion of FIG. 3. On the other hand, when the air is exhausted into the atmosphere from the five-port flow rate control solenoid valve 18 to reduce the internal pressure of the tubular elastic body 2, the elastic expansion/contraction structural member 1 is recovered to eliminate the expansion by the elastic force of the tubular elastic body 2, and thus, the total length of the elastic expansion/contraction structural member 1 is increased as shown in the upper portion of FIG. 3. As a result, assuming that the tubular elastic body 2 is fixed at the right end in FIG. 3, a difference of a distance d is generated at the left end of the tubular elastic body 2 by the contraction and expansion. Accordingly, the elastic expansion/contraction structural member 1 of the first embodiment can be caused to function as the direct-driving displacement actuator by controlling the air pressure supply. Amounts of contraction and expansion are substantially proportional to the internal pressure of the elastic expansion/contraction structural member 1. Therefore, when the control computer 19 controls the five-port flow rate control solenoid valve 18 to regulate the air flow rate supplied to the elastic expansion/contraction structural member 1 as sown in FIG. 4, the total length of the elastic expansion/contraction structural member 1 can be controlled.

Figure 5:
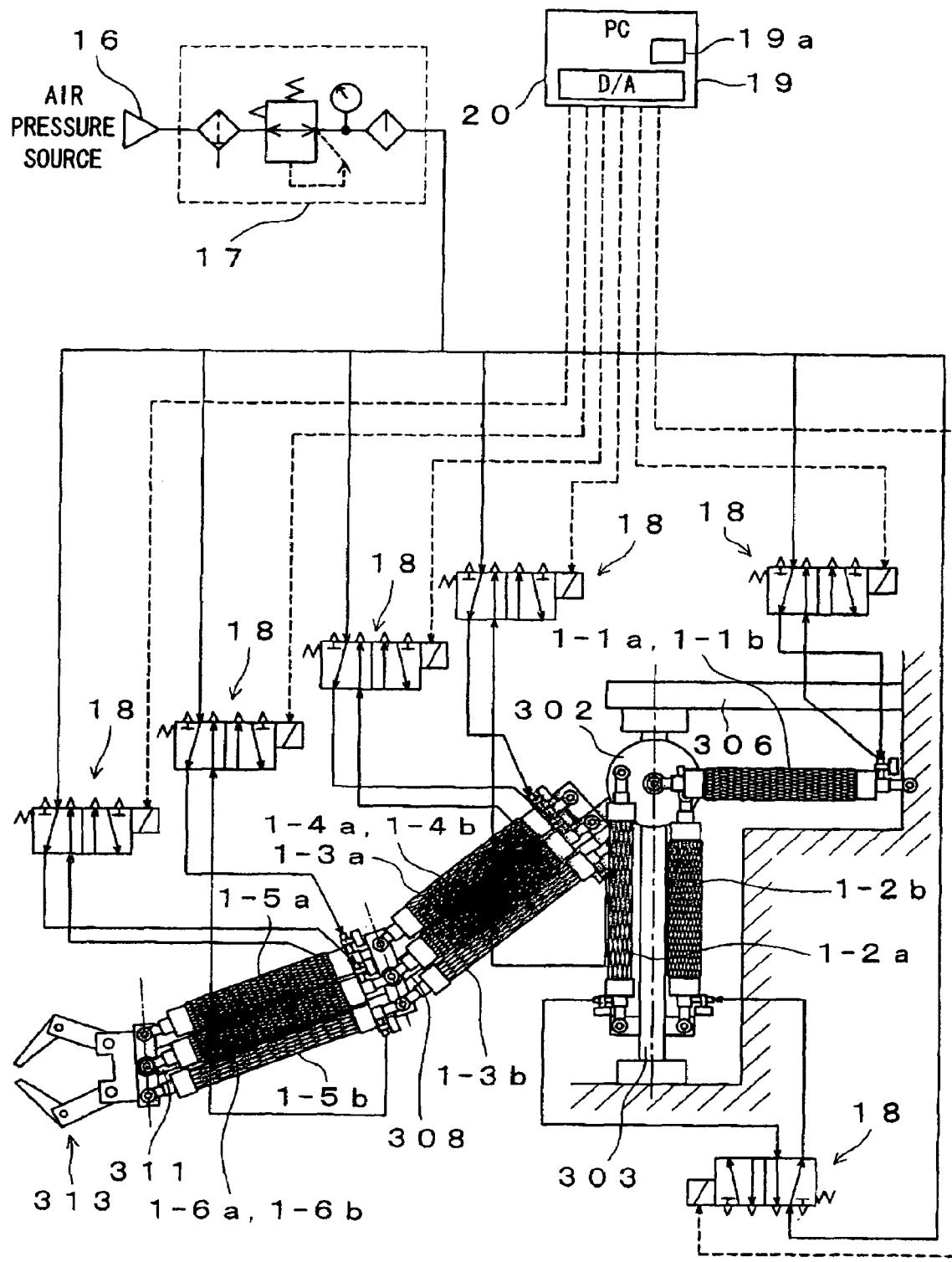
FIG. 5 is a view showing a configuration of the pneumatic supply system for driving the robot arm which is the control object of the elastic actuator control apparatus according to the first embodiment of the present invention using air which is the compressible fluid.

In the robot arm 10 shown in FIG. 2, due to the antagonistic driving of the elastic expansion/contraction structural members 1-1*a* and 1-1*b*, the antagonistic driving of the elastic expansion/contraction structural members 1-2*a* and 1-2*b*, the antagonistic driving of the elastic expansion/contraction structural members 1-3*a* and 1-3*b*, the antagonistic driving of the elastic expansion/contraction structural members 1-4*a* and 1-4*b*, the antagonistic driving of the elastic expansion/contraction structural members 1-5*a* and 1-5*b*, and the antagonistic driving of the elastic expansion/contraction structural members 1-6*a* and 1-6*b*, as shown in FIG. 5, the five-port flow rate control solenoid valve 18 is arranged for each of the antagonistic elastic expansion/contraction structural members 1 to configure the similar pneumatic supply system. Therefore, normal and reverse rotation at all the joint axes of the robot arm 10 can be performed at the same time by the voltage instruction values outputted from the control computer 19 to the five-port flow rate control solenoid valve 18 through the D/A board 20.

Figure 6:
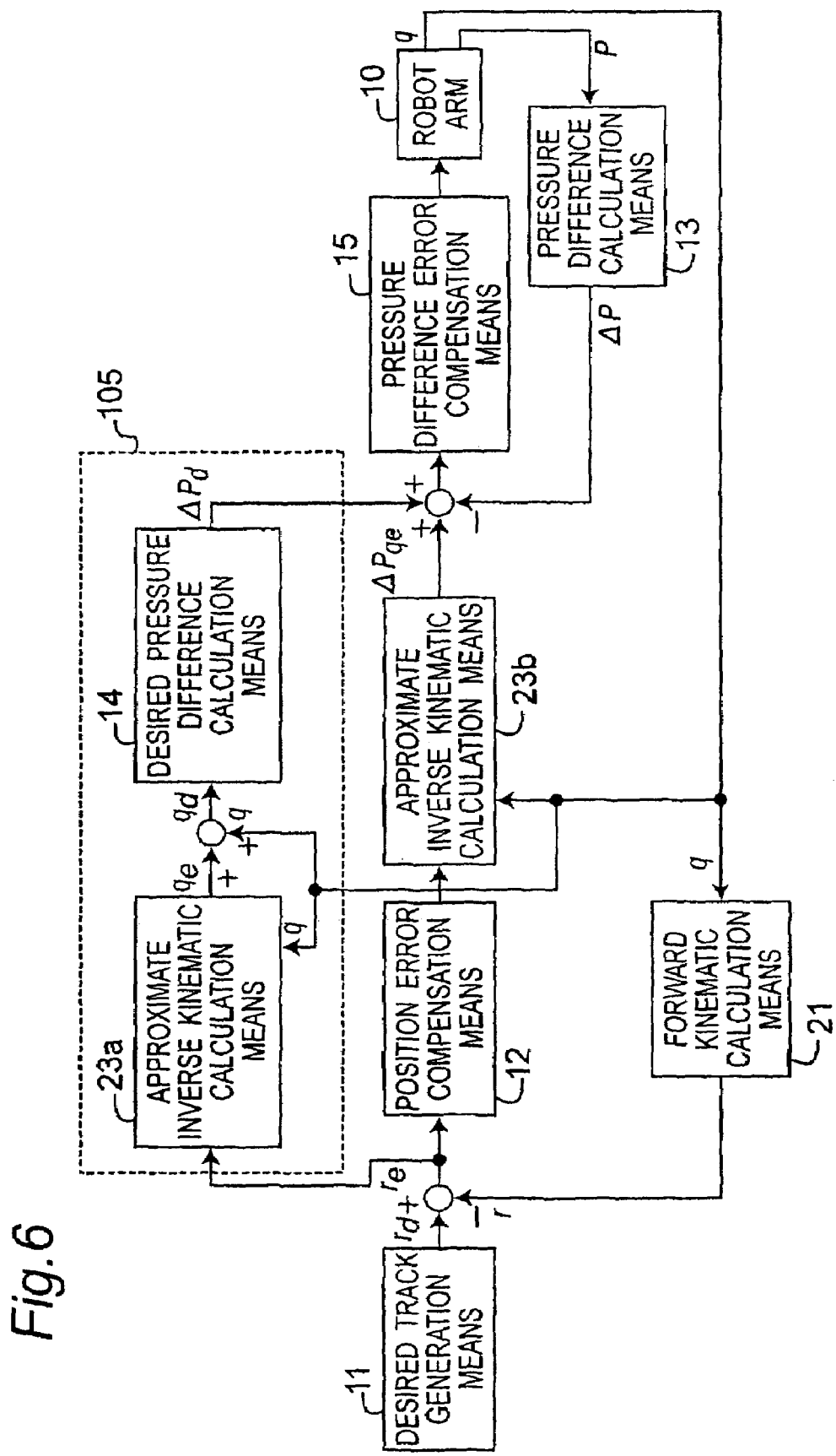
FIG. 6 is a view showing a structure of the elastic actuator control apparatus according to the first embodiment of the present invention.

FIG. 6 is a view showing a configuration of the elastic actuator control apparatus according to the first embodiment of the present invention. However, in FIG. 6, the reference numeral 10 designates the robot arm, shown in FIG. 2, which is the control object of the elastic actuator control apparatus. The robot arm 10 outputs a current joint angle value (joint angle vector) $q=[q_1,q_2,q_3,q_4,q_5,q_6]^T$ measured by the encoders 8 for the joint axes and an internal pressure $P=[P_{1a},P_{1b},P_{2a},P_{2b},P_{3a},P_{3b},P_{4a},P_{4b},P_{5a},P_{5b},P_{6a},P_{6b}]^T$ of the elastic expansion/contraction structural members 1 measured by the pressure sensors 9 of the respective elastic expansion/contraction structural members 1. Herein, $q_1, q_2, q_3, q_4, q_5$, and $q_6$ are the joint angles of the first joint axis 6-1, second joint axis 6-2, third joint axis 6-3, fourth joint axis 6-4, fifth joint axis 6-5, and sixth joint axis 6-6, respectively, and $P_{1a}$, $P_{1b}$, $P_{2a}$, $P_{2b}$, $P_{3a}$, $P_{3b}$, $P_{4a}$, $P_{4b}$, $P_{5a}$, $P_{5b}$, $P_{6a}$, and $P_{6b}$ are the internal pressures of the elastic expansion/contraction structural members 1-1*a*, 1-1*b*, 1-2*a*, 1-2*b*, 1-3*a*, 1-3*b*, 1-4*a*, 1-4*b*, 1-5*a*, 1-5*b*, 1-6*a*, and 1-6*b*.

The reference numeral 13 designates a pressure difference calculation means to which the internal pressure P, i.e., the measurement value P of the elastic expansion/contraction structural member 1 outputted from the robot arm 10 is inputted. The measurement value P is measured by the pressure sensor 9. The pressure difference calculation means 13 calculates a pressure difference $\Delta P=[\Delta P_1,\Delta P_2,\Delta P_3,\Delta P_4,\Delta P_5,\Delta P_6]^T=[P_{1a}-P_{1b},P_{2a}-P_{2b},P_{3a}-P_{3b},P_{4a}-P_{4b},P_{5a}-P_{5b},P_{6a}-P_{6b}]^T$ using the measurement value P of the pressure sensor 9, and the pressure difference calculation means 13 outputs the pressure difference $\Delta P$.

The reference numeral 21 designates a forward kinematic calculation means to which the joint angle vector q is inputted. The joint angle vector q is the current joint angle value q, which is measured by the encoder 8 of each joint axis and outputted from the robot arm 10. The forward kinematic calculation means 21 performs geometric calculation of the transformation from the joint angle vector q of the robot arm 10 into a hand position/orientation vector r.

The reference numerals 23*a* and 23*b* designate approximate inverse kinematic calculation means for performing approximate calculation of the inverse kinematics using an approximate equation of $u_{out}=J_r(q)^{-1}u_{in}$. Herein, $J_r(q)$ is a Jacobian matrix, $u_{in}$ is an input to the approximate inverse kinematic calculation means 23*a* and 23*b*, and $u_{out}$ is an output from the approximate inverse kinematic calculation means 23*a* and 23*b*. Assuming that the input $u_{in}$ is a joint angle error $q_e$, the approximate equation of $u_{out}=J_r(q)^{-1}u_{in}$ becomes a transformation equation from a hand position/orientation error $r_e$ into the joint angle error $q_e$ like $q_e=J_r(q)^{-1}r_e$. The approximate inverse kinematic calculation means 23*a* and 23*b* can easily perform the inverse kinematic calculation even in structure, such as the robot arm having the multi degrees of freedom of six or more degrees of freedom, in which the inverse kinematic calculation is difficult to perform.

In the approximate inverse kinematic calculation means 23*a*, the error $r_e$ between the current value q of a joint angle vector measured in the robot arm 10 and a hand position/orientation-desired vector $r_d$ outputted from a desired track generation means 11 is inputted, and the error $q_e$ of the joint angle vector is outputted.

In the approximate inverse kinematic calculation means 23*b*, the current value q of the joint angle vector measured in the robot arm 10 and position error correction output $\Delta P_{re}$ from the position error compensation means 12 are inputted, and a joint error correction output $\Delta P_{qe}$ is outputted.

The reference numeral 11 designates the desired track generation means for outputting the hand position/orientation-desired vector $r_d$ in order to realize the desired operation of the robot arm 10.

The reference numeral 12 designates the position error compensation means which is an example of the output error compensation means 103. The error $r_e$ between the hand position/orientation vector r and the hand position/orientation-desired vector $r_d$ is inputted to the position error compensation means 12, and the position error compensation means 12 outputs the position error correction output $\Delta P_{re}$ to the approximate inverse kinematic calculation means 23*b*. The hand position/orientation vector r is calculated from the joint angle vector current value q, measured in the robot arm 10, by the forward kinematic calculation means 21. The hand position/orientation-desired vector $r_d$ is outputted from desired track generation means 11.

As one example, the desired internal state determination means 105 includes a desired pressure difference calculation means 14 and the approximate inverse kinematic calculation means 23*a*. $q_d=q+J_r(q)^{-1}r_e$ is inputted to the desired pressure difference calculation means 14. $q_d=q+J_r(q)^{-1}r_e$ is treated as the desired joint angle vector $q_d$ based on the joint angle vector current value q measured in the robot arm 10 and the error $q_e$ of the joint angle vector. The desired internal state determination means 105 calculates a desired pressure difference (desired value of pressure difference) $\Delta P^d=[\Delta P_{1d},\Delta P_{2d},\Delta P_{3d},\Delta P_{4d},\Delta P_{5d},\Delta P_{6d}]^T$ from the desired joint angle vector $q_d$ to output the desired pressure difference $\Delta P_d$ to pressure difference error compensation means 15. Herein, $\Delta P_{1d}$, $\Delta P_{2d}$, $\Delta P_{3d}$, $\Delta P_{4d}$, $\Delta P_{5d}$, and $\Delta P_{6d}$ are the desired values of the pressure differences between the elastic expansion/contraction structural members 1-1*a* and 1-1*b*, the elastic expansion/contraction structural members 1-2*a* and 1-2*b*, the elastic expansion/contraction structural members 1-3*a* and 1-3*b*, the elastic expansion/contraction structural members 1-4*a* and 1-4*b*, the elastic expansion/contraction structural members 1-5*a* and 1-5*b*, and the elastic expansion/contraction structural members 1-6*a* and 1-6*b*.

The reference numeral 15 designates the pressure difference error compensation means which is an example of the internal state error correction means 106. A value, in which the desired pressure difference $\Delta P_d$ is added to joint error correction output $\Delta P_{qe}$ and the current pressure difference $\Delta P$ from the pressure difference calculation means 13 is subtracted, is inputted to the pressure difference error compensation means 15. The desired pressure difference $\Delta P_d$ is outputted from the desired pressure difference calculation means 14. The joint error correction output $\Delta P_{qe}$ is outputted from the position error compensation means 12 and transformed by the approximate inverse kinematic calculation means. The pressure difference error compensation means 15 outputs the pressure difference correction output u to the robot arm 10. The pressure difference correction output u is applied in the form of the voltage instruction value to the five-port flow rate control solenoid valve 18 through the D/A board 20, and normal and reverse rotations are performed at each joint axis 6 to operate the robot arm 10.

An operation principle concerning the control apparatus having the above configuration will be described below.

The basic of the operation is feedback control (position control) of the hand position/orientation error re performed by the position error compensation means 12. For example, when a PID compensator is used as the position error compensation means 12, the control is performed such that the hand position/orientation error $r_e$ is converged to zero, and thereby the desired operation of the robot arm 10 is realized.

However, when the robot arm 10 is driven by the elastic actuator such as the actuator operated by the fluid of air or the like as shown in FIG. 2 as an example, responsivity is worsened due to elastic factors of the elastic actuator, namely, due to the fluid compressibility and influence of channel resistance, and the control cannot accurately be performed only by the position control.

Means for resolving the issue is the feedback control of the pressure difference $\Delta P$ performed by the pressure difference error compensation means 15. Since the joint error correction output $\Delta P_{qe}$ is inputted to the pressure difference error compensation means 15, when the hand position/orientation error $r_e$ is generated, the pressure difference error compensation means 15 is operated to perform the control of the pressure difference such that the hand position/orientation error $r_e$ is converged to zero. In the elastic expansion/contraction structural member 1 shown in FIG. 3, because the displacement is generated after the internal pressure is changed, the pressure change is observed earlier than the change in position (displacement) in terms of time. Accordingly, like the control system shown in FIG. 6, an internal pressure feedback loop for controlling the pressure difference is configured inside a position feedback loop for performing the position control, which allows the poor responsivity to be compensated to realize the improvement of position control performance.

Although the responsivity is improved only by providing the pressure difference error compensation means 15, the issue that positioning accuracy cannot be improved due to the generation of position steady-state deviation still remains. This is attributed to the fact that the pressure difference necessary to realize the desired joint angle vector $q_d$ is not inputted to the pressure difference error compensation means 15 as the desired value.

Figure 7:
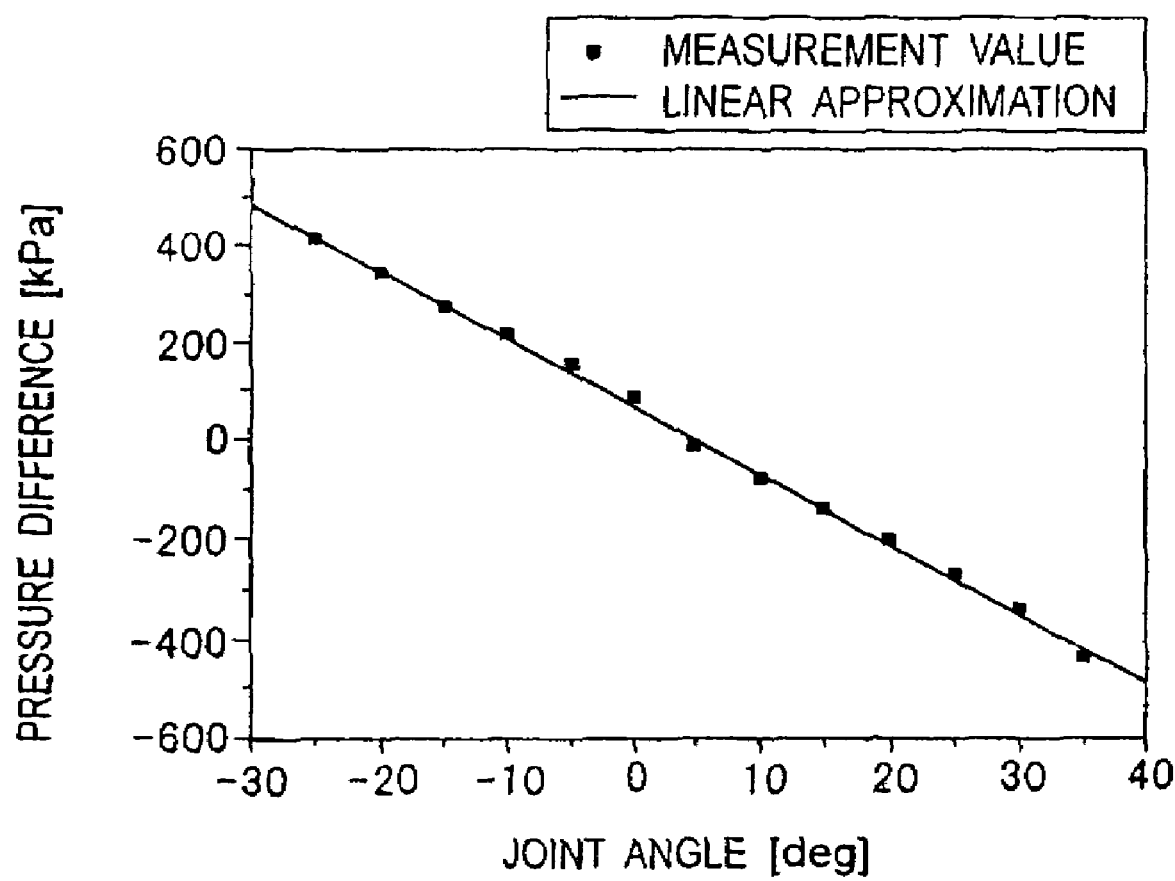
FIG. 7 is a view showing a relationship between a joint angle and an internal pressure difference in antagonistic driving performed by the elastic expansion/contraction structural member of the elastic actuator according to the first embodiment of the present invention.

Means for resolving the issue is the desired pressure difference calculation means 14. In the case where normal and reverse rotations at the joint axis are performed by the antagonistic driving of the set of elastic expansion/contraction structural members 1 and 1 shown in FIG. 3, a relationship of the internal pressure difference between the joint angle and the set of elastic expansion/contraction structural members 1 is shown in, for example, FIG. 7. FIG. 7 shows result in the case where the elastic expansion/contraction structural member (McKibben type pneumatic artificial muscle) having the total length of 250 mm and an inner diameter of 10 mm is used. As shown in FIG. 7, the measurement result can be substantially approximated by a straight line. Accordingly, the following linear equation expressing the straight line can be used as the equation for calculating the desired pressure difference $\Delta P_d$.

$$\Delta P_d = A q_d + b \quad (1)$$

Herein, A and b are coefficients which can be determined by the measurement result of FIG. 7. Accordingly, the desired pressure difference calculation means 14 calculates the desired pressure difference $\Delta P_d$ from the desired joint angle vector $q_d$ using the equation (1), and the desired pressure difference $\Delta P_d$ is inputted to the pressure difference error compensation means 15, which allows the high accuracy position control to be realized with small steady-state deviation.

Figure 13:
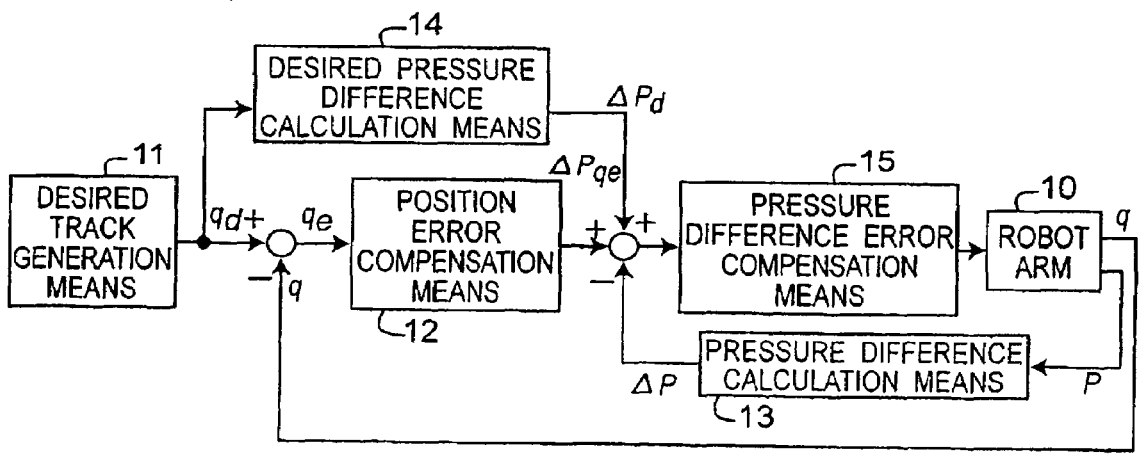
FIG. 13 is a view showing a structure of the conventional control apparatus in which a desired value of an internal state is determined only by an output desired value.

The configuration shown in FIG. 13 can be considered as the control system in which the desired internal state determination means 105 is included as a constituent. However, the configuration shown in FIG. 13 can deal with only the elastic actuator in which the internal state desired value can be determined only from output desired value. On the contrary, in the first embodiment, the internal state is determined not only by the output desired value but also by the output current value (measurement value) and the internal state current value (measurement value), so that the first embodiment can deal with a greater variety of elastic actuators.

Figure 8:
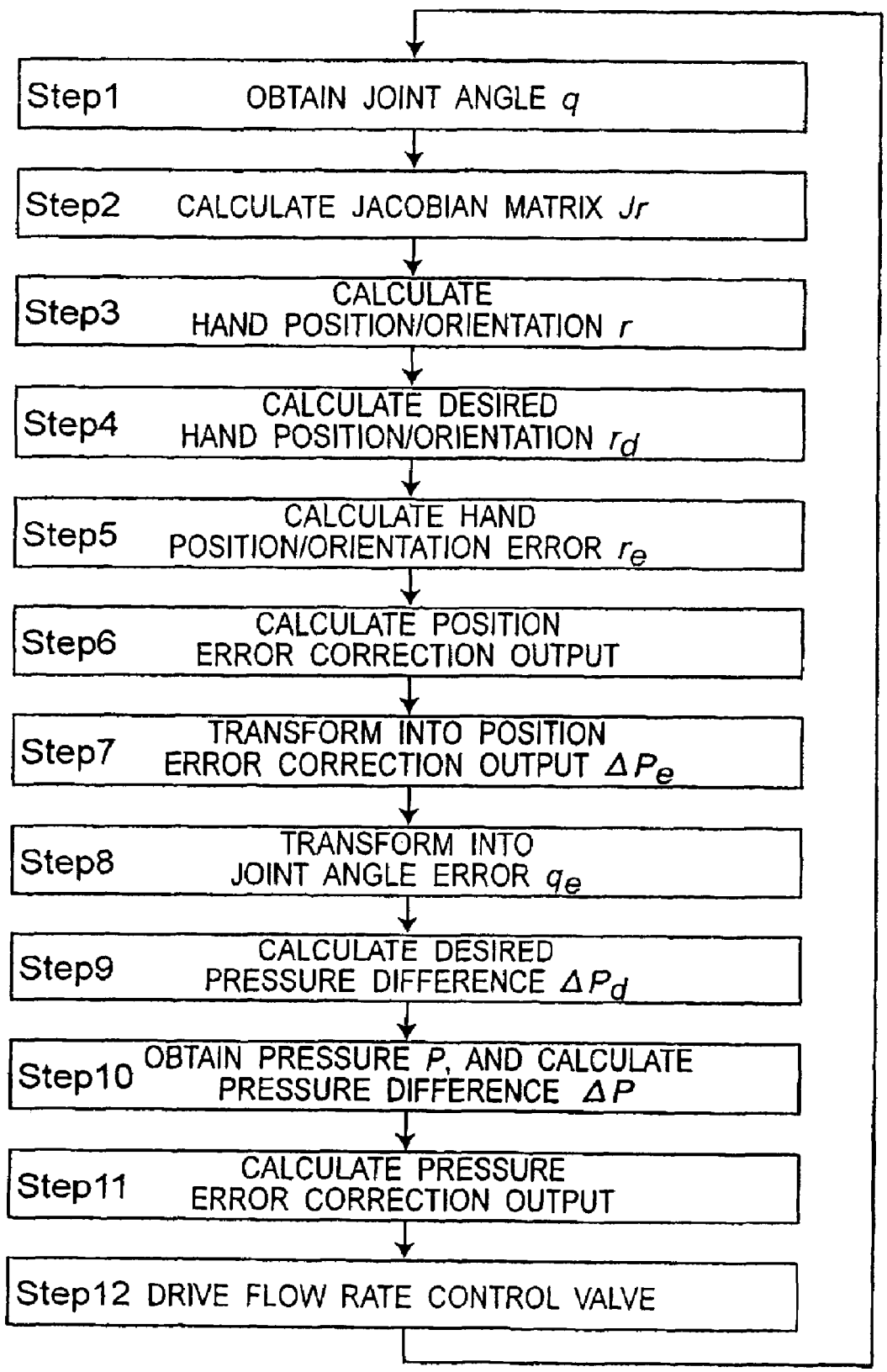
FIG. 8 is a flowchart showing actual operation steps of a control program of the elastic actuator control apparatus according to the first embodiment of the present invention.

Actual operation steps of a control program based on the above principle will be described below with reference to a flowchart of FIG. 8.

In step 1, joint angle data (joint variable vector or joint angle vector q) measured by the encoder 8 is captured in the control apparatus.

In step 2, the approximate inverse kinematic calculation means performs the calculations of the Jacobian matrix Jr and the like necessary to the kinematic calculation of the robot arm 10. In step 3, the forward kinematic calculation means 21 calculates the current hand position/orientation vector r of the robot arm 10 from the joint angle data (joint angle vector q) from the robot arm 10 (process in the forward kinematic calculation means 21).

In step 4, the desired track calculation means 11 calculates the hand position/orientation-desired vector $r_d$ of the robot arm 10 based on the operation program of the robot arm 10, which is previously stored in the memory 19a of the control apparatus.

In step 5, the hand position/orientation error $r_e$ which is the difference between the hand position/orientation-desired vector $r_d$ and the current hand position/orientation vector r is calculated. In step 6, the position error compensation means 12 calculates the position error correction output $\Delta P_{re}$ from the hand position/orientation error $r_e$ (process in the position error compensation means 12). The PID compensator can be cited as a specific example of the position error compensation means 12. In the case of the PID compensator, in step 6, the total value of three values of a value in which the hand position/orientation error $r_e$ is multiplied by a proportion gain, a value in which a differentiation value of the hand position/orientation error $r_e$ is multiplied by a differentiation gain, and a value in which an integration value of the hand position/orientation error $r_e$ is multiplied by an integration gain becomes the position error correction output $\Delta P_{re}$. The control is performed such that the position error is converged to zero by properly adjusting the three gains of the proportion, differentiation, and integration gains which are a constant diagonal matrix.

In step 7, the approximate inverse kinematic calculation means 23b transforms the position error correction output $\Delta P_{re}$ from the value concerning the hand position/orientation error into the joint error correction output $\Delta P_{qe}$ which is the value concerning the joint angle error by multiplying an inverse matrix of the Jacobian matrix Jr calculated in step 2 (process in the approximate inverse kinematic calculation means 23*b*).

In step 8, the approximate inverse kinematic calculation means 23*a* transforms the hand position/orientation error $r_e$ into the joint angle vector error $q_e$ by multiplying the inverse matrix of the Jacobian matrix Jr (process in the approximate inverse kinematic calculation means 23*a*).

In step 9, the desired pressure difference calculation means 14 sets the value, in which the joint angle vector error $q_e$ calculated in step 8 and the current joint angle q measured by the encoder 8 are added, at the desired joint angle vector $q_d$ to calculate the desired pressure difference $\Delta P_d$.

In step 10, the actuator internal pressure value measured by the pressure sensor 9 which is an example of the internal state measurement means 107 is captured in the control apparatus, and the pressure difference calculation means 13 calculates the current pressure difference $\Delta P$ between the internal pressures of the actuator in which the antagonistic driving is performed.

In step 11, the current pressure difference $\Delta P$ calculated by the pressure difference calculation means 13 in step 10 is subtracted from a value, in which the joint error correction output $\Delta P_{qe}$ calculated by the approximate inverse kinematic calculation means 23*b* in step 7 and the desired pressure difference $\Delta P_d$ calculated by the desired pressure difference calculation means 14 in step 9 are added, and the pressure difference error compensation means 15 calculates the pressure difference error $\Delta P_e$ (process in the pressure difference error compensation means 15). Further, in step 11, the pressure difference error compensation means 15 calculates the pressure difference error correction output from the pressure difference error $\Delta P_e$ (process in the pressure difference error compensation means 15). For example, the PID compensator can be cited as the pressure difference error compensation means 15.

In step 12, the pressure difference error correction output is applied to each flow rate control valve 18 from the pressure difference error compensation means 15 through the D/A board 20, and each flow rate control valve 18 changes the pressure in each actuator, which generates rotation movement at each joint axis of the robot arm 10.

The control of the operation of the robot arm 10 is realized by repeatedly performing the above steps 1 to 12 as the control calculation loop.

Figure 9A:
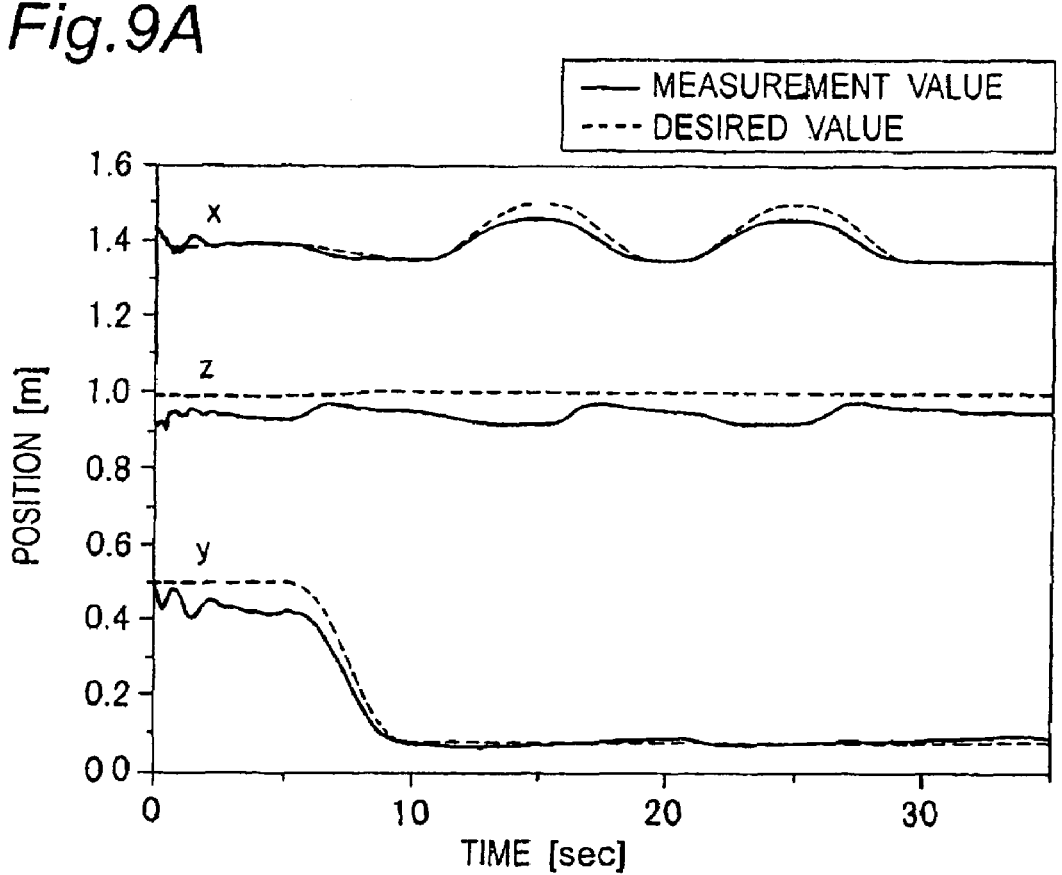
FIG. 9A is a view showing control result performed by the elastic actuator control apparatus according to the first embodiment of the present invention.
Figure 9B:
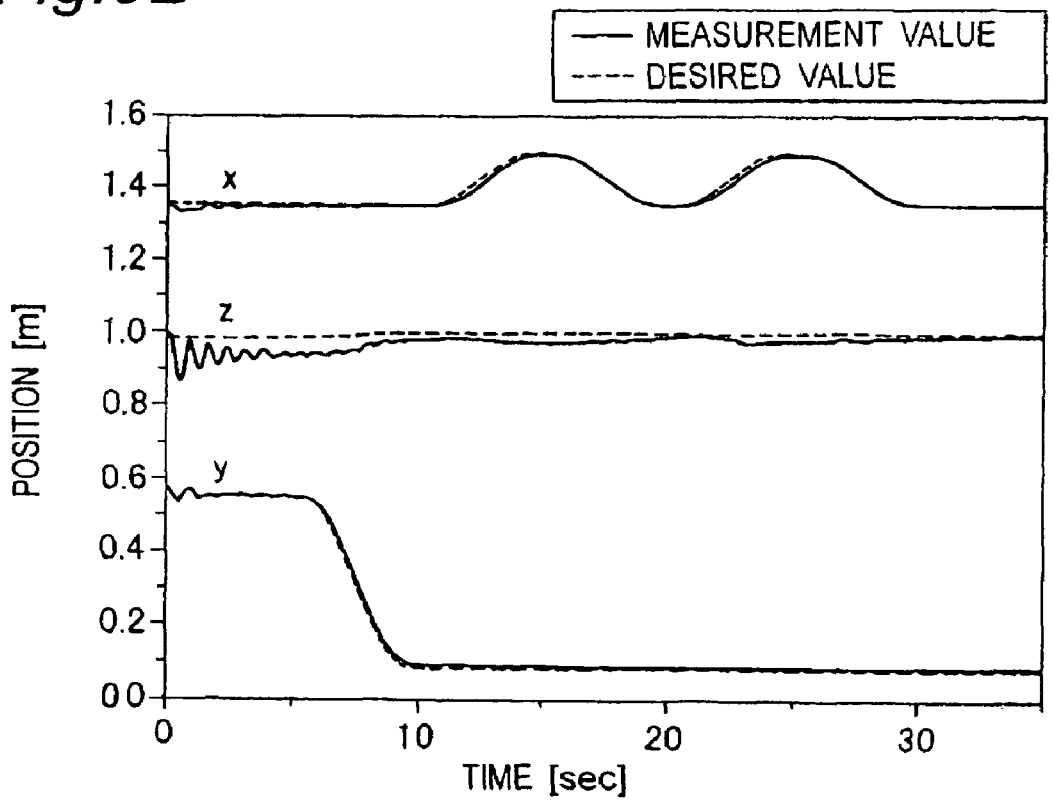
FIG. 9B is a view showing a control result performed by the elastic actuator control apparatus according to the first embodiment of the present invention.
Figure 11:
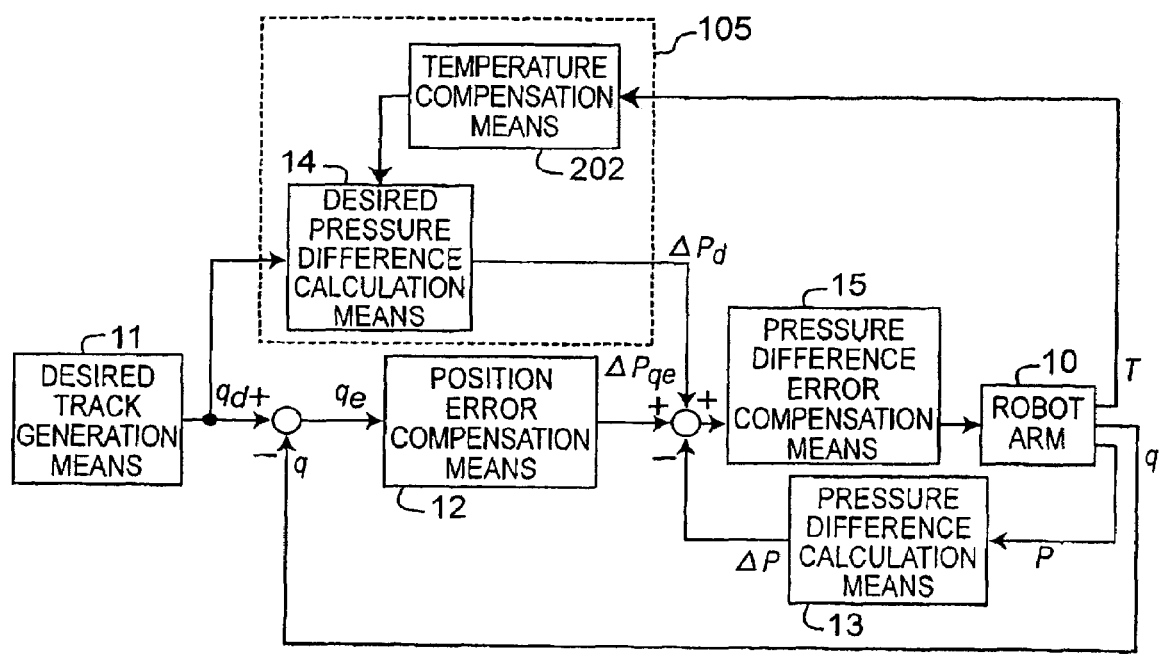
FIG. 11 is a view showing a structure of an elastic actuator control apparatus according to a third embodiment of the present invention.
Figure 12:
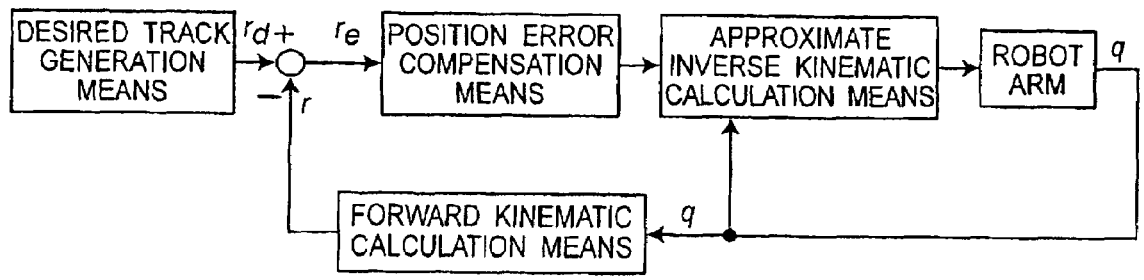
FIG. 12 is a view showing a structure of the conventional control apparatus which performs only position control.

FIGS. 9A and 9B show the results in the cases where track following control of the hand position is performed by the conventional control apparatus shown in FIG. 12 and by the control apparatus of the first embodiment shown in FIG. 11 respectively. In the conventional control apparatus, only the position control is performed to the robot arm 10 shown in FIG. 2. FIGS. 9A and 9B show the desired values and the measurement results of the hand positions of the six-degree-of-freedom robot arms in which the elastic expansion/contraction structural members 1 are used. In the elastic expansion/contraction structural member 1, a natural length is 250 mm and the inner diameter is 10 mm. FIG. 9A shows the control result performed by the conventional control apparatus shown in FIG. 12. In the control apparatus of FIG. 12, the pressure difference feedback control is not performed, but only the position control is performed. As can be seen from FIG. 9A, the error is large and followability is not good. On the other hand, FIG. 9B shows the control result performed by the control apparatus of the first embodiment shown in FIG. 11. The small error and the excellent followability are obtained by the effect of the pressure difference error compensation means 15 and the desired pressure difference calculation means 14.

Thus, with the control apparatus according to the first embodiment, the pressure difference error compensation means 15 is arranged to form the internal pressure control system in which the internal state of the elastic actuator 102 is fed back, and the desired pressure difference calculation means 14 is arranged to form the control system for performing the feedforward of the desired pressure difference which is an example of the desired internal state of the elastic actuator 102. Therefore, the robot arm 10 can be controlled with good responsivity, low steady-state deviation, and high accuracy.

With the control method according to the first embodiment, the pressure difference error compensation means 15 performs the internal pressure control in which the internal state of the elastic actuator 102 is fed back, and the desired pressure difference calculation means 14 performs the control in which the feedforward is subjected to the desired pressure difference which is an example of the desired internal state of the elastic actuator 102. Therefore, the robot arm 10 can be controlled with good responsivity, low steady-state deviation, and high accuracy.

Figure 14:
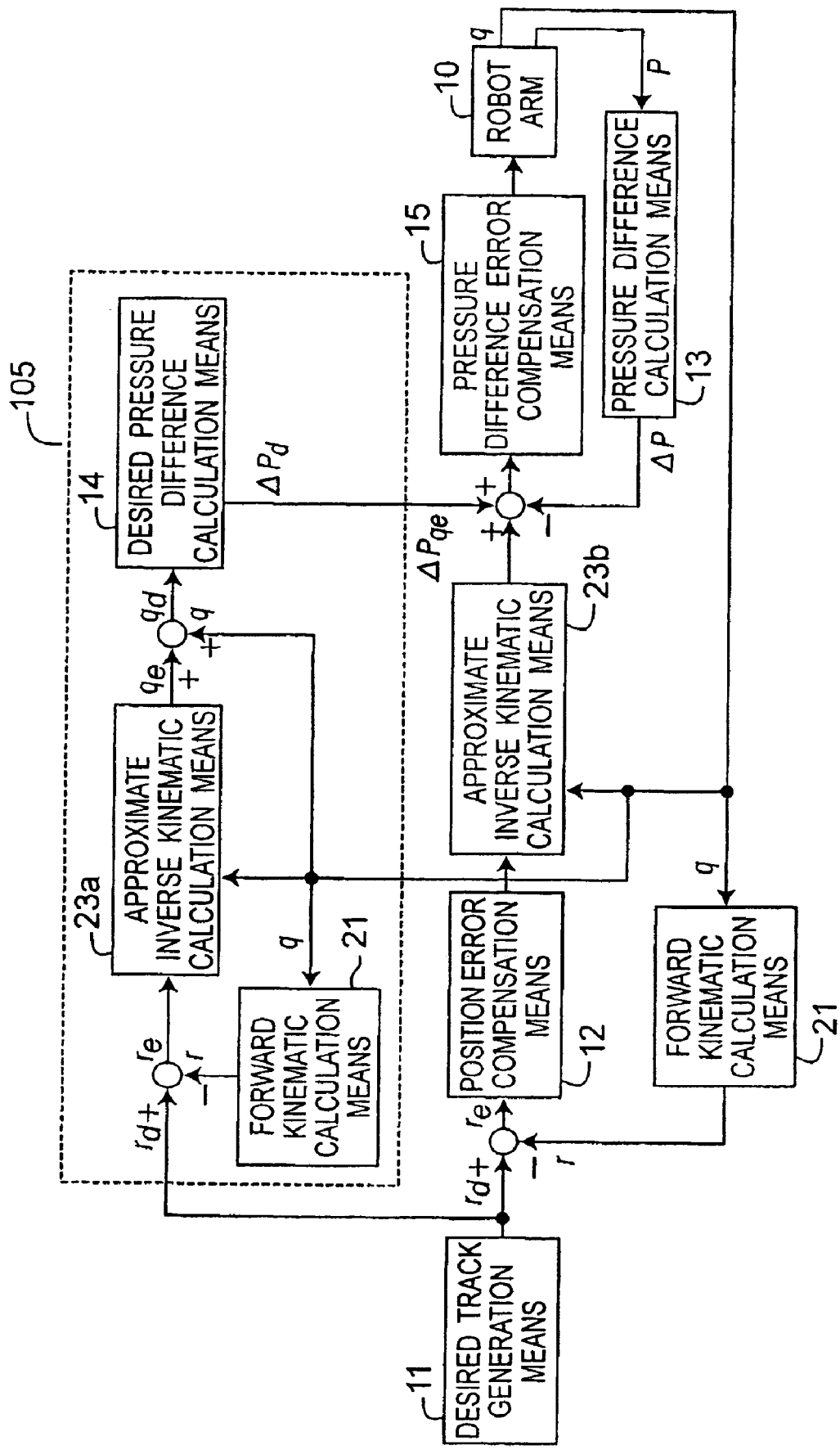
FIG. 14 is a view showing a modification of the structure of the elastic actuator control apparatus according to the first embodiment of the present invention.

In the control system of FIG. 6, the hand position/orientation error is inputted to the desired internal state determination means 105. However, the error is the difference between the desired value and the measurement value, and the block diagram can be changed as shown in FIG. 14 such that the error $r_e$ between the hand position/orientation vector r calculated from the joint angle vector current value q, measured in the robot arm 10, by the forward kinematic calculation means 21 and the hand position/orientation-desired vector $r_d$ outputted from the desired track generation means 11 is inputted to the approximate inverse kinematic calculation means 23*a*. Therefore, there is no essential difference between the case where the desired value is inputted and the case where the error is inputted.

SECOND EMBODIMENT

Figure 10:
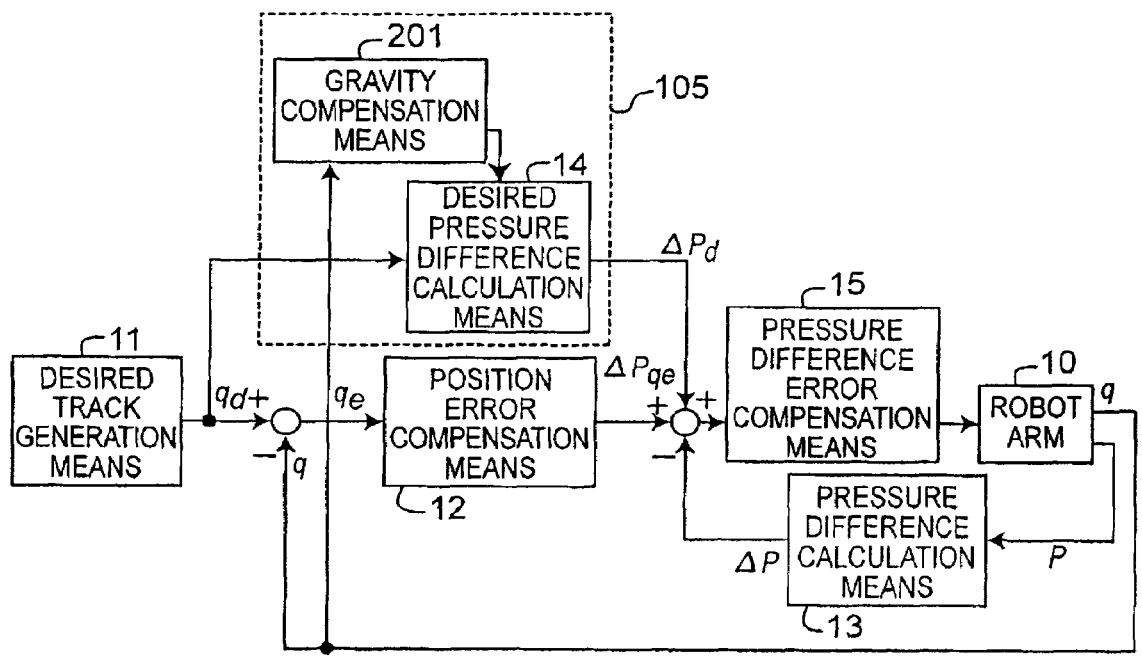
FIG. 10 is a view showing a structure of an elastic actuator control apparatus according to a second embodiment of the present invention.

FIG. 10 is a view showing a configuration of an elastic actuator control apparatus according to a second embodiment of the present invention. In FIG. 10, the reference numeral 201 designates a gravity compensation means. In a control system shown in FIG. 10, the desired track generation means 11 outputs the desired joint angle vector $q_d$ of the robot arm 10, and the joint angle feedback control is performed to compensate the difference $q_d$ with the current joint angle vector q measured by the encoder 8. Other configurations are similar to those of the control apparatus of the first embodiment shown in FIG. 6, so that the description will be omitted.

The current joint angle vector q measured by the encoder 9 is inputted to the gravity compensation means 201, and the gravity compensation means 201 calculates the orientation of each link of the robot arm 10 and, also, calculates a torque value which is generated in each joint axis by the influence of the gravity. The torque value is inputted to desired pressure difference determination means 14 to correct the coefficients A and b of the equation (1) for calculating the desired pressure difference $\Delta P_d$.

According to the control apparatus shown in FIG. 10, the gravity compensation means 201 is arranged in the desired internal state determination means 105, which prevents the robot arm 10 from hanging downward by the influence of the gravity. Therefore, the control can be performed with higher accuracy.

THIRD EMBODIMENT

FIG. 11 is a view showing a configuration of an elastic actuator control apparatus according to a third embodiment of the present invention. In FIG. 11, the reference numeral 202 designates a temperature compensation means. A temperature sensor (not shown) which is an example of the internal state measurement means 107 is arranged in the robot arm 10, and measures a temperature T of the elastic body of the elastic actuator 102. Other configurations are similar to those of the control apparatus of the second embodiment shown in FIG. 10, so that the description will be omitted.

When the elastic body temperature of the elastic actuator 102 is changed, an elastic modulus of the elastic body is changed to change the coefficients A and b of the equation (1) for calculating the desired pressure difference $\Delta P_d$. The temperature T is inputted to the temperature compensation means 202 in order to compensate the influence of the temperature change of the elastic body. The temperature compensation means 202 approximates the relationship between the temperature T and the coefficients A and b by polynomials, based on the coefficients A and b derived from experiments at various temperatures, and calculates the coefficients A and b in which the temperature correction is performed by the polynomials. The corrected coefficients A and b are inputted to the desired pressure difference determination means 14, and the desired pressure difference $\Delta P_d$ corrected based on the equation (1) is outputted.

Thus, according to the control apparatus shown in FIG. 11, the temperature T which is the internal state is inputted to the desired internal state determination means 105, and the temperature compensation means 202 is arranged in the desired internal state determination means 105. Therefore, the influence of the temperature change can be removed to achieve the control with higher accuracy.

In the above embodiments, the desired pressure difference calculation means 14 approximates the relationship between the joint angle and the pressure difference with the linear equation. The present invention is not limited to the linear equation, but the approximation can obviously be performed with multi-dimensional polynomials such as a quadratic equation. Thus, in the case where the relationship between the elastic actuator output and the elastic actuator internal state is approximated with the polynomial, the desired internal state determination means 105 calculates and determines the desired value of the elastic actuator internal state from the desired value of the elastic actuator output, using the polynomial. Instead of the approximation with the polynomial, it may be adapted so that the desired internal state determination means 105 stores the relationship between the elastic actuator output and the elastic actuator internal state (for example, relationship between joint angle and pressure difference) in the form of a table in the memory 19a (see FIG. 4) of the control apparatus, and the desired value of the elastic actuator internal state (for example, desired value of pressure difference) can be derived from the desired value of the elastic actuator output (for example, desired value of joint angle) based on the table.

In the above embodiments, the output is set at the joint angle. However, the output is not limited to the joint angle. For example, the same effect can also be obtained, in the case where a displacement speed sensor which is an example of the displacement speed measurement means is used as the output measurement means and the displacement speed control is performed by setting the output value at the displacement speed.

In the above embodiments, the output is set at the joint angle. However, the output is not limited to the joint angle. For example, the same effect can also be obtained, in the case where a force sensor which is an example of the force measurement means is used as the output measurement means and the force control is performed by setting the output value at the force.

In the above embodiments, the sensor is provided as an example of the internal state measurement means 107. However, the same effect can also be obtained, in the case where an observer (observation device) is provided to estimate the internal state and an estimated value of the internal state is used.

In the above embodiments, the hydropneumatic drive actuator driven by the fluid pressure is described as an example of the elastic actuator. The present invention is not limited to the hydropneumatic drive actuator. For example, the same effect can also be obtained by adopting an electric field or a charge amount etc. as the internal state, in the case where the elastic body such as a conductive polymer, a dielectric polymer, or various kinds of gels is driven by electrical stimulation.

Then, embodiments subsequent to a fourth embodiment according to the present invention will be described with reference to the drawings.

In the embodiments subsequent to the fourth embodiment, the following issues are further resolved.

The McKibben type actuator has a large output-weight ratio, so that the McKibben type actuator has the feature that the McKibben type actuator is light yet high output. Accordingly, in the case where the movable mechanism such as the robot arm is driven, a speed reduction mechanism is not used, but the movable mechanism can be driven in the direct-driving manner by the link mechanism or the like. Therefore, hardness of joint rigidity caused by the arrangement of the speed reduction mechanism is eliminated, and the actuator is also flexible, so that the flexible movable mechanism can be realized.

However, the hydropneumatic drive actuator such as the McKibben type actuator which is operated by the fluid pressure such as air has the issue that the elastic actuator is difficult to control. For example, in the elastic actuator, the responsivity is worsened due to the elastic property generated by the fluid compressibility, the influence of the channel resistance, or the like.

Conventionally, in order to resolve the issue, as described above, Japanese Examined Patent Publication No. 2583272 discloses the control apparatus in which the desired track can be drawn by including the delay circuit for the robot arm driven by the combination of the servomotor and the hydropneumatic drive actuator.

In the case where the speed reduction mechanism is not used but the movable mechanism can be driven in the direct-driving manner by the link mechanism or the like, the influences of the gravity, inertial force, centrifugal force, Coriolis force, and the like which act on the structural material such as the arm cannot be negligible, which results in the worsened control accuracy. Therefore, in consideration of dynamics, it is necessary to perform the control by the control method such as a calculated torque method, and it is necessary that joint torque feedback control and the like be performed in order to realize the correct joint torque.

Conventionally, in order to resolve the issue, Japanese Examined Patent Publication No. 3324298 discloses a control apparatus. In this control apparatus, while the calculated torque method is used for the robot arm driven by a motor, the torque feedback control is performed to the robot arm. In the torque feedback control, an instruction value in which a value based on a current angular speed of a motor is subtracted from a torque control value computed based on a torque deviation which is a difference between a torque desired value and a torque current value is supplied to the motor. Therefore, the stable and high-accuracy torque control can be realized to cause the robot arm to perform the desired motion.

However, in the control apparatus disclosed in Japanese Examined Patent Publication No. 2583272 and including the delay circuit, since the delay is always generated for the desired operation, the responsivity is worsened and the work necessary to be processed in real time cannot be performed. The control apparatus exerts the effect only in the case of the combination of the servomotor and the fluid drive actuator, and cannot exert the effect in the robot arm including only the fluid drive actuator.

The control apparatus disclosed in Japanese Examined Patent Publication No. 3324298 and including the torque feedback control system, is effective to the robot arm driven by the motor. However, the control apparatus cannot be applied to the robot arm driven by the elastic actuator without change.

In view of the foregoing, an object of the fourth embodiment and the embodiments subsequent to the fourth embodiment according to the present invention is to resolve the conventional issues and provide elastic actuator drive-type movable mechanism control apparatus and control method by which the movable mechanism such as the robot arm driven by the elastic actuator can be controlled with good responsivity and the position and force can be controlled with high accuracy with no influence of the gravity, inertial force, centrifugal force, Coriolis force, and the like.

FOURTH EMBODIMENT

Figure 15:
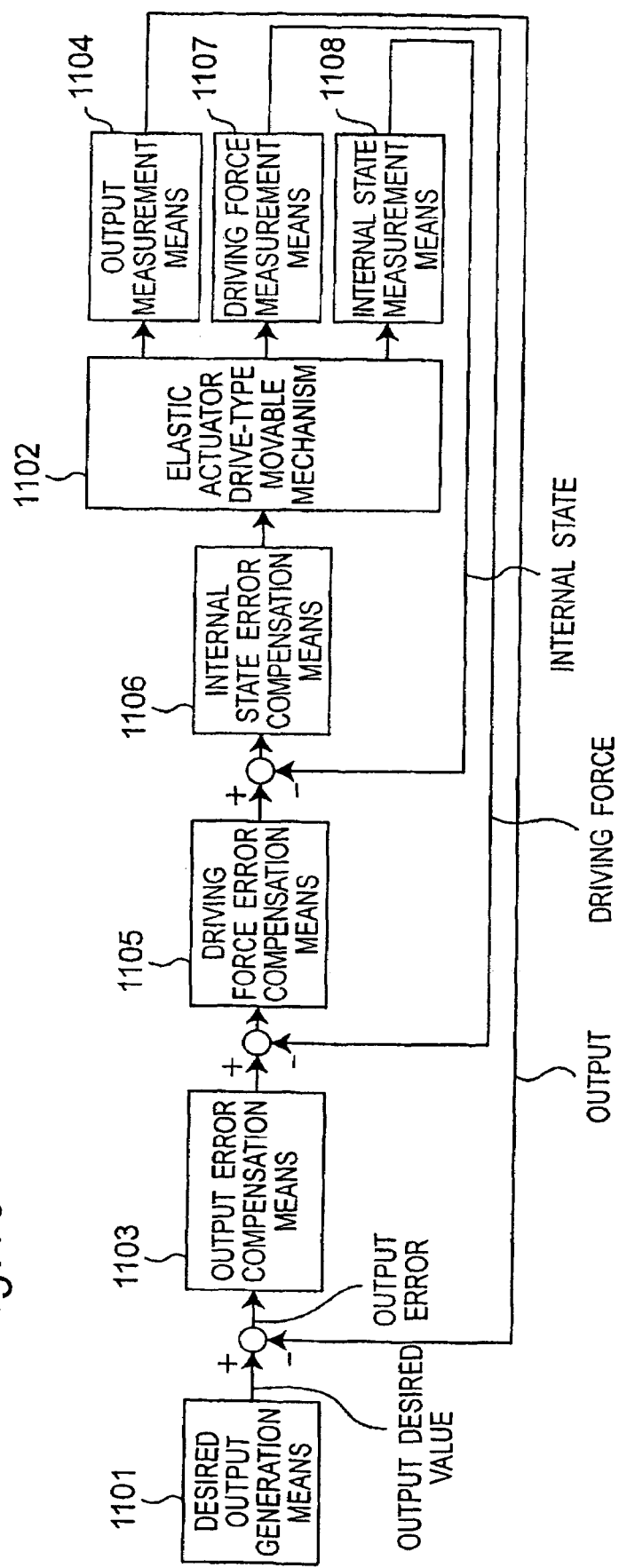
FIG. 15 is a block diagram showing a concept of an elastic actuator drive-type movable mechanism control apparatus according to a fourth embodiment of the present invention.

FIG. 15 is a block diagram showing a concept of an elastic actuator drive-type movable mechanism control apparatus according to the fourth embodiment of the present invention. In FIG. 15, the reference numeral 1101 designates a desired output generation means, and the desired output generation means 1101 generates the output desired values of an elastic actuator drive-type movable mechanism 1102 which is driven by the elastic actuator including the elastic expansion/contraction structural member 1. Examples of the output desired value include the displacement and the generating force. The reference numeral 1104 designates an output measurement means connected to the elastic actuator drive-type movable mechanism 1102. The output measurement means 1104 measures the measurement value of the output of the elastic actuator drive-type movable mechanism 1102 to input the measurement value to an output error compensation means 1103. The reference numeral 1103 designates the output error compensation means to which the desired value is inputted from the desired output generation means 1101, and the output error compensation means 1103 performs the control such that the output measurement value of the elastic actuator drive-type movable mechanism 1102 measured by the output measurement means 1104 is caused to follow the desired value. The reference numeral 1105 designates a driving force error compensation means for outputting driving force error compensation information so as to compensate the error of the driving force generated by the elastic actuator 1, and the difference between the output of the output error compensation means 1103 and the driving force measured by a driving force measurement means 1107 connected to the elastic actuator drive-type movable mechanism 1102 is inputted to the driving force error compensation means 1105. The reference numeral 1106 designates an internal state error compensation means. The difference between the output information of the driving force error compensation information from the driving force error compensation means 1105 and an internal state measurement value from internal state measurement means 1108 is inputted to the internal state error compensation means 1106, and the internal state error compensation means 1106 outputs internal state error compensation information. The output information of the internal state error compensation information is inputted to each elastic actuator 1 from the internal state error compensation means 1106, and the control is performed such that the internal state measurement value of each elastic actuator 1 is caused to follow the desired value. The reference numeral 1108 designates the internal state measurement means connected to the elastic expansion/contraction structural member 1 which is each elastic actuator constituting the elastic actuator drive-type movable mechanism 1102. The internal state measurement means 1108 measures each internal state measurement value which is the internal pressure of each elastic expansion/contraction structural member 1 of the elastic actuator drive-type movable mechanism 1102, and inputs the internal state measurement value to the internal state error compensation means 1106.

A specific example of the apparatus for controlling the elastic actuator drive-type movable mechanism 1102 of the fourth embodiment will be described below while a control apparatus of a robot arm 10A which is an example of the elastic actuator drive-type movable mechanism 1102 is taken as an example of the control object.

Figure 16:
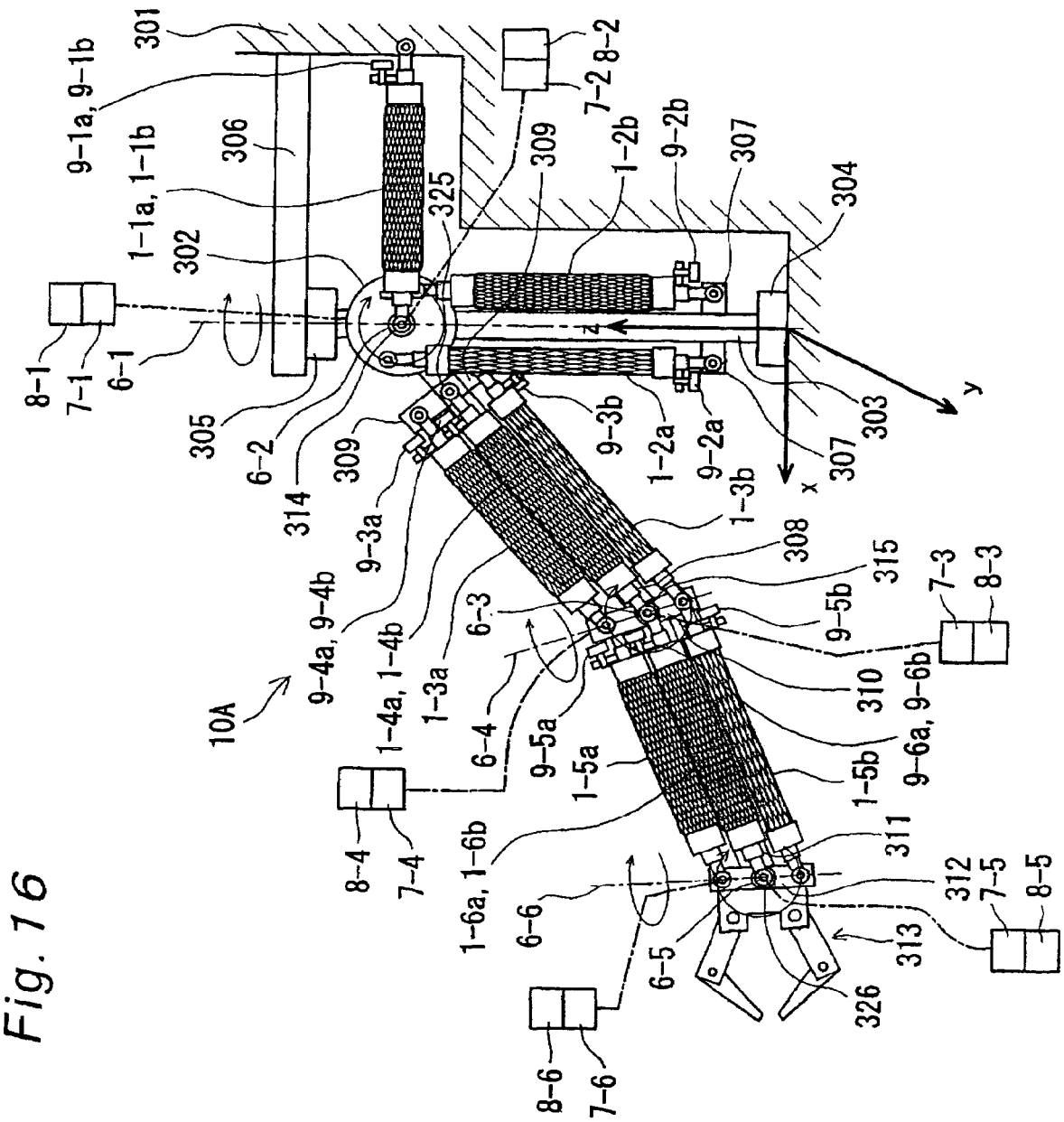
FIG. 16 is a view showing a structure of a robot arm which is a control object of the elastic actuator drive-type movable mechanism control apparatus according to the fourth embodiment of the present invention.

FIG. 16 is a view showing a configuration of the robot arm 10A which is the control object of the apparatus for controlling the elastic actuator drive-type movable mechanism 1102 according to the fourth embodiment of the present invention. In FIG. 16, the reference numerals 1-1a, 1-1b, 1-2a, 1-2b, 1-3a, 1-3b, 1-4a, 1-4b, 1-5a, 1-5b, 1-6a, and 1-6b (these are the reference numerals for individual elastic expansion/contraction structural member, and reference numeral 1 is used when the elastic expansion/contraction structural member is representatively indicated) designate the elastic expansion/contraction structural members. As shown in FIG. 3, in the structure of the elastic expansion/contraction structural member 1, the deformation direction regulating member 3 is arranged in an outer surface of the tubular, hollow elastic body 2 which is made of a rubber material to function as the driving portion, and both end portions of the tubular elastic body 2 are sealed in the air-tight manner with the sealing members 4. The deformation direction regulating member 3 is formed in the mesh shape by weaving resin or metal fiber cords which material are difficult to stretch. In the deformation direction regulating member 3, while the deformation in a radial direction caused by the expansion of the tubular elastic body 2 is transformed into the length contraction in the axial direction, the deformation in the radial direction caused by the contraction of the tubular elastic body 2 is transformed into the length expansion in the axial direction. A compressible fluid such as air is supplied to the elastic expansion/contraction structural member 1 through the tubular fluid passing member 5. The tubular fluid passing member 5 has a fluid channel through which the compressible fluid passes inside the tubular fluid passing member 5, which enables the fluid to be injected into or discharged from the hollow inside of the elastic body 2. When internal pressure is applied to the inside space of the tubular elastic body 2 by the supplied compressible fluid, the tubular elastic body 2 may try to be mainly expanded in the radial direction. However, the internal pressure of the tubular elastic body 2 is transformed into motion in a central axis direction of the tubular elastic body 2 by the action of the deformation direction regulating member 3, which contract the total length of the tubular elastic body 2. Therefore, the elastic expansion/contraction structural member 1 having the above structure can be utilized as the direct-driving elastic actuator drive-type movable mechanism 1102.

In the robot arm 10A of FIG. 16, the set of elastic expansion/contraction structural members 1 and 1 is arranged so as to face each other while the joint axis serves as the fulcrum, and the antagonistic type drive structure is formed. In the antagonistic type drive structure, when one of the set of elastic expansion/contraction structural members 1 and 1 is contracted while the other elastic expansion/contraction structural member 1 is expanded, the force is applied through the fulcrum to perform rotation at the joint axis, which allows normal and reverse rotation motions to be realized at the joint axis. Specifically, at the first joint axis 6-1, normal and reverse rotations are performed by antagonistic driving of the elastic expansion/contraction structural member 1-1*a* and the elastic expansion/contraction structural member 1-1*b* (elastic expansion/contraction structural member 1-1*b* is not shown because elastic expansion/contraction structural member 1-1*b* is located at the back of elastic expansion/contraction structural member 1-1*a*), at the second joint axis 6-2, normal and reverse rotations are performed by the antagonistic driving of the elastic expansion/contraction structural member 1-2*a* and the elastic expansion/contraction structural member 1-2*b*, at the third joint axis 6-3, normal and reverse rotations are performed by the antagonistic driving of the elastic expansion/contraction structural member 1-3*a* and the elastic expansion/contraction structural member 1-3*b*, at the fourth joint axis 6-4, normal and reverse rotations are performed by the antagonistic driving of elastic expansion/contraction structural member 1-4*a* and the elastic expansion/contraction structural member 1-4*b*, at the fifth joint axis 6-5, normal and reverse rotations are performed by the antagonistic driving of the elastic expansion/contraction structural member 1-5*a* and the elastic expansion/contraction structural member 1-5*b*, and at the sixth joint axis 6-6, normal and reverse rotations are performed by the antagonistic driving of the elastic expansion/contraction structural member 1-6*a* and the elastic expansion/contraction structural member 1-6*b*.

The reference numerals 9-1*a*, 9-1*b*, 9-2*a*, 9-2*b*, 9-3*a*, 9-3*b*, 9-4*a*, 9-4*b*, 9-5*a*, 9-5*b*, 9-6*a*, and 9-6*b* of FIG. 16 designate the pressure sensors each of which is an example of the internal state measurement means of each of the elastic expansion/contraction structural members 1-1*a*, 1-1*b*, 1-2*a*, 1-2*b*, 1-3*a*, 1-3*b*, 1-4*a*, 1-4*b*, 1-5*a*, 1-5*b*,1-6*a*, and 1-6*b*. The pressure sensors 9-1*a*, 9-1*b*, 9-2*a*, 9-2*b*, 9-3*a*, 9-3*b*, 9-4*a*, 9-4*b*, 9-5*a*, 9-5*b*, 9-6*a*, and 9-6*b* are arranged in the fluid passing members 5 (fluid injection/discharge ports) to measure the pressures in the elastic expansion/contraction structural members, respectively.

For details, the robot arm 10A is a robot arm having six degrees of freedom, and includes the first joint axis 6-1, the second joint axis 6-2, the third joint axis 6-3, the fourth joint axis 6-4, the fifth joint axis 6-5, and the sixth joint axis 6-6. At the first joint axis 6-1, normal and reverse rotations are performed along the vertical axis and in the plane along the transverse direction with respect to the fixed wall 301. At the second joint axis 6-2, normal and reverse rotations are performed in the plane along a vertical direction with respect to the fixed wall 301. The third joint axis 6-3 is mutually normally and reversely rotated in the plane along the vertical direction between the second arm 308 and the first arm 311 with respect to the fixed wall 301. At the fourth joint axis 6-4, normal and reverse rotations are performed in an axial direction orthogonal to the third joint axis 6-3 between the second arm 308 and the first arm 311 with respect to the fixed wall 301. At the fifth joint axis 6-5, mutually normal and reverse rotations are performed in the plane along the vertical direction between the first arm 311 and the hand 313 with respect to the fixed wall 301. At the sixth joint axis 6-6, normal and reverse rotations are performed in the axial direction orthogonal to the fifth joint axis 6-5 between the first arm 311 and the hand 313 with respect to the fixed wall 301.

In the first joint axis 6-1, circular supports 302 and 302 are rotatably coupled to both the sides of the rotation shaft 303 whose upper and lower end portions are rotatably supported in the vertical direction by bearings 304 and 305, and each one end portion of the elastic expansion/contraction structural members 1-1*a* and 1-1*b* (however, the elastic expansion/contraction structural member 1-1*b* is not shown because the elastic expansion/contraction structural member 1-1*b* is arranged at the back of the elastic expansion/contraction structural member 1-1*a*) is coupled to the fixed wall 301 while the other end portion of each of the elastic expansion/contraction structural members 1-1*a* and 1-1*b* is coupled to a support shaft 314 of each circular support 302. Therefore, the antagonistic driving of the elastic expansion/contraction structural members 1-1*a* and 1-1*b* enables the first arm 311, second arm 308, and hand 313 of the robot arm to be integrally normally and reversely rotated in the plane along the transverse direction about the vertical axis Z of the rotation shaft 303 of the first joint axis 6-1. The upper-side bearing 305 is supported to the fixed wall 301 by the support rod 306.

In the second joint axis 6-2, the elastic expansion/contraction structural members 1-2*a* and 1-2*b* are coupled between the two circular supports 302 and 302 fixed onto the both sides of the rotation shaft 303 and supports 307 and 307, which are fixed onto the side of the fixed wall 301 of the rotation shaft 303 while being orthogonal to the longitudinal direction of the rotation shaft 303, respectively, and the antagonistic driving of the elastic expansion/contraction structural members 1-2*a* and 1-2*b* enables the first arm 311, second arm 308, and hand 313 of the robot arm 10A to be integrally normally and reversely rotated in the plane along the vertical direction about the transverse axis of the support shaft 314 of the second joint axis 6-2.

In the third joint axis 6-3, the supports 309 and 309 are fixed onto the side of the circular support 302 of the second arm link 308 whose one end is fixed to the two circular supports 302 and 302 while the supports 309 and 309 are orthogonal to the longitudinal direction of the second arm link 308, and the support 310 is rotatably coupled to one end of the first arm link 311 on the front end side of the second arm link 308 while being orthogonal to the longitudinal direction of the first arm link 311. The elastic expansion/contraction structural members 1-3*a* and 1-3*b* are coupled between the supports 309 and 309 of the second arm link 308 and the support 310 fixed onto one end of the first arm link 311, respectively, and the antagonistic driving of the elastic expansion/contraction structural members 1-3a and 1-3b enables the first arm 311 and second arm 308 of the robot arm 10A to be relatively normally and reversely rotated in the plane along the vertical direction about the transverse shaft of a support shaft 315 of the third joint axis 6-3.

In the fourth joint axis 6-4, the supports 325 and 325 are fixed onto the side of the circular support 302 of the second arm link 308 whose one end is fixed to the two circular supports 302 and 302 while the supports 325 and 325 are orthogonal to the longitudinal direction of the supports 309 and 309 and second arm link 308, and the elastic expansion/contraction structural members 1-4a and 1-4b are coupled between the supports 325 and 325 and the support 310 fixed to one end of the first arm link 311, respectively, Therefore, the antagonistic driving of the elastic expansion/contraction structural members 1-4a and 1-4b enables the first arm 311 and second arm 308 of the robot arm 10A to be relatively normally and reversely rotated about the fourth joint axis 6-4 orthogonal to the third joint axis 6-3.

In the fifth joint axis 6-5, the elastic expansion/contraction structural members 1-5a and 1-5b are coupled between the support 310 of the first arm 311 and the support 312 which is coupled to one end of the hand 313 while rotatably coupled to the first arm 311, and the antagonistic driving of the elastic expansion/contraction structural members 1-5a and 1-5b enables the hand 313 to be normally and reversely rotated with respect to the first arm 311 in the plane along the vertical direction about the transverse axis of the support shaft 326 of the fifth joint axis 6-5.

In the sixth joint axis 6-6, the elastic expansion/contraction structural members 1-6a and 1-6b are coupled between the support 310 of the first arm 311 and the support 312, which is fixed to one end of the hand 313 and rotatably coupled to the first arm 311, while the elastic expansion/contraction structural members 1-6a and 1-6b differ from the elastic expansion/contraction structural members 1-5a and 1-5b in the phase by 90 degrees. Therefore, the antagonistic driving of the elastic expansion/contraction structural members 1-6a and 1-6b enables the hand 313 to be normally and reversely rotated with respect to the first arm 311 about the sixth joint axis 6-6 orthogonal to the fifth joint axis 6-5.

As described later, the flow rate proportional solenoid valve 18 is connected to each of the elastic expansion/contraction structural members 1-1a and 1-1b, the elastic expansion/contraction structural member 1-2a and 1-2b, the elastic expansion/contraction structural members 1-3a and 1-3b, the elastic expansion/contraction structural members 1-4a and 1-4b, the elastic expansion/contraction structural members 1-5a and 1-5b, and the elastic expansion/contraction structural members 1-6a and 1-6b, and all the flow rate proportional solenoid valves 18 are connected to the control computer 19. The control computer 19 controls the contraction/expansion operations of each of the elastic expansion/contraction structural members 1-1a and 1-1b, the elastic expansion/contraction structural members 1-2a and 1-2b, the elastic expansion/contraction structural members 1-3a and 1-3b, the elastic expansion/contraction structural members 1-4a and 1-4b, the elastic expansion/contraction structural members 1-5a and 1-5b, and the elastic expansion/contraction structural members 1-6a and 1-6b through the flow rate proportional solenoid valves 18. Encoders 8-1, 8-2, 8-3, 8-4, 8-5, and 8-6 and torque sensors 7-1, 7-2, 7-3, 7-4, 7-5, and 7-6 are arranged for each joint axis. The encoder 8 is an example of a displacement measurement means which is an example of the output measurement means. The encoder 8 (collective term of encoders 8-1, 8-2, 8-3, 8-4, 8-5, and 8-6) is an example of the displacement measurement means which is an example of the output measurement means. The torque sensor 7 (collective term of torque sensors 7-1, 7-2, 7-3, 7-4, 7-5, and 7-6) is an example of a driving torque measurement means which is an example of the driving force measurement means. The encoder 8 can measure the joint angle of the joint axis, and the torque sensor 7 can measure the driving torque generated by performing the antagonistic driving to the elastic expansion/contraction structural member. A pressure sensor 9 (collective term of pressure sensors 9-1a, 9-1b, 9-2a, 9-2b, 9-3a, 9-3b, 9-4a, 9-4b, 9-5a, 9-5b, 9-6a, and 9-6b) is arranged in each elastic expansion/contraction structural member 1. The pressure sensor 9 is an example of the pressure measurement means which is an example of the internal state measurement means 107. The pressure sensor 9 can measure the internal pressure (example of internal state) of each elastic expansion/contraction structural member 1 which is changed by the driving of the elastic expansion/contraction structural member 1.

According to the above structure, the basic functions of the robot arm 10A such as grasp and carry of an object can be realized by utilizing the multi degrees of freedom.

FIG. 4 is a view showing the configuration of the pneumatic supply system for driving the robot arm 10 which is the control object of the elastic actuator control apparatus according to the first embodiment of the present invention. The configuration of the pneumatic supply system is similar to the configuration of the pneumatic supply system for driving the robot arm 10A which is the control object of the control apparatus of the elastic actuator drive-type movable mechanism 1103 according to the fourth embodiment of the present invention. Therefore, the configuration of the pneumatic supply system according to the fourth embodiment will be described with reference to FIG. 4. Similarly to the first embodiment, FIG. 4 shows only the portion where normal and reverse rotations at the third joint axis of the robot arm 10A are performed, and other portions are omitted.

In FIG. 4, the reference numeral 16 designates the air pressure source such as the compressor, and the reference numeral 17 designates the pneumatic adjustment unit in which the pneumatic filter 17a, the pneumatic regulator 17b, and the pneumatic lubricator 17c are grouped. The reference numeral 18 designates the five-port flow rate control solenoid valve which controls the flow rate by, e.g., driving the spool valve with force of an electromagnet. The reference numeral 19 designates the control computer which is an example of the control unit formed by, e.g., the general-purpose personal computer, and the D/A board 20 is mounted on the control computer 19. Each flow rate of the air passing through the fluid passing member 5 can be independently controlled by outputting the voltage instruction value to the five-port flow rate control solenoid valve 18. The memory 19a in which an operation program of the robot arm 10A and the like are previously stored is also mounted on the control computer 19.

Then, the operation of the pneumatic supply system shown in FIG. 4 will be described. The high-pressure air generated by the air pressure source 16 is depressurized by the pneumatic adjustment unit 17 and adjusted to a constant pressure of, e.g., 600 kPa, and the air is supplied to the five-port flow rate control solenoid valve 18. The opening degree of the five-port flow rate control solenoid valve 18 is controlled in proportion to the voltage instruction value outputted from the control computer 19 through the D/A board 20. When the positive voltage instruction value is inputted from the control computer 19 to the five-port flow rate control solenoid valve 18, the opening becomes the state shown by A of the pneumatic circuit sign in which the channel is opened from the side of the air pressure source 16 to the side of the elastic expansion/contraction structural member 1-3a to supply the air having the flow rate proportional to the absolute value of the voltage instruction value to the side of the elastic expansion/contraction structural member 1-3a. The channel is opened to atmospheric pressure on the side of the elastic expansion/contraction structural member 1-3b, and the air flow having the flow rate proportional to the absolute value of the voltage instruction value is exhausted from the side of the elastic expansion/contraction structural member 1-3b into atmosphere. Accordingly, as shown in FIG. 4, the total length of the elastic expansion/contraction structural member 1-3a is contracted and the total length of the elastic expansion/contraction structural member 1-3b is expanded, which allows clockwise rotation at the third joint axis 6-3 to be performed at speed proportional to the absolute value of the voltage instruction value. On the other hand, when the negative voltage instruction value is inputted from the control computer 19 to the five-port flow rate control solenoid valve 18, the opening becomes the state shown by B of the pneumatic circuit sign, and the elastic expansion/contraction structural member is reversely operated. That is, the total length of the elastic expansion/contraction structural member 1-3a is expanded and the total length of the elastic expansion/contraction structural member 1-3b is contracted, which allows counterclockwise rotation at the third joint axis 6-3 to be performed.

Specifically, the air flow supplied from the five-port flow rate control solenoid valve 18 to the side of the elastic expansion/contraction structural member 1 passes through the sealing member 4 through the fluid passing member 5, and reaches the inside of the tubular elastic body 2 to create the internal pressure in the tubular elastic body 2. The tubular elastic body 2 is expanded by the created internal pressure. However, the deformation in the radial direction by the expansion is regulated and transformed into the length contraction in the axial direction by the constraint action (regulating action) of the fiber cords woven in the mesh shape in the deformation direction regulating member 3, and the total length of the elastic expansion/contraction structural member 1 is shortened as shown in the lower portion of FIG. 3. On the other hand, when the air is exhausted into the atmosphere from the five-port flow rate control solenoid valve 18 to reduce the internal pressure of the tubular elastic body 2, the elastic expansion/contraction structural member 1 is recovered to eliminate the expansion by the elastic force of the tubular elastic body 2, and the total length of the elastic expansion/contraction structural member 1 is increased as shown in the upper portion of FIG. 3. As a result, assuming that the tubular elastic body 2 is fixed at the right end in FIG. 3, a difference of a distance d is generated at the left end of the tubular elastic body 2 by the contraction/expansion. Accordingly, the elastic expansion/contraction structural member 1 of the fourth embodiment can be caused to function as the direct-driving displacement actuator by controlling the air pressure supply. Amounts of contraction/expansion are substantially proportional to the internal pressure of the elastic expansion/contraction structural member 1. Therefore, when the control computer 19 controls the five-port flow rate control solenoid valve 18 to regulate the air flow rate supplied to the elastic expansion/contraction structural member 1 as shown in FIG. 4, the total length of the elastic expansion/contraction structural member 1 can be controlled.

In the robot arm 10A shown in FIG. 16, due to the antagonistic driving of the elastic expansion/contraction structural members 1-1a and 1-1b, the antagonistic driving of the elastic expansion/contraction structural members 1-2a and 1-2b, the antagonistic driving of the elastic expansion/contraction structural members 1-3a and 1-3b, the antagonistic driving of the elastic expansion/contraction structural members 1-4a and 1-4b, the antagonistic driving of the elastic expansion/contraction structural members 1-5a and 1-5b, and the antagonistic driving of the elastic expansion/contraction structural members 1-6a and 1-6b, as shown in FIG. 5, the five-port flow rate control solenoid valve 18 is arranged for each of the antagonistic elastic expansion/contraction structural members 1 to configure the similar pneumatic supply system. Therefore, normal and reverse rotations at all the joint axes of the robot arm 10A can be performed at the same time by the voltage instruction value outputted from the control computer 19 to the five-port flow rate control solenoid valve 18 through the D/A board 20.

Figure 17:
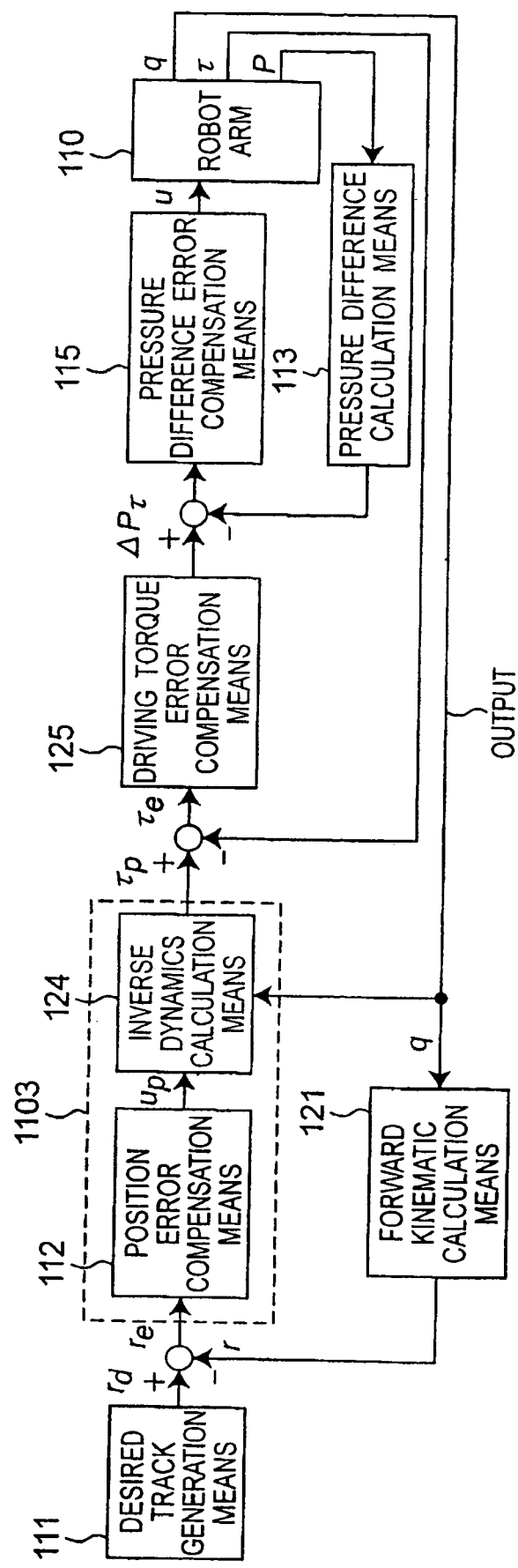
FIG. 17 is a view showing a structure of the elastic actuator drive-type movable mechanism control apparatus according to the fourth embodiment of the present invention.

FIG. 17 is a view showing the configuration of the apparatus for controlling the elastic actuator drive-type movable mechanism 1102 according to the fourth embodiment of the present invention. The elastic actuator drive-type movable mechanism is provided in, for example, the control computer 19. However, in FIG. 17, the reference numeral 10A designates the robot arm, shown in FIG. 16, which is the control object of the elastic actuator drive-type movable mechanism control apparatus and an example of the elastic actuator drive-type movable mechanism. The robot arm 10A outputs the current joint angle value (joint angle vector) $q=[q^1,q_2,q_3,q_4,q_5,q_6)]^T$ measured by the encoders 8 for the joint axes, a driving torque generated by a driving torque current value $\tau=[\tau_1,\tau_2,\tau_3,\tau_4,\tau_5,\tau_6]^T$ measured by the torque sensor 7 arranged in each joint axis, and the internal pressure $P=[P_{1a},P_{1b},P_{2a},P_{2b},P_{3a},P_{3b},P_{4a},P_{4b},P_{5a},P_{5b},P_{6a},P_{6b}]^T$ of the elastic expansion/contraction structural members 1 measured by the pressure sensors 9 of the elastic expansion/contraction structural members 1. Herein, $q_1$, $q_2$, $q_3$, $q_4$, $q_5$, and $q_6$ are the joint angles of the first joint axis 6-1, second joint axis 6-2, third joint axis 6-3, fourth joint axis 6-4, fifth joint axis 6-5, and sixth joint axis 6-6, respectively, $\tau_1$, $\tau_2$, $\tau_3$, $\tau_4$, $\tau_5$, and $\tau_6$ are the driving torques for performing rotations at the first joint axis 6-1, the second joint axis 6-2, the third joint axis 6-3, the fourth joint axis 6-4, the fifth joint axis 6-5, and the sixth joint axis 6-6, and $P_{1a}$, $P_{1b}$, $P_{2a}$, $P_{2b}$, $P_{3a}$, $P_{3b}$, $P_{4a}$, $P_{4b}$, $P_{5a}$, $P_{5b}$, $P_{6a}$, and $P_{6b}$ are the internal pressures of the elastic expansion/contraction structural members 1-1a, 1-1b, 1-2a, 1-2b, 1-3a, 1-3b, 1-4a, 1-4b, 1-5a, 1-5b, 1-6a, and 1-6b.

The reference numeral 13 designates the pressure difference calculation means to which the internal pressure P i.e., the measurement value P of the elastic expansion/contraction structural member 1 outputted from the robot arm 10A is inputted. The measurement value P is measured by the pressure sensor 9. The pressure difference calculation means 13 calculates and outputs a pressure difference $\Delta P=[\Delta P_1, \Delta P_2,\Delta P_3,\Delta P_4,\Delta P_5,\Delta P_6]^T=[P_{1a}-P_{1b},P_{2a}-P_{2b},P_{3a}-P_{3b},P_{4a}-P_{4b},P_{5a}-P_{5b},P_{6a}-P_{6b}]^T$ using the measurement value P of the pressure sensor 9.

The reference numeral 121 designates a forward kinematic calculation means to which the joint angle vector q is inputted. The joint angle vector q is the joint angle current value q, which is measured by the encoder 8 for each joint axis and outputted from the robot arm 10A, The forward kinematic calculation means 121 performs the geometric calculation of the transformation from the joint angle vector q of the robot arm 10A into the hand position/orientation vector r.

The reference numeral 111 designates the desired track generation means for outputting the hand position/orientation-desired vector $r_d$ in order to realize the desired operation of the robot arm 10A.

As one example, the output error compensation means 1103 includes a position error compensation means 112 and an inverse dynamics calculation means 124 so as to compensate the outputted position error. The error $r_e$ between the hand position/orientation vector r and the hand position/orientation-desired vector $r_d$ is inputted to the position error compensation means 112, and the position error compensation means 112 outputs the position error correction output $u_p$ to the inverse dynamics calculation means 124. The hand position/orientation vector r is calculated from the joint angle vector current value q, measured in the robot arm 10A, by the forward kinematic calculation means 121. The hand position/orientation-desired vector $r_d$ is outputted from the desired track generation means 111. The inverse dynamics calculation means 124 calculates a position error correction torque $\tau_p$ for correcting the hand position/orientation error $r_e$ with an equation based on an equation of motion of the robot arm shown in the following equation (2), and the inverse dynamics calculation means 124 outputs the position error correction torque $\tau_p$ in the form of output error compensation information.

$$\tau_p = M(q) J_r^{-1}(q) [-\dot{J}_r(q)\dot{q} + u_p] + h(q,\dot{q}) + g(q) \tag{2}$$

Herein, M(q) is an inertial matrix.

$$h(q,\dot{q}) \tag{3}$$

The expression (3) is a term expressing centrifugal force and Coriolis force, g(q) is a term expressing gravity load, and $J_r(q)$ is a Jacobian matrix.

The reference numeral 125 designates a driving torque error compensation means which is an example of the driving force error compensation means 1105. The torque error $\tau_e$ between the position error correction torque $\tau_p$ and a torque current value $\tau$ is inputted to the driving torque error compensation means 125. The position error correction torque $\tau_p$ is outputted from the inverse dynamics calculation means 124, and the torque current value $\tau$ is measured by the torque sensor 7. The driving torque error compensation means 125 outputs a torque error correction pressure difference $\Delta P_\tau$ in the form of the driving force error compensation information so as to compensate the driving torque error.

The reference numeral 115 designates a pressure difference error compensation means which is an example of the internal state error correction means 1106. A value (pressure difference error $\Delta P_e$), in which the current pressure difference $\Delta P$ is subtracted from the torque error correction pressure difference $\Delta P_\tau$, is inputted to the pressure difference error compensation means 115. The torque error correction pressure difference $\Delta P_\tau$ is outputted from the driving torque error compensation means 125, and the current pressure difference $\Delta P$ is outputted from the pressure difference calculation means 113. The pressure difference error compensation means 115 outputs a pressure difference error correction output u to the robot arm 10A so as to correct the error of the internal pressure state. The pressure difference error correction output u is applied in the form of the voltage instruction values to the respective five-port flow rate control solenoid valves 18 through the D/A board 20, and normal and reverse rotations at each joint axis 6 are performed to operate the robot arm 10A.

A principle of the control operation concerning the control apparatus having the above configuration will be described below.

The basic of the control operation is the feedback control (position control) of the hand position/orientation error $r_e$ performed by the position error compensation means 112. For example, when the PID compensator is used as the position error compensation means 112, the control is performed such that the hand position/orientation error $r_e$ is converged to zero, and thereby the desired operation of the robot arm 10A is realized.

The dynamic influence such as the inertial force and the centrifugal force which is generated in the robot arm 10A is compensated by arranging the inverse dynamics calculation means 124. Therefore, even if the direct-drive-wise driving method in which the speed reducer is not used in driving the joint is adopted like the robot arm 10A shown in FIG. 16, the operation can be realized with high accuracy.

However, a mechanism which generates the desired torque as the joint driving force by the elastic actuator 1 is required in order to effectively compensate the dynamic influence with the inverse dynamics calculation means 124.

Means for resolving the issue is the torque feedback control performed by the driving torque error compensation means 125. The torque error $\tau_e$ between the position error correction torque $\tau_p$ and the torque current value $\tau$ measured by the torque sensor 7 is inputted to the driving torque error compensation means 125. The driving torque error compensation means 125 operates such that the torque error $\tau_e$ becomes zero. That is, the driving torque error compensation means 125 correctly realizes the position error correction torque $\tau_p$ which is the torque necessary to correct the position error, and thereby the dynamic influence is effectively compensated by the inverse dynamics calculation means 124.

However, when the robot arm 10A is driven by the elastic actuator such as the actuator 1 operated by the fluid of air or the like as shown in FIG. 16, the responsivity is worsened due to the elastic factors of the elastic actuator 1, namely, due to the fluid compressibility and influence of channel resistance, and the control cannot accurately be performed only by the torque feedback control.

Means for resolving the issue is the feedback control of the pressure difference $\Delta P$ performed by the pressure difference error compensation means 115. Since the torque error correction output $\Delta P_\tau$ is inputted to the pressure difference error compensation means 115 from the driving torque error compensation means 125, when the torque error $\tau_e$ is generated, the pressure difference error compensation means 115 is operated to perform the control of the pressure difference such that the torque error $\tau_e$ is converged to zero. Accordingly, like the control system shown in FIG. 17, the internal pressure feedback loop for controlling the pressure difference is configured inside a torque feedback loop for performing the torque control, which allows the poor responsivity to be compensated to realize the improvement of torque control performance.

Figure 18:
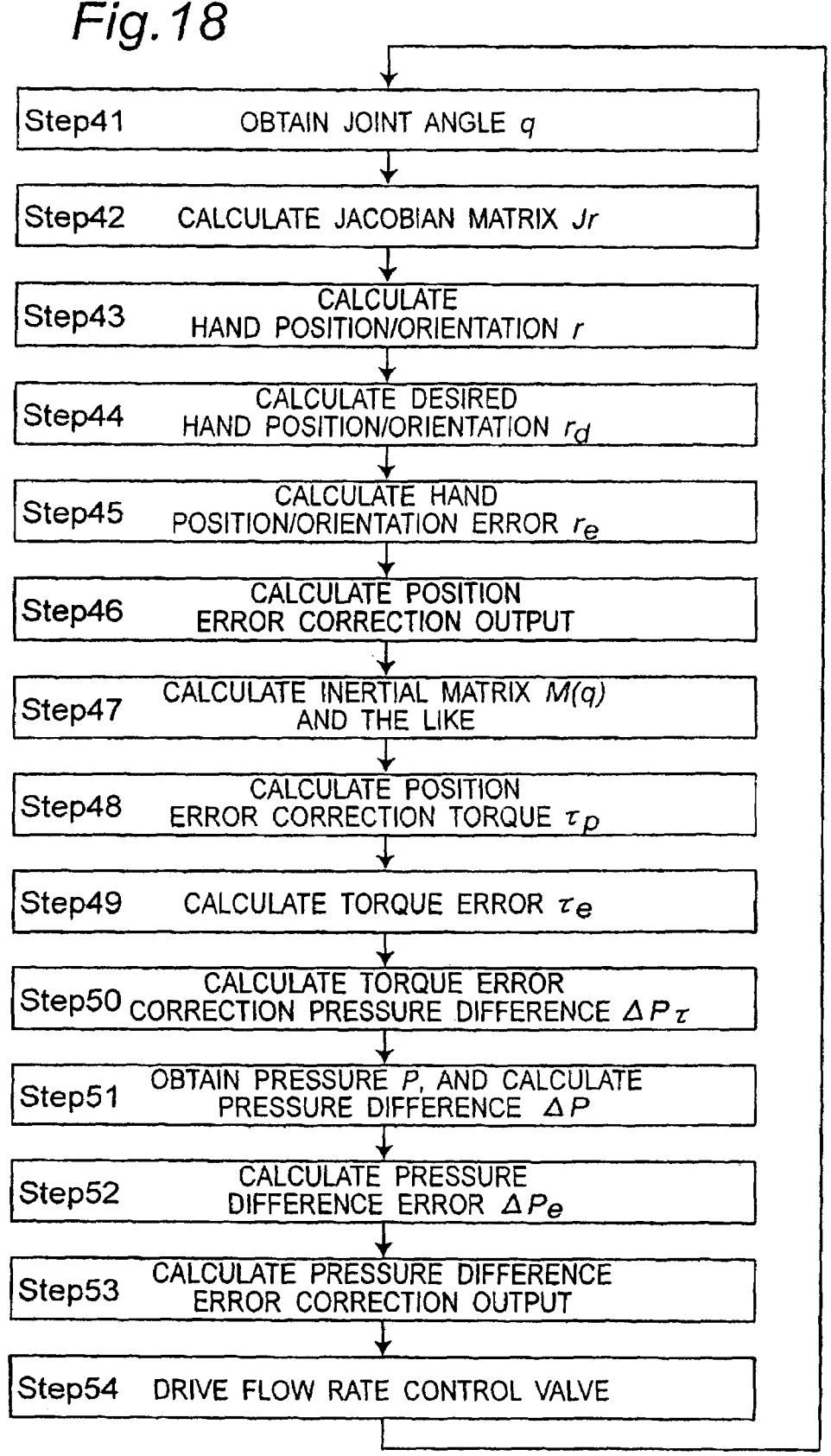
FIG. 18 is a flowchart showing actual operation steps of a control program of the elastic actuator drive-type movable mechanism control apparatus according to the fourth embodiment of the present invention.

Actual operation steps of a control program based on the above principle will be described below with reference to a flowchart of FIG. 18.

In step 41, the joint angle data (joint variable vector or joint angle vector q) measured by the encoder 8 for each joint axis of the robot arm 10A is captured in the control apparatus.

In step 42, the inverse dynamics calculation means 124 performs the calculations of the Jacobian matrix $J_r$ and the like necessary to the kinematic calculation of the robot arm 10A. Next, in step 43, the forward kinematic calculation means 121 calculates the current hand position/orientation vector r of the robot arm 10A from the joint angle data (joint angle vector q) from the robot arm 10A (process in the forward kinematic calculation means 121).

Next, in step 44, the desired track calculation means 111 calculates the hand position/orientation-desired vector $r_d$ of the robot arm 10A based on the operation program of the robot arm 10A, which is previously stored in the memory 19a of the control computer 19 of the control apparatus.

Next, in step 45, the hand position/orientation error $r_e$ which is the difference between the hand position/orientation-desired vector $r_d$ and the current hand position/orientation vector r is calculated. Next, in step 46, the position error compensation means 112 calculates the position error correction output $u_p$ from the hand position/orientation error $r_e$ (process in the position error compensation means 112).

The PID compensator can be cited as a specific example of the position error compensation means 112. In the case of the PID compensator, in step 46, the total value of three values of the value in which the hand position/orientation error $r_e$ is multiplied by the proportion gain, the value in which the differentiation value of the hand position/orientation error $r_e$ is multiplied by the differentiation gain, and the value in which the integration value of the hand position/orientation error $r_e$ is multiplied by the integration gain becomes the position error correction output $u_p$. The control is performed such that the position error is converged to zero by properly adjusting the three gains of the proportion, differentiation, and integration gains which are of the constant diagonal matrix.

Next, in step 47, the inertial matrix M(q), the centrifugal force and Coriolis force term expressed by the following expression (4):

$$h(q,\dot{q}) \tag{4}$$

and the gravity term g(q) which are necessary for the dynamics calculation are calculated. Next, in step 48, the position error correction torque $\tau_p$ is calculated using the above equation (2) (process in the inverse dynamics calculation means 24).

Next, in step 49, the torque error $\tau_e$ is calculated by subtracting the measurement value $\tau$ of the torque sensor 7 from the position error correction torque $\tau_p$.

Next, in step 50, the driving torque error compensation means 125 calculates the torque error correction pressure difference $\Delta P_\tau$ from the torque error $\tau_e$ (process in the driving torque error compensation means 125). The PID compensator can be cited as a specific example of the driving torque error compensation means 125. In the case of the PID compensator, in step 50, the total value of three values of the value in which the torque error $\tau_e$ is multiplied by the proportion gain, the value in which the differentiation value of the torque error $\tau_e$ is multiplied by the differentiation gain, and the value in which the integration value of the torque error $\tau_e$ is multiplied by the integration gain becomes the torque error correction pressure difference $\Delta P_\tau$.

Next, in step 51, the control apparatus captures each internal pressure value of the elastic actuator 1 measured by the pressure sensor 9 which is an example of the internal state measurement means 1107, and the pressure difference calculation means 113 calculates the current pressure difference $\Delta P$ between the internal pressures of the elastic actuators 1 to which the antagonistic driving is performed.

Next, in step 52, the pressure difference error compensation means 115 calculates the pressure difference error $\Delta P_e$ in which the current pressure difference $\Delta P$ is subtracted from the torque error correction pressure difference $\Delta P_\tau$. The torque error correction pressure difference $\Delta P_\tau$ is calculated by the driving torque error compensation means 125 in step 50, and the current pressure difference $\Delta P$ is calculated by the pressure difference calculation means 113 in step 51 (process in the pressure difference error compensation means 115). Then, in step 53, the pressure difference error compensation means 115 calculates the pressure difference error correction output u from the pressure difference error $\Delta P_e$ (process in the pressure difference error compensation means 115). The PID compensator can be cited as an example of the pressure difference error compensation means 115.

Next, in step 54, the pressure difference error correction output u is applied from the pressure difference error compensation means 115 to the robot arm 10A. Specifically, the pressure difference error correction output u is applied to each flow rate control valve 18 through the D/A board 20 in the control computer 19 of the robot arm 10A, and each flow rate control valve 18 changes the pressure in each elastic actuator 1 to generate the normal and reverse rotation motion at each joint axis of the robot arm 10A.

The control of the operation of the robot arm 10A is realized by repeatedly performing steps 41 to 54 as the control calculation loop.

Thus, with the control apparatus according to the fourth embodiment, the driving torque error compensation means 125 is arranged (actually the driving torque error compensation means 125 is described as a part of the control program and executed by the control computer) to form the torque feedback control system in which the driving torque generated by the elastic actuator drive-type movable mechanism 1102 is fed back, and the pressure difference error compensation means 115 is further arranged between the driving torque error compensation means 125 and the elastic actuator drive-type movable mechanism 1102 to form the internal pressure control system which performs the feedback of the internal state of each elastic expansion/contraction structural member 1 of the elastic actuator drive-type movable mechanism 1102. Therefore, the robot arm 10A can be controlled with good responsivity, low dynamic influence, and high accuracy.

With the control method according to the fourth embodiment, the driving torque error compensation means 125 is arranged to form the torque feedback control system in which the driving torque generated by the elastic actuator drive-type movable mechanism 1102 is fed back, and the pressure difference error compensation means 115 is further arranged between the driving torque error compensation means 125 and the elastic actuator drive-type movable mechanism 1102 to form the internal pressure control system which performs the feedback of the internal state of each elastic expansion/contraction structural member 1 of the elastic actuator drive-type movable mechanism 1102. Therefore, the robot arm 10A can be controlled with good responsivity, low dynamic influence, and high accuracy.

FIFTH EMBODIMENT

Figure 19:
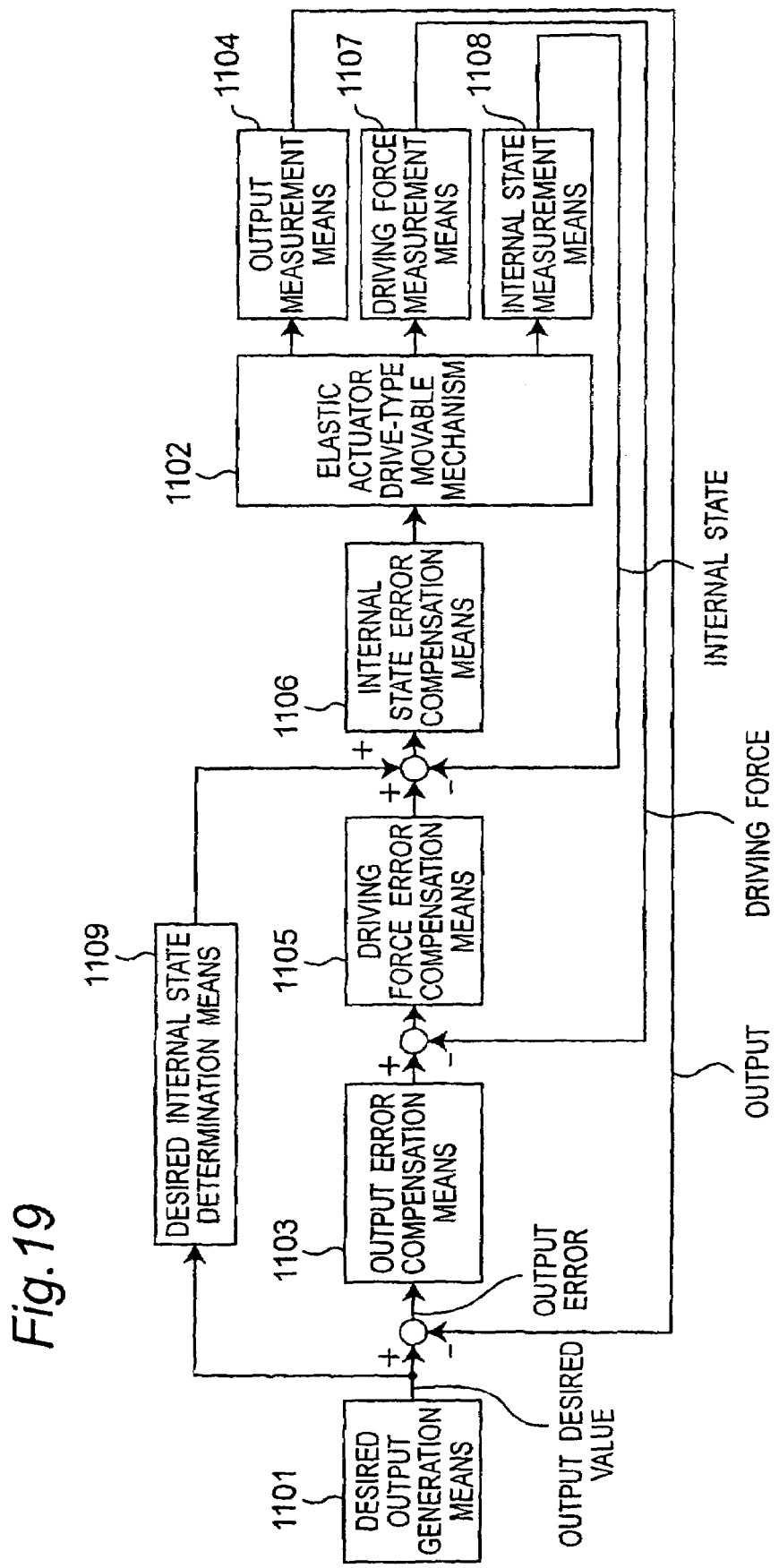
FIG. 19 is a block diagram showing a concept of an elastic actuator drive-type movable mechanism control apparatus according to a fifth embodiment of the present invention.

FIG. 19 is a block diagram showing a concept of an elastic actuator drive-type movable mechanism control apparatus according to a fifth embodiment of the present invention. In FIG. 19, the reference numeral 1101 designates the desired output generation means, and the desired output generation means 1101 generates the output desired values of the elastic actuator drive-type movable mechanism 1102 which is driven by the elastic actuator 1. Examples of the output desired value include the displacement and the generating force. The reference numeral 1104 designates the output measurement means connected to the elastic actuator drive-type movable mechanism 1102. The output measurement means 1104 measures the measurement value of the output of the elastic actuator drive-type movable mechanism 1102 to input the measurement value to an output error compensation means 1103. The reference numeral 1103 designates the output error compensation means. The output error between the output desired value from the desired output generation means 1101 and the output measurement value from the output measurement means 1104 is inputted to the output error compensation means 1103, and the output error compensation means 1103 outputs the output error compensation information. The output error compensation means 1103 outputs the output error compensation information so as to compensate the output error, thereby performing control which allows the output measurement value of the elastic actuator drive-type movable mechanism 1102 measured by the output measurement means 1104 to be caused to follow the desired value. The reference numeral 1105 designates the driving force error compensation means for compensating the error of the driving force generated by the elastic actuator 1. The difference between the output of the output error compensation information from the output error compensation means 1103 and the driving force measured by the driving force measurement means 1107 connected to the elastic actuator drive-type movable mechanism 1102 is inputted to the driving force error compensation means 1105, and the driving force error compensation means 1105 outputs the driving force error compensation information so as to compensate the driving force error. The reference numeral 1109 designates a desired internal state determination means to which the output desired value generated by the desired output generation means 1101 is inputted. The desired internal state determination means 1109 determines the internal state desired value of the elastic actuator 1 of the elastic actuator drive-type movable mechanism 1102 from the output desired value. The reference numeral 1106 designates the internal state error compensation means. The difference between the sum of the driving force error compensation information outputted from the driving force error compensation means 1105 and the output information outputted from the desired internal state determination means 1109 and the internal state measurement value outputted from the internal state measurement means 1108 is inputted to the internal state error compensation means 1106, and the internal state error compensation means 1106 outputs the internal state error compensation information. The output information of the internal state error compensation information from the internal state error compensation means 1106 is inputted to each elastic actuator 1 of the elastic actuator drive-type movable mechanism 1102 to perform the control such that the internal state measurement value of each elastic actuator 1 is caused to follow the desired value. The reference numeral 1108 designates the internal state measurement means connected to each elastic actuator 1 of the elastic actuator drive-type movable mechanism 1102. The internal state measurement means 1108 measures the internal state measurement value which is the internal pressure of each elastic actuator 1, and inputs the internal state measurement value to the internal state error compensation means 1106.

A specific example of the apparatus for controlling the elastic actuator drive-type movable mechanism 1102 of the fifth embodiment will be described below while the control apparatus of the robot arm 10A which is an example of the elastic actuator drive-type movable mechanism 1102 is taken as an example of the control object. The details of the robot arm 10A are similar those of the fourth embodiment, so that the description will be omitted.

Figure 20:
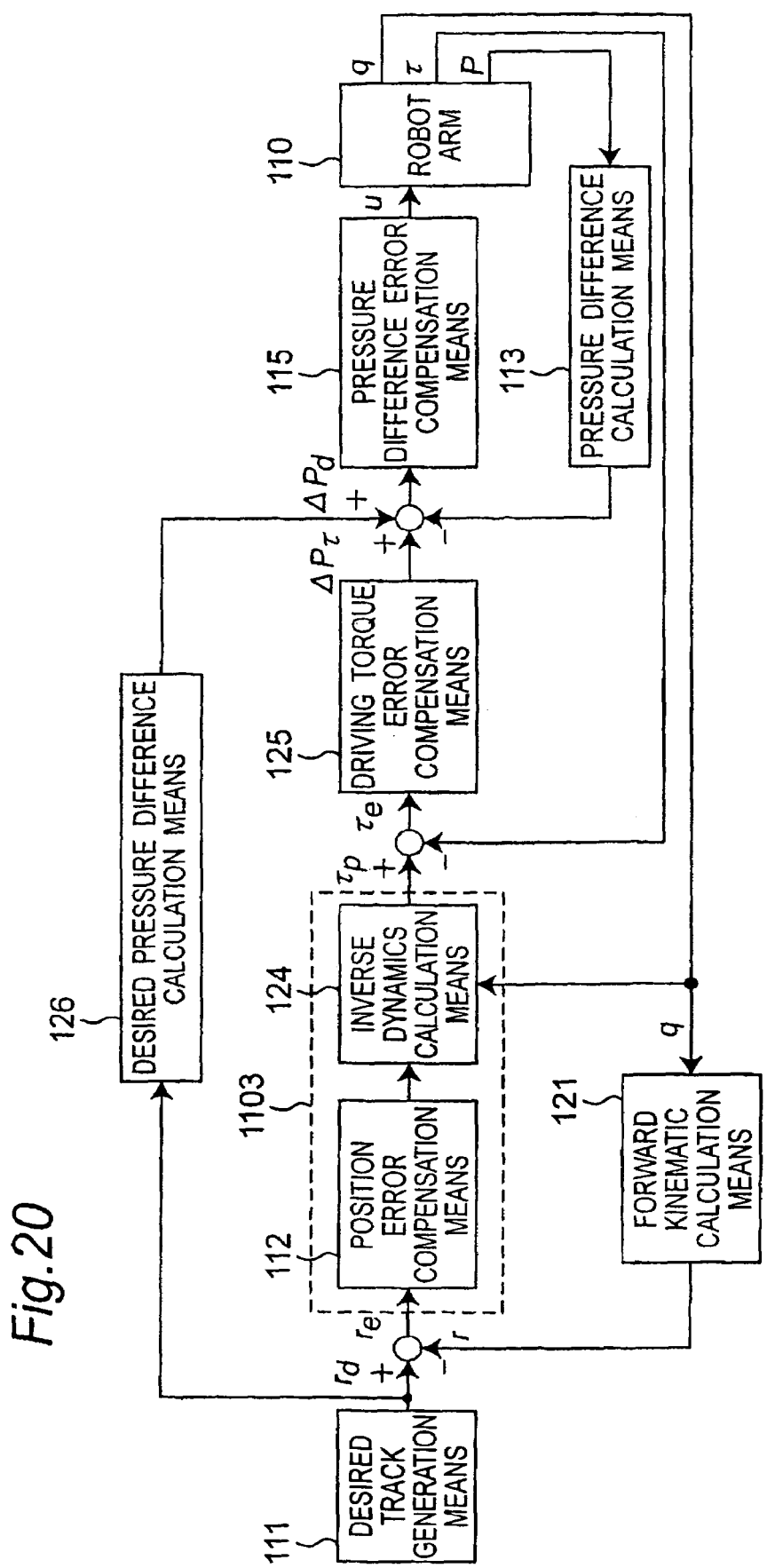
FIG. 20 is a view showing a structure of the elastic actuator drive-type movable mechanism control apparatus according to the fifth embodiment of the present invention.

FIG. 20 is a view specifically showing the configuration of the apparatus for controlling the elastic actuator drive-type movable mechanism 1102 according to the fifth embodiment of the present invention.

In FIG. 20, the reference numeral 126 designates a desired pressure difference determination means which is an example of the desired internal state determination means 1109. The desired joint angle vector $q_d$ outputted from the desired track generation means 111 is inputted to the desired pressure difference calculation means 126, and the desired pressure difference calculation means 126 calculates the desired pressure difference (desired value of pressure difference) $\Delta P_d = [\Delta P_{1d}, \Delta P_{2d}, \Delta P_{3d}, \Delta P_{4d}, \Delta P_{5d}, \Delta P_{6d}]^T$ from the desired joint angle vector $q_d$ to output the desired value of the pressure difference to a pressure difference error compensation means 115. Herein, $\Delta P_{1d}$, $\Delta P_{2d}$, $\Delta P_{3d}$, $\Delta P_{4d}$, $\Delta P_{5d}$, and $\Delta P_{6d}$ are the desired values of the pressure differences between the elastic expansion/contraction structural members 1-1a and 1-1b, the elastic expansion/contraction structural members 1-2a and 1-2b, the elastic expansion/contraction structural members 1-3a and 1-3b, the elastic expansion/contraction structural members 1-4a and 1-4b, the elastic expansion/contraction structural members 1-5a and 1-5b, and the elastic expansion/contraction structural members 1-6a and 1-6b, respectively.

The pressure difference error compensation means 115 is an example of the internal state error correction means 1106. The value (pressure difference error $\Delta P_e$), in which the torque error correction pressure difference $\Delta P_\tau$ is added to the desired pressure difference $\Delta P_d$ and the current pressure difference $\Delta P$ from the pressure difference calculation means 113 is subtracted, is inputted to the pressure difference error compensation means 115. The desired pressure difference $\Delta P_d$ is outputted from the desired pressure difference calculation means 126, and the torque error correction pressure difference $\Delta P_\tau$ is outputted from the driving torque error compensation means 1105. The pressure difference error compensation means 115 outputs the pressure difference error correction output u to the robot arm 10A so as to correct the internal pressure state error. The pressure difference error correction output u is applied in the form of the voltage instruction value to each five-port flow rate control solenoid valve 18 through the D/A board 20, and normal and reverse rotations at each joint axis 6 are performed to operate the robot arm 10A.

A principle of the control operation concerning the control apparatus having the above configuration will be described below.

The basic of the control operation is the feedback control (position control) of the hand position/orientation error $r_e$ performed by the position error compensation means 112. For example, when the PID compensator is used as the position error compensation means 112, the control is performed such that the hand position/orientation error $r_e$ is converged to zero, and thereby the desired operation of the robot arm 10A is realized.

The dynamic influence such as the inertial force and the centrifugal force which is generated in the robot arm 10A is compensated by arranging the inverse dynamics calculation means 124. Therefore, even if the direct-drive-wise driving method in which the speed reducer is not used in driving the joint is adopted like the robot arm 10 of the first embodiment shown in FIG. 2, the operation can be realized with good accuracy.

However, the mechanism which generates the desired torque as the joint driving force by the elastic actuator 1 is required in order to effectively compensate the dynamic influence with the inverse dynamics calculation means 124.

Means for resolving the issue is the torque feedback control performed by the driving torque error compensation means 125. The torque error $\tau_e$ which is a difference between the position error correction torque $\tau_p$ and the torque current value $\tau$ measured by the torque sensor 7 is inputted to the driving torque error compensation means 125. The driving torque error compensation means 125 operates such that the torque error $\tau_e$ becomes zero. That is, the driving torque error compensation means 125 correctly realizes the position error correction torque $\tau_e$ which is the torque necessary to correct the position error, and thereby the dynamic influence is effectively compensated by the inverse dynamics calculation means 124.

However, for example, when the robot arm 10 is driven by the elastic actuator such as the actuator operated by the fluid of air or the like as shown in FIG. 2, the responsivity is worsened due to the elastic factors of the elastic actuator, namely, due to the fluid compressibility and influence of channel resistance, and the control cannot accurately be performed only by the torque feedback control.

Means for resolving the issue is the feedback control of the pressure difference $\Delta P$ performed by the pressure difference error compensation means 115. Since the torque error correction output $\Delta P_\tau$ is inputted to the pressure difference error compensation means 115 from the driving torque error compensation means 125, when the torque error $\tau_e$ is generated, the pressure difference error compensation means 115 is operated to perform the control of the pressure difference such that the torque error $\tau_e$ is converged to zero, Accordingly, like the control system shown in FIG. 20, the internal pressure feedback loop for controlling the pressure difference is configured inside the torque feedback loop for performing the torque control, which allows the poor responsivity to be compensated to realize the improvement of torque control performance.

Although the responsivity is improved only by providing the pressure difference error compensation means 115, the issue that positioning accuracy cannot be improved due to the generation of position steady-state deviation still may remain. This is attributed to the fact that the pressure difference necessary to realize the desired joint angle vector $q_d$ is not inputted to the pressure difference error compensation means 115 as the desired value.

Figure 21:
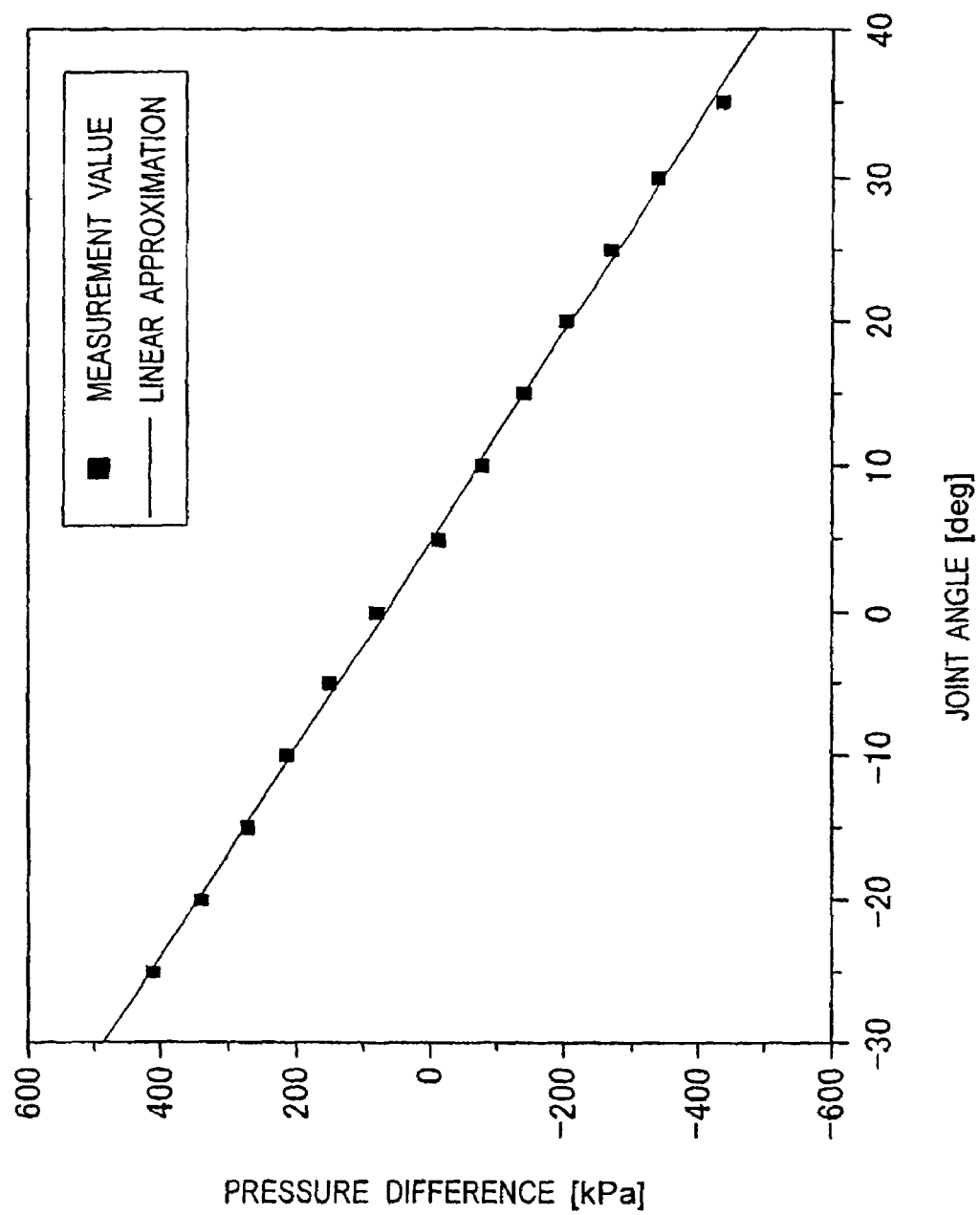
FIG. 21 is a view showing a relationship between the joint angle and the internal pressure difference in the antagonistic driving performed by the elastic expansion/contraction structural member of the elastic actuator according to the fifth embodiment of the present invention.

Means for resolving the issue is the desired pressure difference calculation means 126. In the case where normal and reverse rotations at the joint axis are performed by the antagonistic driving of the set of elastic expansion/contraction structural members 1 and 1 shown in FIG. 3, for example, the relationship between the joint angle and the internal pressure difference in the set of elastic expansion/contraction structural members 1 is shown in FIG. 21. FIG. 21 shows result in the case where the elastic expansion/contraction structural member (McKibben type pneumatic artificial muscle) having the total length of 250 mm and an inner diameter of 10 mm is used as one example. As shown in FIG. 21, the measurement result can be substantially approximated by a straight line. Accordingly, the following linear equation expressing the straight line can be used as the equation for calculating the desired pressure difference $\Delta P_d$.

$$\Delta P_d = A q_d + b \quad (5)$$

Herein, A and b are coefficients which can be determined by the measurement result of FIG. 21. Accordingly, the desired pressure difference calculation means 126 calculates the desired pressure difference $\Delta P_d$ from the desired joint angle vector $q_d$ using the equation (5), and the desired pressure difference $\Delta P_d$ is inputted to the pressure difference error compensation means 115, which allows the high accuracy position control to be realized with small steady-state deviation.

Figure 22:
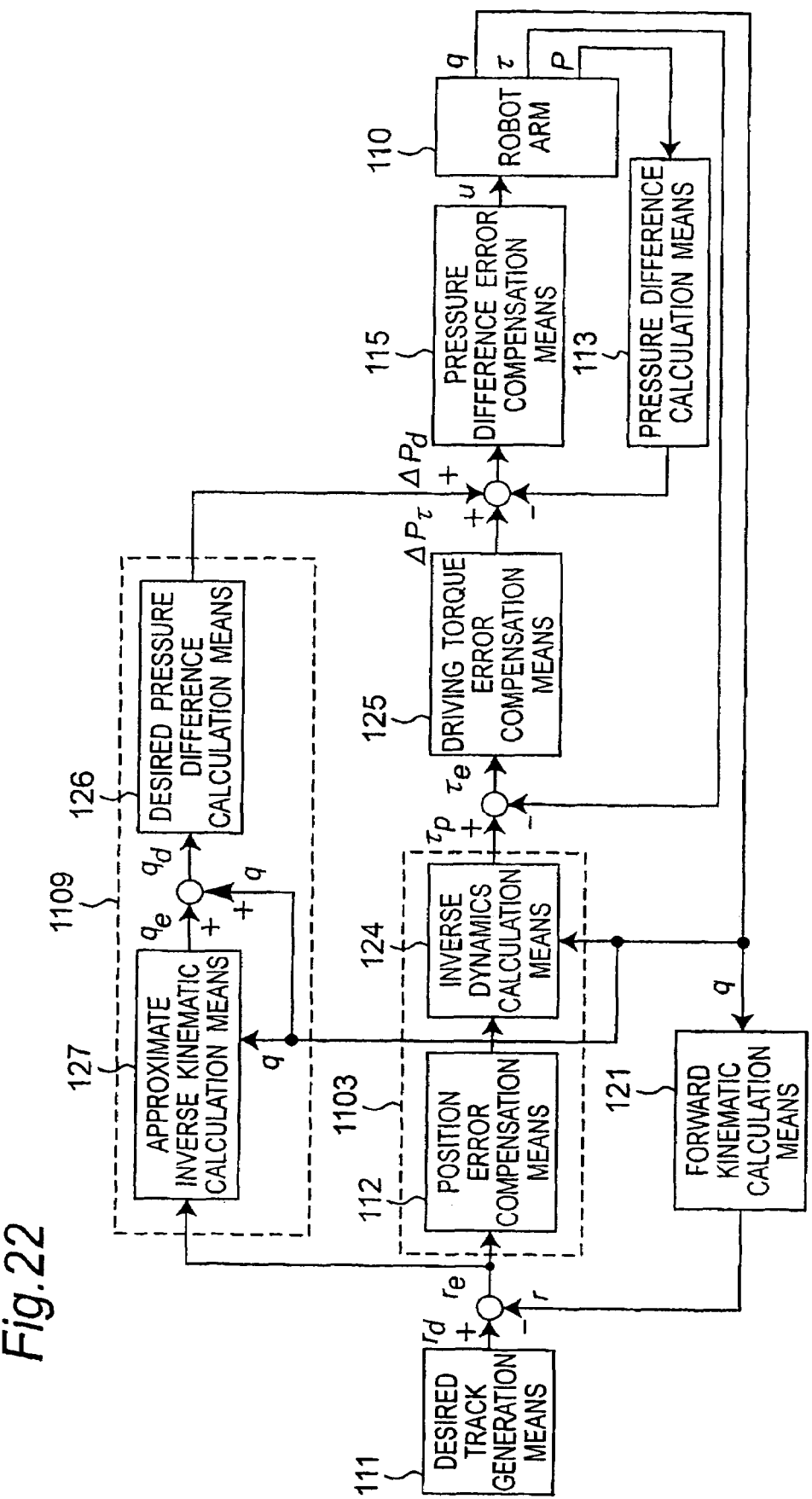
FIG. 22 is a view showing another structure of the elastic actuator drive-type movable mechanism control apparatus according to the fifth embodiment of the present invention.

FIG. 22 is a view showing another structure of the elastic actuator drive-type movable mechanism control apparatus according to the fifth embodiment of the present invention.

In the control apparatus of FIG. 22, the desired internal state determination means 1109 which is an example different from FIG. 20 includes the desired pressure difference calculation means 126 and the approximate inverse kinematic calculation means 127. The error $r_e$ between the hand position/orientation vector r and the hand position/orientation-desired vector $r_d$, and the joint angle vector current value q are inputted to the approximate inverse kinematic calculation means 127. The hand position/orientation vector r is calculated by the forward kinematic calculation means 121 from the joint angle vector current value q measured in the robot arm 10A, and the hand position/orientation-desired vector $r_d$ is outputted from the desired track generation means 111. The approximate inverse kinematic calculation means 127 approximately calculates the joint angle vector error $q_e$ from the calculation equation of $q_e = J_r^{-1} r_e$ using the error $r_e$ and the Jacobian matrix $J_r$ calculated from the joint angle vector current value q. $q_d = q + J_r(q)^- r_e$ is inputted to the desired pressure difference calculation means 126 as the desired joint angle vector $q_d$ based on addition of the joint angle vector current value q measured in the robot arm 10A and the joint angle vector error $q_e$ calculated by the approximate inverse kinematic calculation means 127. The desired pressure difference calculation means 126 calculates the desired pressure difference (desired value of pressure difference) $\Delta P_d = [\Delta P_{1d}, \Delta P_{2d}, \Delta P_{3d}, \Delta P_{4d}, \Delta P_{5d}, \Delta P_{6d}]^T$ from the desired joint angle vector $q_d$ to output the desired value of the pressure difference to the pressure difference error compensation means 115.

Even in the configuration shown in FIG. 22, similarly to the configuration of FIG. 20, the position control can be realized with small steady-state deviation and high accuracy by calculating the desired pressure difference $\Delta P_d$ to input the desired pressure difference $\Delta P_d$ to the pressure difference error compensation means 115.

Figure 26:
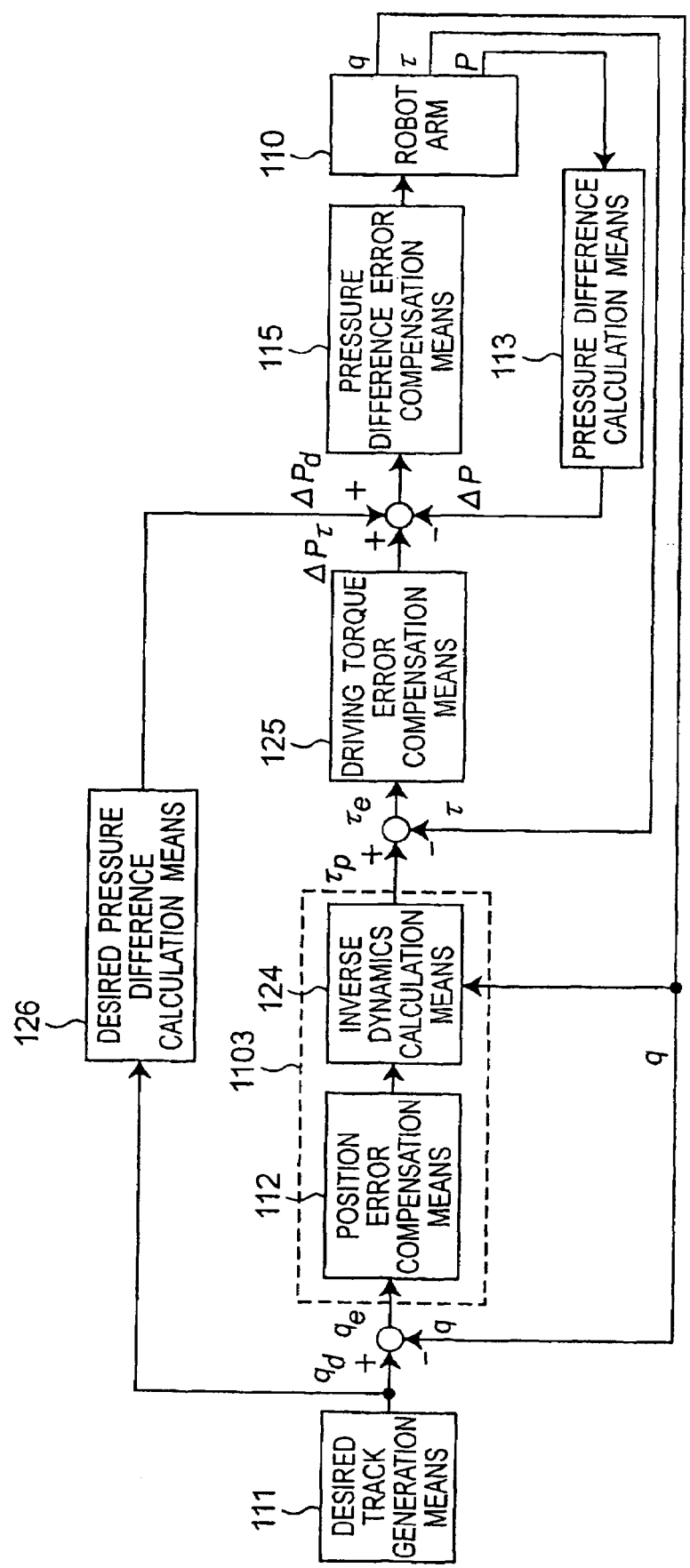
FIG. 26 is a block diagram showing a more specific configuration of the control apparatus of the fifth embodiment shown in FIG. 19.

FIG. 26 is a view showing still another configuration of the elastic actuator drive-type movable mechanism control apparatus according to the fifth embodiment of the present invention.

The control apparatus shown in FIG. 26 differs from the control apparatus shown in FIG. 20 which is a specific example of the control apparatus of FIG. 19 in the following points. That is, the desired track generation means 111 outputs the desired joint angle vector $q_d$, the forward kinematic calculation means 121 is removed, the joint angle vector q is fed back, the joint angle vector error $q_e$ which is the difference between the desired joint angle vector $q_d$ and the joint angle vector q is inputted to the position error compensation means 112, and the desired joint vector $q_d$ is inputted to the desired pressure difference calculation means 126. Other configurations of the control apparatus of FIG. 26 are similar those of the control apparatus shown in FIG. 20. Therefore, according to the control apparatus shown in FIG. 26, the desired joint angle vector $q_d$ is applied, and thereby the control is performed such that the joint angle vector q becomes the desired joint angle vector $q_d$.

Figure 25:
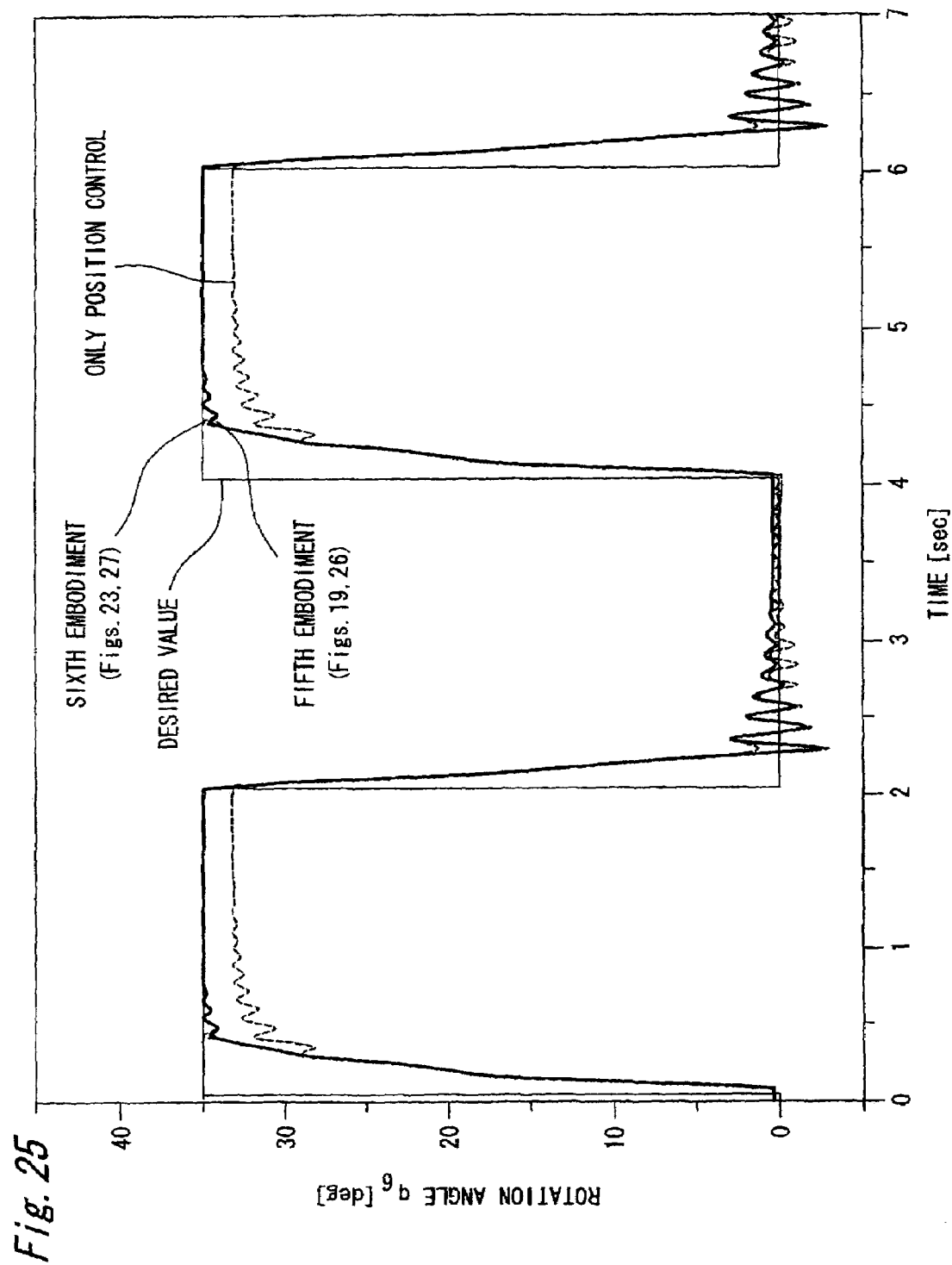
FIG. 25 is a view showing an experimental result in which performance is examined in the control apparatuses according to the fifth and sixth embodiments of the present invention.

FIG. 25 shows experimental result in which performance is examined in the control apparatus according to the present invention. In order to make it easy understand the effect as a result of the configuration of the control apparatus according to the present invention, the experimental result shown in FIG. 25 is the result in which the control apparatus shown in FIG. 26 performs operations at only the sixth joint 6-6 of the robot arm 10A shown in FIG. 2 to control a rotation angle $q_6$ of the sixth joint 6-6. In the elastic expansion/contraction structural member 1 which drives the sixth joint 6-6, the total length of the tubular elastic body 2 is set at 17 cm, and the inner diameter is set at 1 cm. A distance between the intersecting point of the joint axes 6-3 and 6-4 and the intersecting point of the joint axes 6-5 and 6-6 is set at 28 cm. A weight is added to the hand portion to set inertia moment about the joint axis 6-6 at 0.0045 kgm². The high-pressure air supplied from the air pressure source 16 is regulated to 0.6 MPa in pressure by the pneumatic adjustment unit 17, and the air is supplied to the five-port flow rate control solenoid valve 18.

The result shown by a solid line in FIG. 25 is the control result performed by the control apparatus of the fifth embodiment shown in FIG. 19, more specifically the control result performed by the control apparatus having the configuration shown in FIG. 26. The desired value is changed in a step manner between 0° and 35° at time intervals of 2 seconds.

Figure 28:
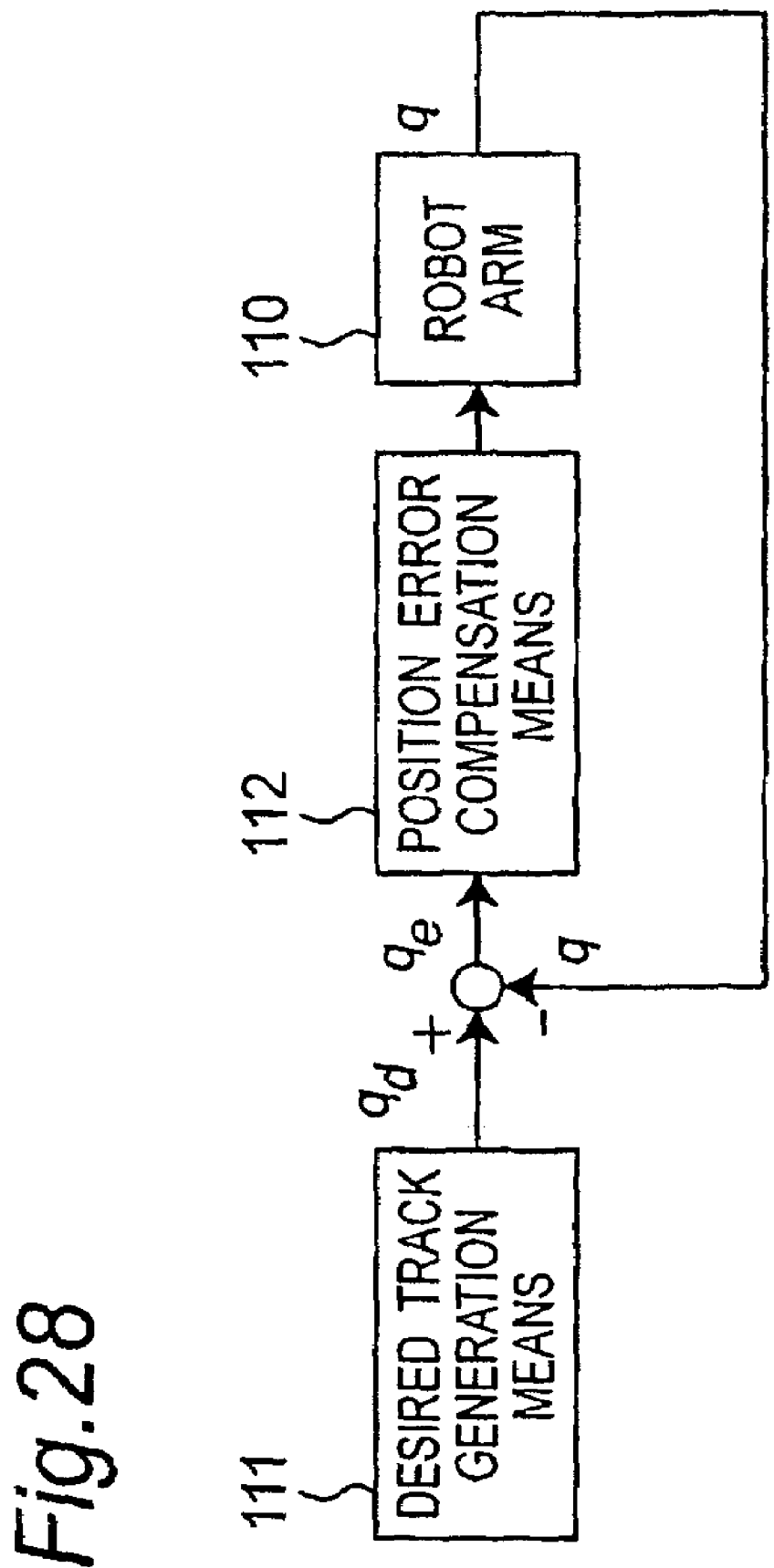
FIG. 28 is a block diagram showing a configuration of only the simple position control of the result shown by a broken line in FIG. 25.

On the other hand, the result shown by a broken line in FIG. 25 is the result in the case of only the simple position control. In the simple position control like the configuration of FIG. 28, the control is performed such that the joint angle vector error $q_e$ becomes zero. The joint angle vector error $q_e$ is the difference between the joint angle vector current value q outputted from the robot arm 10A and the desired joint angle vector $q_d$ outputted from the desired track generation means 111.

As can be seen from FIG. 25, with the configuration of the control apparatus according to the fifth embodiment, it is confirmed that the control accuracy is improved when compared with the case in which only the simple position control is performed.

Thus, with the control apparatus according to the fifth embodiment, the driving torque error compensation means 125 is arranged to form the torque feedback control system which performs the feedback of the driving torque generated by the elastic actuator drive-type movable mechanism 1102, the pressure difference error compensation means 115 is arranged between the elastic actuator drive-type movable mechanism 1102 and the driving torque error compensation means 125 to form the internal pressure control system which performs the feedback of the internal state of the elastic actuator drive-type movable mechanism 1102, and the desired pressure difference calculation means 126 is further arranged and the desired pressure difference is inputted between the driving torque error compensation means 125 and the pressure difference error compensation means 115 to perform the feedforward. Therefore, the robot arm 10A can be controlled with good responsivity, low dynamic influence, small steady-state deviation, and high accuracy.

Further, with the control method according to the fifth embodiment, the driving torque error compensation means 125 is arranged in the elastic actuator drive-type movable mechanism 1102 to form the torque feedback control system which performs the feedback of the driving torque generated by the elastic actuator drive-type movable mechanism 1102, the pressure difference error compensation means 115 is arranged between the elastic actuator drive-type movable mechanism 1102 and the driving torque error compensation means 125 to form the internal pressure control system which performs the feedback of the internal state of the elastic actuator drive-type movable mechanism 1102, and the desired pressure difference calculation means 126 is further arranged and the desired pressure difference is inputted between the driving torque error compensation means 125 and the pressure difference error compensation means 115 to perform the feedforward. Therefore, the robot arm 10A can be controlled with good responsivity, low dynamic influence, small steady-state deviation, and high accuracy.

In the control system of FIG. 22, the hand position/orientation error $r_e$ is inputted to the desired internal state determination means 1109. However, the error $r_e$ is the difference between the desired value and the measurement value, and the block diagram can be changed such that the error $r_e$ between the hand position/orientation vector r calculated from the joint angle vector current value q, measured in the robot arm 10A, by the forward kinematic calculation means 121 and the hand position/orientation-desired vector $r_d$ outputted from the desired track generation means 111 is inputted to an approximate inverse kinematic calculation means 123a. Therefore, there is no essential difference between the case where the desired value is inputted and the case where the error is inputted.

SIXTH EMBODIMENT

Figure 23:
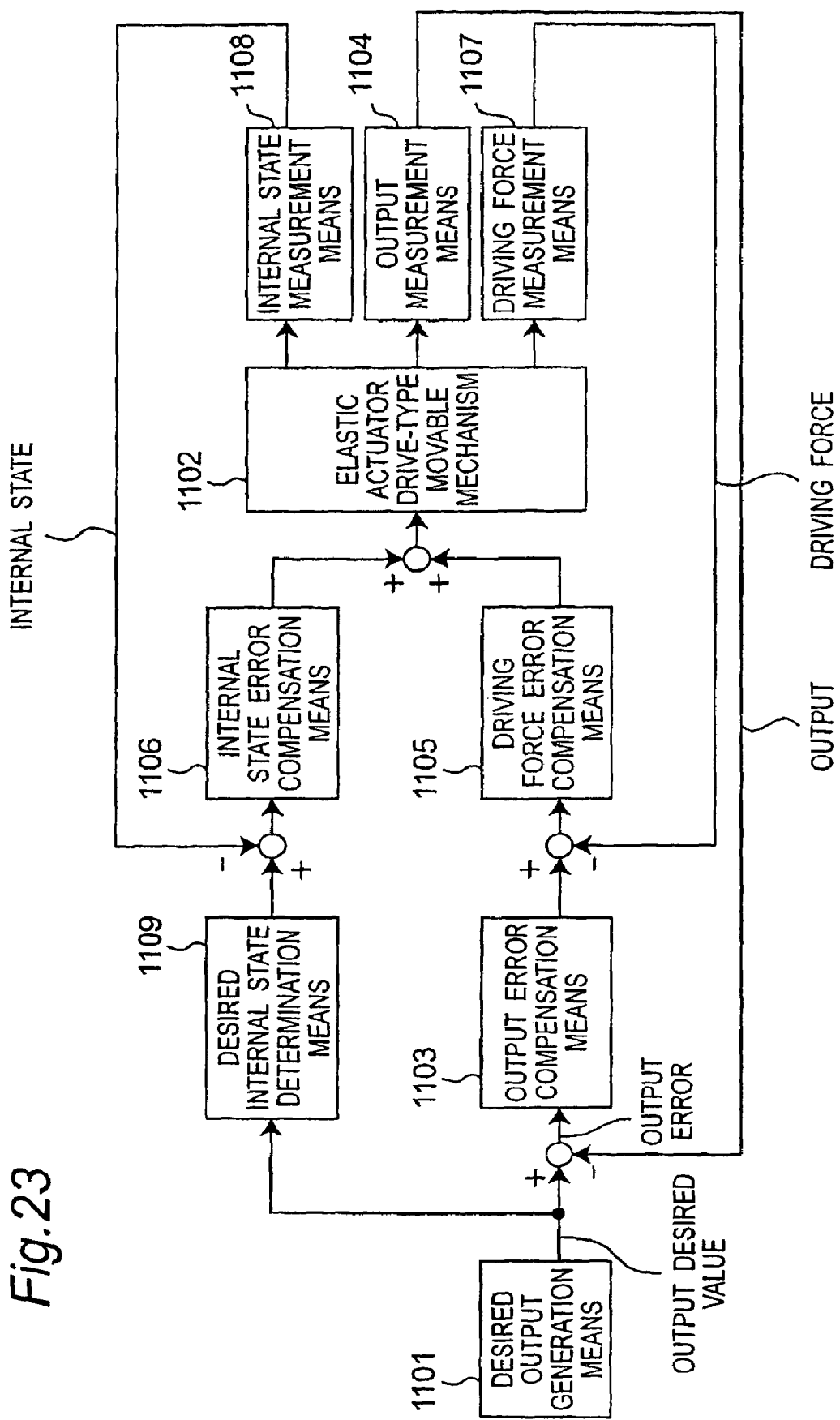
FIG. 23 is a block diagram showing a concept of an elastic actuator drive-type movable mechanism control apparatus according to a sixth embodiment of the present invention.

FIG. 23 is a block diagram showing a concept of an elastic actuator drive-type movable mechanism control apparatus according to a sixth embodiment of the present invention.

The constituent elements of the control apparatus of the elastic actuator drive-type movable mechanism 1102 according to the sixth embodiment shown in FIG. 23 are similar to those of the control apparatus of the elastic actuator drive-type movable mechanism 1102 according to the fifth embodiment shown in FIG. 19. However, the control apparatus of the sixth embodiment differs from the control apparatus of the fifth embodiment in the input and output relations. In the control apparatus of FIG. 23, the loop in which the internal state is fed back to the internal state error compensation means 1106 is not located inside the loop in which the driving force is fed back to the driving force error compensation means 1105, but is independently provided to form the configuration in which the elastic actuator drive-type movable mechanism 1102 is driven by the signal, in which the output of the internal state error compensation information from the internal state error compensation means 1106 and the output of the driving force error compensation information from the driving force error compensation means 1105 are added.

A specific example of the control apparatus of the elastic actuator drive-type movable mechanism 1102 of the sixth embodiment will be described below while the control apparatus of the robot arm 10A which is an example of the elastic actuator drive-type movable mechanism 1102 is taken as the control object. The details of the robot arm 10A are similar to those of the fourth embodiment, so that the detailed description will be omitted.

Figure 24:
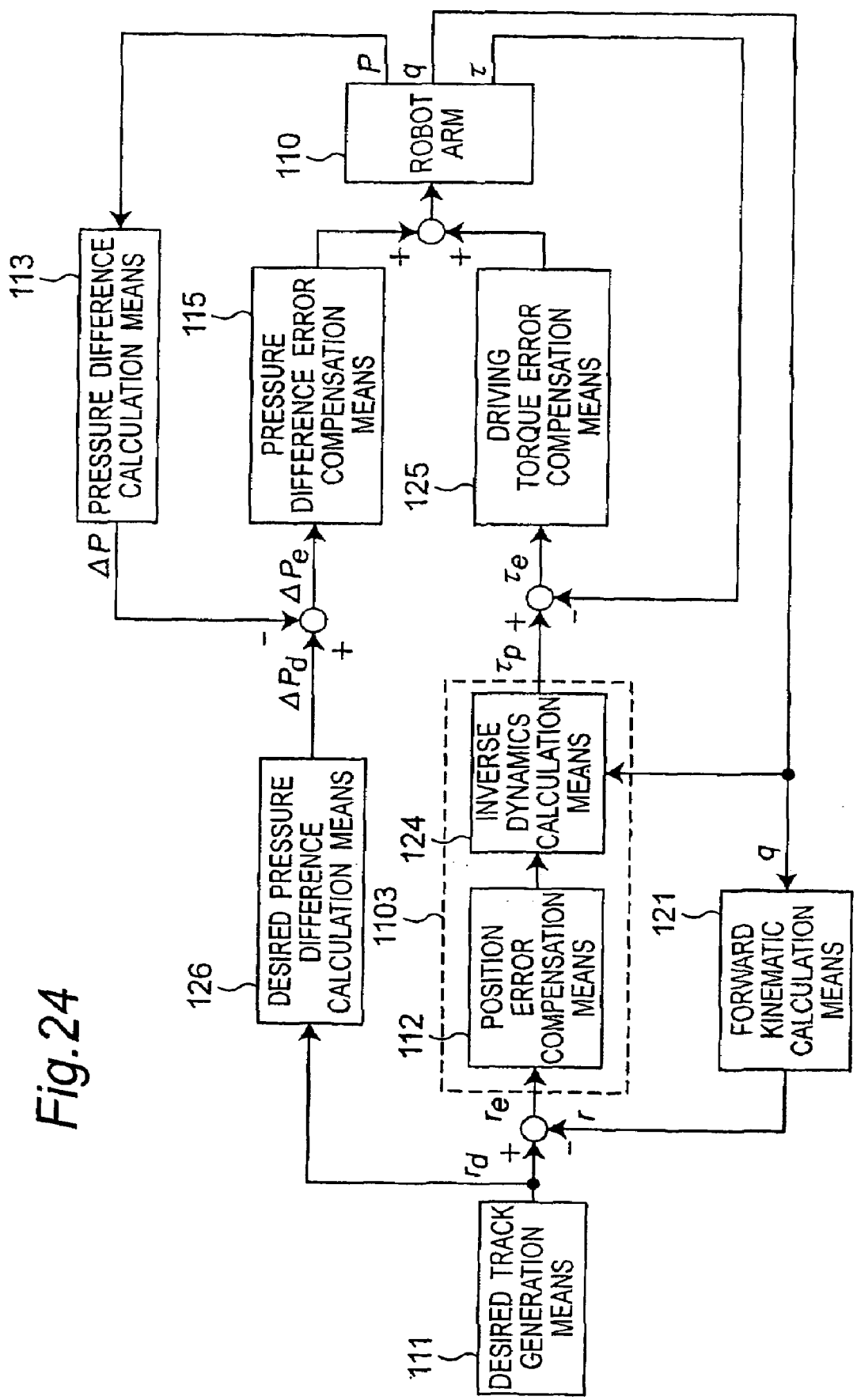
FIG. 24 is a view showing a structure of the elastic actuator drive-type movable mechanism control apparatus according to the sixth embodiment of the present invention.

FIG. 24 is a view showing more specifically the structure of the elastic actuator drive-type movable mechanism control apparatus according to the sixth embodiment of the present invention. In the control apparatus shown in FIG. 24, a signal in which the output of the pressure difference error compensation means 115 and the output of the driving torque error correction means are added is inputted to the robot arm 10A.

According to the above configuration, for example, the desired pressure difference calculation means 126 calculates the desired pressure difference $\Delta P_d$ from the desired joint angle vector $q_d$ using the equation (5), and the desired pressure difference calculation means 126 inputs the desired pressure difference $\Delta P_d$ to the pressure difference error compensation means 115. Therefore, similarly to the control apparatus of the fifth embodiment, the position control can be performed with small steady-state deviation, and high accuracy.

Figure 27:
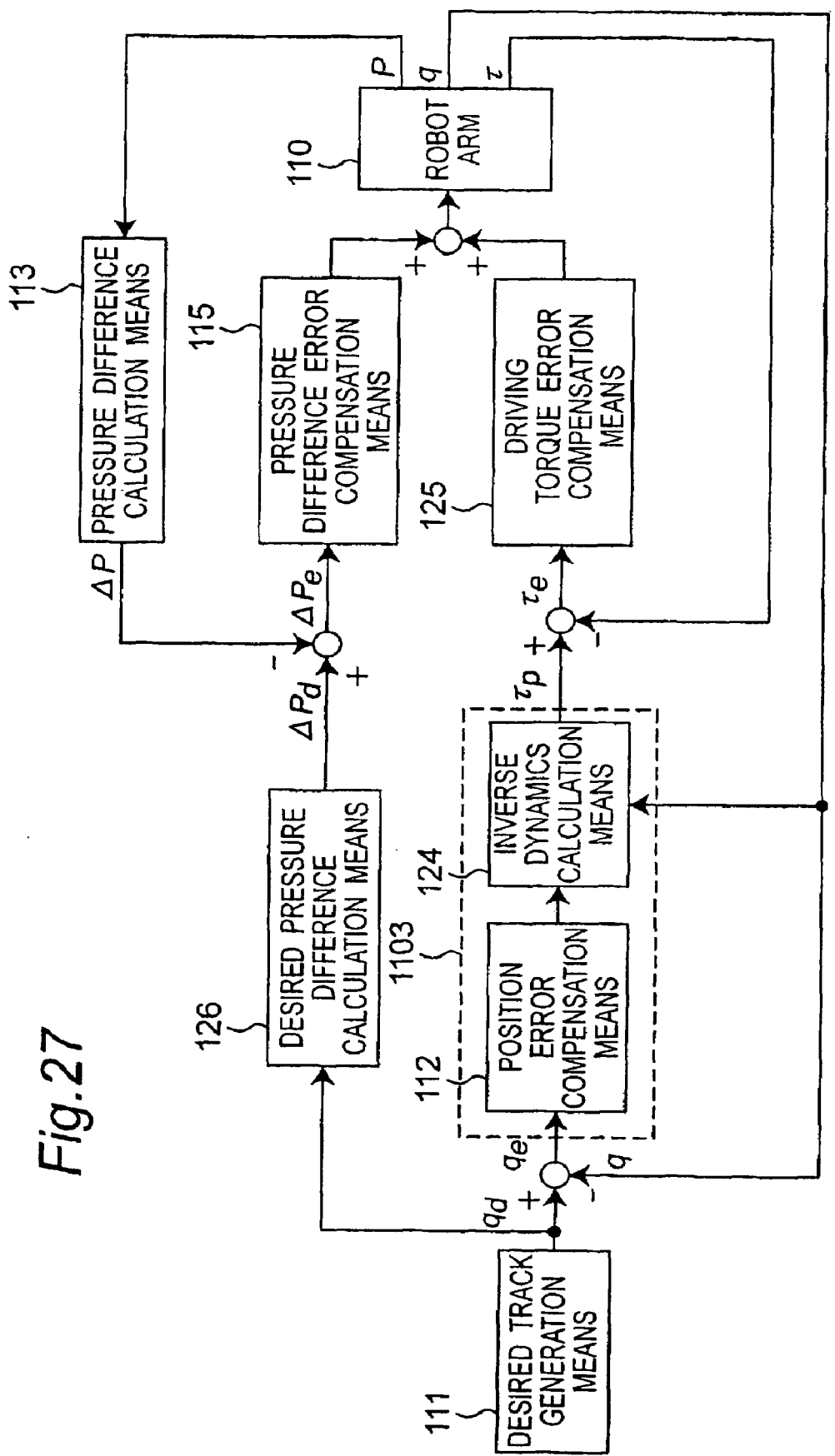
FIG. 27 is a block diagram showing a more specific configuration of the control apparatus of the sixth embodiment shown in FIG. 23.

FIG. 27 is a view showing yet another configuration of the elastic actuator drive-type movable mechanism control apparatus according to the sixth embodiment of the present invention.

The control apparatus shown in FIG. 27 differs from the control apparatus shown in FIG. 24 which is a specific example of the control apparatus of FIG. 23 in the following points. That is, the desired track generation means 111 outputs the desired joint angle vector $q_d$, the forward kinematic calculation means 121 is removed, the joint angle vector q is fed back, the joint angle vector error $q_e$ which is the difference between the desired joint angle vector $q_d$ and the joint angle vector q is inputted to the position error compensation means 112, and the desired joint vector $q_d$ is inputted to the desired pressure difference calculation means 126. Other configurations of the control apparatus of FIG. 27 are similar those of the control apparatus shown in FIG. 24. Therefore, according to the control apparatus shown in FIG. 27, the desired joint angle vector $q_d$ is applied, and thereby the control is performed such that the joint angle vector q becomes the desired joint angle vector $q_d$.

FIG. 25 shows the experimental result in which the performance is examined in the control apparatus according to the present invention. The detailed experiment is described in the fifth embodiment, so that the description will be omitted.

The result shown by an alternate long and short dash line in FIG. 25 is the control result performed by the control apparatus of the sixth embodiment shown in FIG. 23, more specifically the control result performed by the control apparatus having the configuration shown in FIG. 27.

As can be seen from FIG. 25, according to the configuration of the control apparatus of the sixth embodiment, similarly to the control apparatus of the fifth embodiment, it is confirmed that the control accuracy is improved when compared with the case in which only the simple position control is performed.

Thus, with the control apparatus according to the sixth embodiment, the driving torque error compensation means 125 is arranged in the elastic actuator drive-type movable mechanism 1102 to form the torque feedback control system which performs the feedback of the driving torque generated by the elastic actuator drive-type movable mechanism 1102, the desired pressure difference calculation means 126 and the pressure difference error compensation means 115 are arranged in the elastic actuator drive-type movable mechanism 1102 independently of the driving torque error compensation means 125 to form the pressure control system which performs the feedback of the internal state of the elastic actuator drive-type movable mechanism 1102 independently of the torque feedback control system. Therefore, the robot arm 10A can be controlled with good responsivity, low dynamic influence, small steady-state deviation, and high accuracy.

Further, with the control method according to the sixth embodiment, the driving torque error compensation means 125 is arranged in the elastic actuator drive-type movable mechanism 1102 to form the torque feedback control system which performs the feedback of the driving torque generated by the elastic actuator drive-type movable mechanism 1102, the desired pressure difference calculation means 126 and the pressure difference error compensation means 115 are arranged in the elastic actuator drive-type movable mechanism 1102 independently of the driving torque error compensation means 125 to form the pressure control system which performs the feedback of the internal state of the elastic actuator drive-type movable mechanism 1102 independently of the torque feedback control system. Therefore, the robot arm 10A can be controlled with good responsivity, low dynamic influence, small steady-state deviation, and high accuracy.

SEVENTH EMBODIMENT

Figure 29:
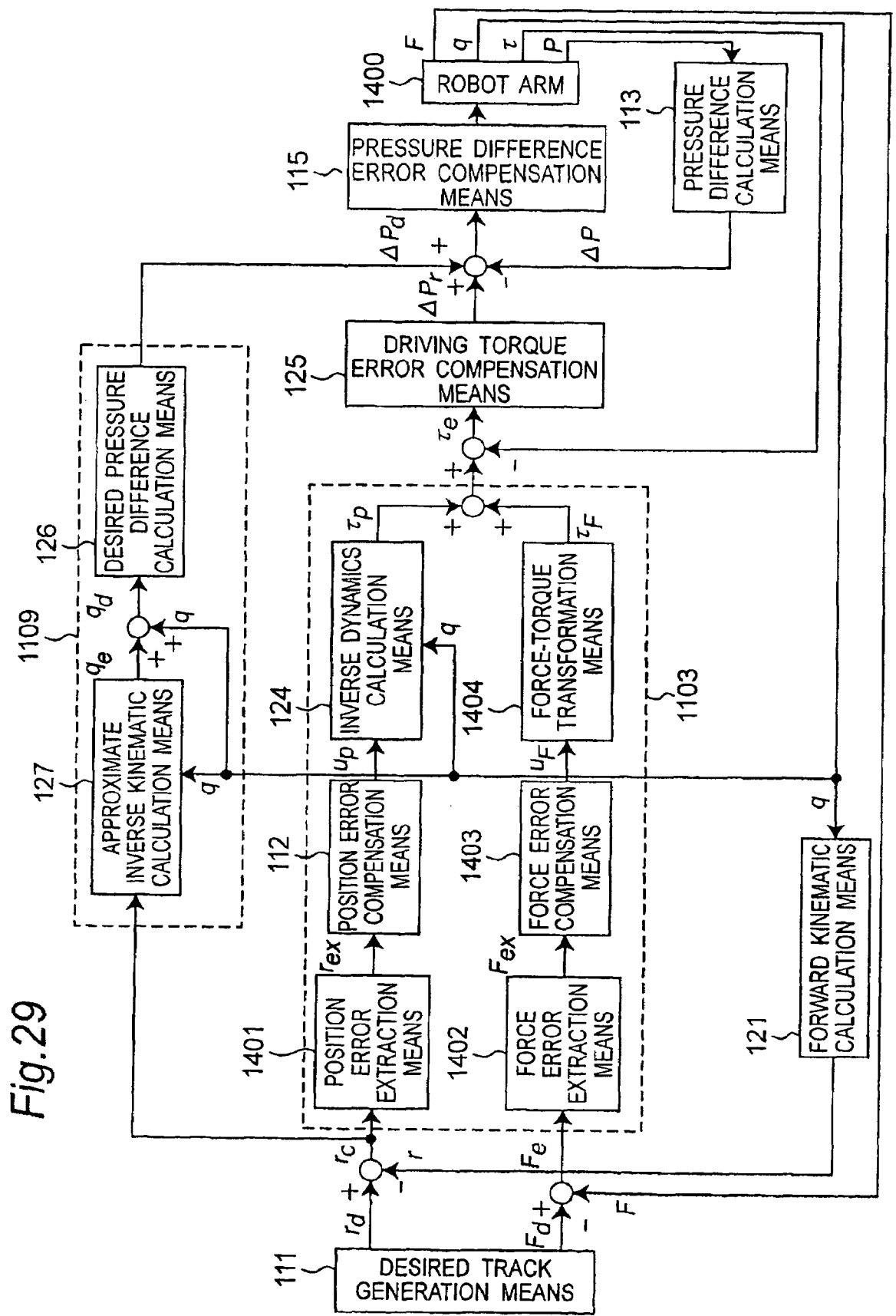
FIG. 29 is a view showing a structure of an elastic actuator drive-type movable mechanism control apparatus according to a seventh embodiment of the present invention.
Figure 30:
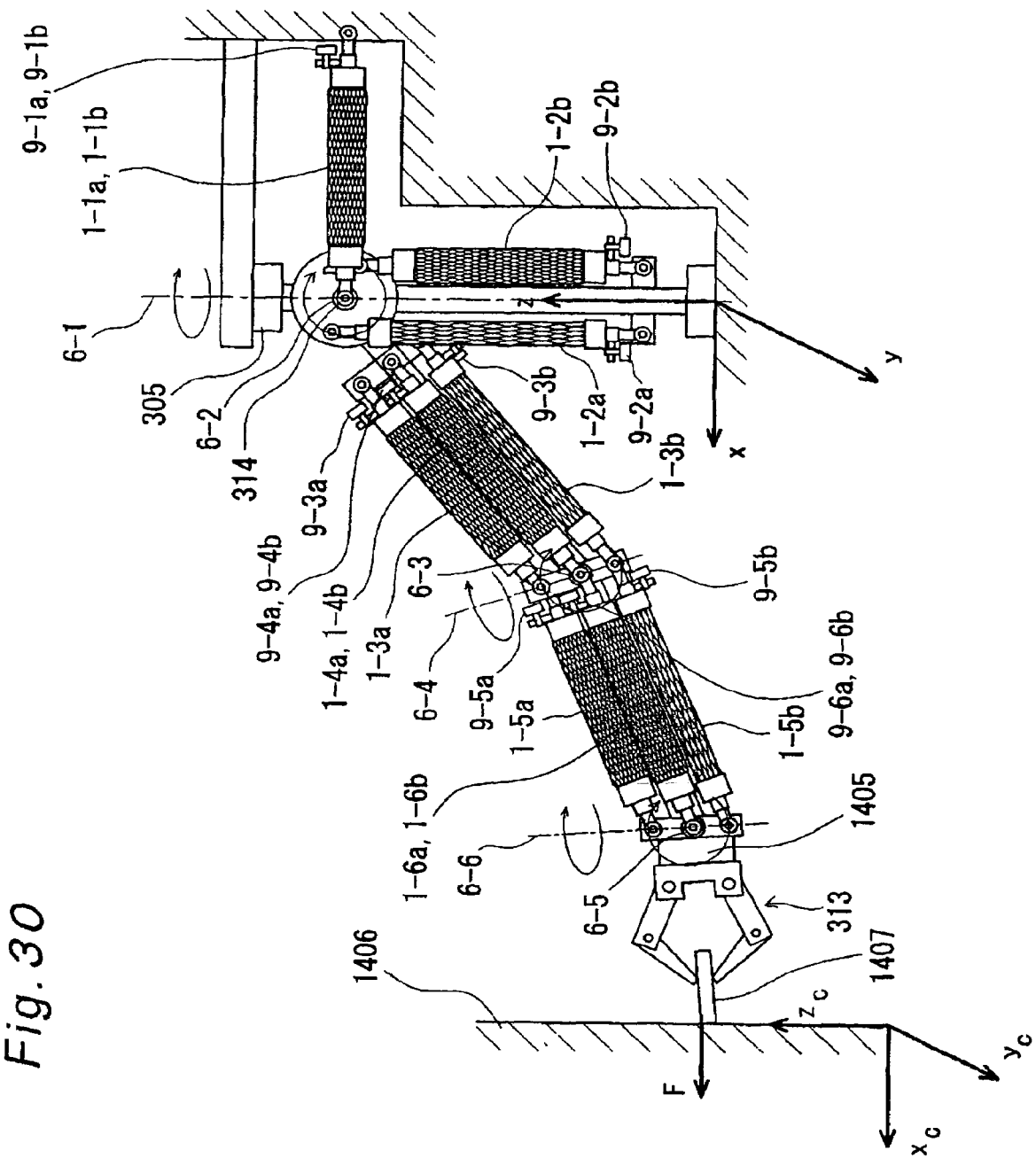
FIG. 30 is a view showing a structure of a robot arm which is the control object of the elastic actuator drive-type movable mechanism control apparatus according to the seventh embodiment of the present invention.

FIG. 29 specifically shows the configuration of the control apparatus in the case where the elastic actuator drive-type movable mechanism control apparatus shown in FIG. 19 is applied to a work. In the work, as shown in FIG. 30, while the force control in which a jig 1407 is grasped by a robot arm 1400 to press the jig 1407 in a direction ($x_c$ direction) perpendicular to a fixed plane 1406 with a force F is performed, the position control is performed in directions ($y_c$ and $z_c$ directions) parallel to the fixed plane 1406. In FIG. 29, the same constituent portions as the control apparatus shown in FIG. 22 which is a specific example of FIG. 19 are designated by the same reference numerals, and the description will be omitted. In FIG. 30, the reference numeral 1405 designates a force sensor arranged in the hand 313, and the force sensor 1405 measures a force vector $F=[F_x, F_y, F_z, M_x, M_y, M_z]^T$ generated by the hand position, i.e., the force in which the jig 1406 is pressed against the fixed plane 1406. Herein, $F_x$, $F_y$, and $F_z$ are translational forces in the x direction, y direction, and z direction, respectively, and $M_x$, $M_y$, and $M_z$ are a force moment about the x axis, a force moment about the y axis, and a force moment about the z axis, respectively. Other configurations are similar to those of the robot arm 10A shown in FIG. 16, so that detailed description will be omitted.

The control apparatus shown in FIG. 29 differs from the control apparatus shown in FIG. 22 in the configuration of the output error compensation means 1103. The control apparatus of FIG. 29 also differs from the control apparatus of FIG. 22 in that, in addition to the joint angle vector q, the force vector F generated by the hand position of the robot arm 1400 is outputted as the output from the robot arm 1400 by the force sensor 1405.

In FIG. 29, the reference numeral 1401 designates a position error extraction means. The position errors $r_e$ are inputted to the position error extraction means 1401, the position error extraction means 1401 extracts only the position error $r_{ex}$ in the directions ($y_c$ and $z_c$ directions) in which the position control is performed, and the position error extraction means 1401 outputs the position error $r_{ex}$ to the position error compensation means 112. In the case where coordinate axes x and $x_c$, y and $y_c$, and z and $z_c$ shown in FIG. 30 are parallel to each other, the position error extraction in the direction in which the position control is performed is determined by the following equation (6).

$$r_{ex} = \begin{pmatrix} 0 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix} = r_e \quad (6)$$

The reference numeral 1402 designates a force error extraction means. A force error $F_e$ which is an error between the force vector F generated by the hand position and a desired force vector $F_d$ generated by the hand position outputted from the desired track generation means 111 is inputted to the force error extraction means 1402, the force error extraction means 1402 extracts only a force error $F_{ex}$ in the direction ($x_c$ direction) in which the force control is performed, and the force error extraction means 1402 outputs the force error $F_{ex}$ to a force error compensation means 1403. In the case where the coordinate axes x and $x_c$, y and $y_c$, and z and $z_c$ shown in FIG. 30 are parallel to each other, the force error extraction in the direction in which the force control is performed is executed by the following equation (7).

$$F_{ex} = \begin{pmatrix} 1 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix} = F_e \quad (7)$$

The force error compensation means 1403 outputs force error correction output $u_F$ to a force-torque transformation means 1404. The force-torque transformation means 1404 calculates a force error correction torque $\tau_F$ for correcting the force error $F_e$ using the following equation (8) to output the force error correction torque $\tau_F$.

$$\tau_F = J_r^T u_F \quad (8)$$

The output error compensation means 1103 outputs the value, in which the position error correction torque $\tau_p$ and the force error correction torque $\tau_F$ are added, in the form of the output error compensation information.

The basic of the control operation is position and force hybrid control for simultaneously realizing the feedback control (position control) of the hand position/orientation error $r_e$, which is performed by the position error compensation means 112, and the feedback control (force control) of the force F generated by the hand position, which is performed by the force error compensation means 1403. For example, while the PID compensator is used as the position error compensation means 112 while a PI compensator is used as the force error compensation means 1403, the control is performed such that the hand position/orientation error $r_e$ is converged to zero, and the control is performed such that the force error $F_e$ generated by the hand position is converged to zero. Therefore, the desired operation of the robot arm 1400 is realized.

Thus, the torque feedback control is enabled with good responsivity and high accuracy by providing the driving torque error compensation means 125 and the pressure difference error compensation means 115, which realizes the force control with good responsivity and high accuracy. Accordingly, the control shown in FIG. 30 in which the jig 1407 is pressed against the wall surface which is the fixed plane 1406 is applied in various works, which allows the practical work such as a window wiping operation and a desk top surface wiping operation to be safely realized.

EIGHTH EMBODIMENT

In an eighth embodiment of the present invention, another specific example of the control apparatus of the elastic actuator drive-type movable mechanism shown in FIG. 15 will be described while the case where a conductive polymer actuator is used as the elastic actuator is taken as an example. The details of the robot arm 10A are similar to those of the fourth embodiment except that the conductive polymer actuator is used as the elastic actuator, so that the detailed description will be omitted.

Figure 32A:
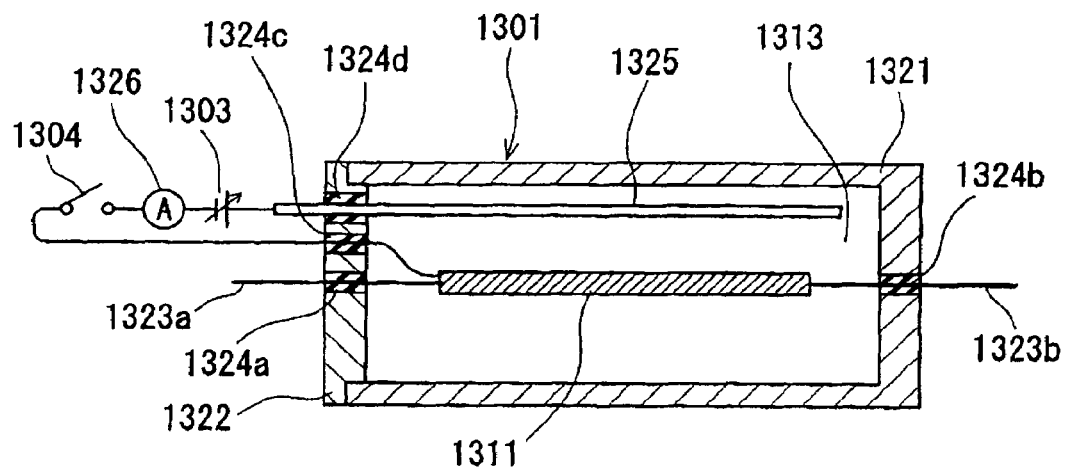
FIG. 32A is a sectional view schematically showing a conductive polymer actuator according to the eighth embodiment of the present invention.
Figure 32B:
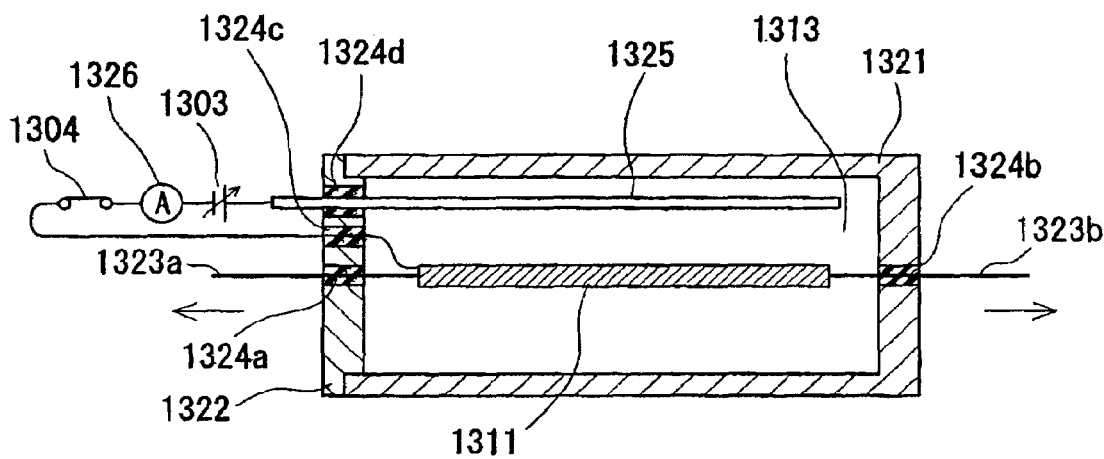
FIG. 32B is a sectional view schematically showing the conductive polymer actuator according to the eighth embodiment of the present invention.
Figure 32C:
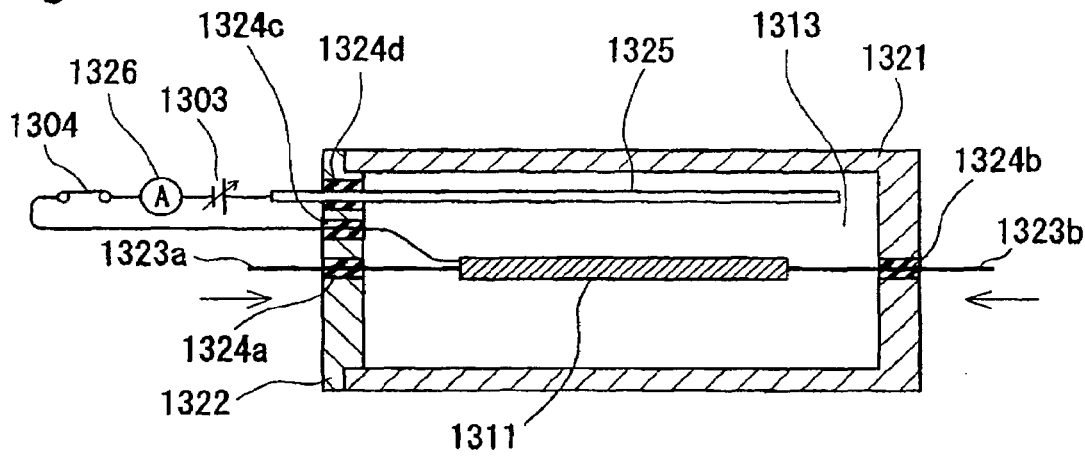
FIG. 32C is a sectional view schematically showing the conductive polymer actuator according to the eighth embodiment of the present invention.
Figure 33:
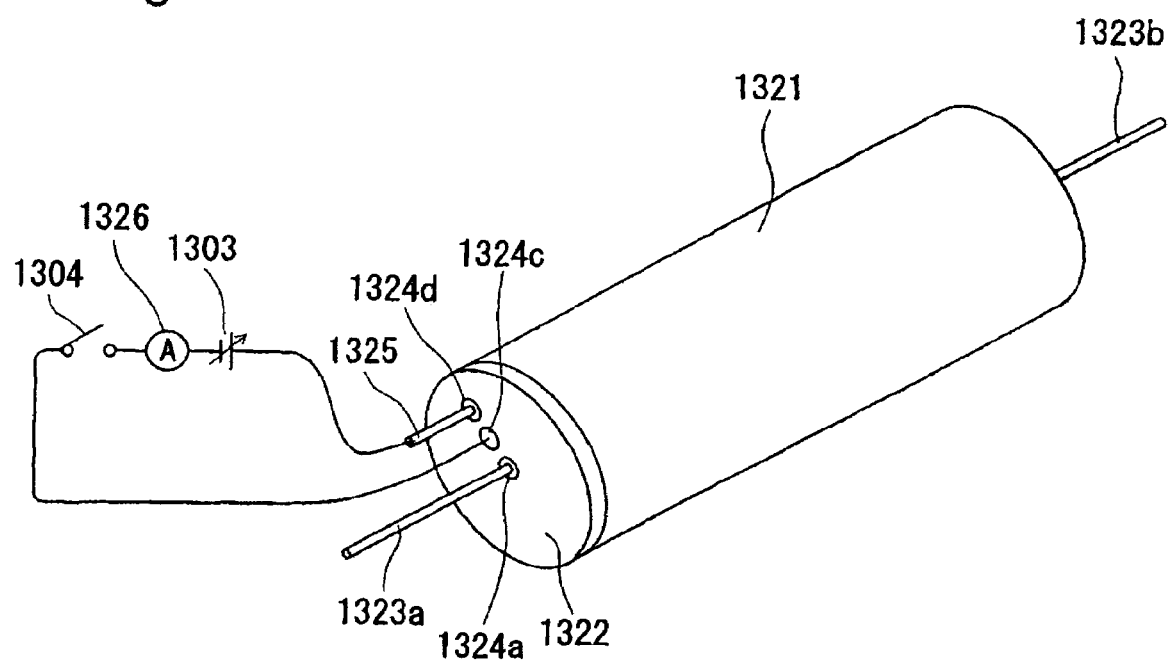
FIG. 33 is an outline view schematically showing the conductive polymer actuator according to the eighth embodiment of the present invention.

FIGS. 32A to 32C are a sectional view schematically showing an artificial muscle actuator 1301 as an example of the conductive polymer actuator according to the eighth embodiment of the present invention. FIG. 33 is an outline view showing the artificial muscle actuator 1301.

In FIGS. 32A to 32C, the reference numeral 1311 designates an expansion/contraction plate which is a rectangular expansion/contraction body made of a conductive polymer. The expansion/contraction plate 1311 is expanded and contracted according to an oxidation-reduction reaction. The expansion/contraction plate 1311 is arranged in the substantial center portion in an electrolytic solution 1313 which is an electrolyte retention layer. A space surrounded by a cylindrical case 1321 and a disc-shaped cover 1322 is filled with the electrolytic solution 1313. Examples of the electrolytic solution include an electrolytic solution in which the electrolyte such as $NaPF_6$ or $TBAPF_6$ is dissolved in water or in an organic solution such as propylene carbonate, and an ionic solution such as $BMIPF_6$. Particularly, the electrolyte which contains $PF_6$ as an anion is desirably used because the large displacement is obtained by combination with polypyrrole which is a conductive polymer.

Polypyrrole, polyaniline, polymethoxyaniline, or the like can be used as the conductive polymer forming the conductive-polymer expansion/contraction plate 1311. Among others, polypyrrole is desirably used from the viewpoint of the large displacement. It is desirable that a thickness of the conductive-polymer expansion/contraction plate 1311 be about several tens micrometers. When the conductive-polymer expansion/contraction plate 1311 is thinner than several tens micrometers, strength thereof is decreased. When it is thicker than several tens micrometers, ions cannot sufficiently enter and exit from the inside there.

Rods 1323a and 1323b are connected to the both ends in the longitudinal direction of the conductive-polymer expansion/contraction plate 1311. The rod 1323a pierces through a sealing member 1324a provided in the cover 1322, and the rod 1323b pierces through a sealing member 1324b provided in the case 1321, and the rods 1323a and 1323b are protruded outside the cover 1322 and the case 1321, respectively.

Wiring connected to the conductive-polymer expansion/contraction plate 1311 is connected to a power supply 1303 through a sealing member 1324c provided in the cover 1322, a switch 1304, and a current measuring device 1326. A counter electrode 1325 is connected to the other electrode of the power supply 1303. The counter electrode 1325 is in contact with the electrolytic solution 1313, with which the space in the case 1321 is filled, through a sealing member 1324*d* provided in the cover 1322.

The power supply 1303 and the switch 1304 are appropriately turned on and off while adjusting the voltage by a control apparatus (not shown) based on information of the current measuring device 1326, and thereby the operation of the artificial muscle actuator 1301 is controlled.

Then, the operation of the artificial muscle actuator 1301 will be described.

The entrance and exit of the anion (negative ion), the entrance and exit of a cation (positive ion), change in polymer structure, and the like causes the contraction of the conductive-polymer expansion/contraction plate 1311. In the description of the operation principle shown in FIGS. 32A, 32B, and 32C, it is said that doping and undoping of the anion in the material system such as polypyrrole is mainly attributed to the deformation mechanism. Therefore, the entrance and exit of the anion will be described below.

FIG. 32A shows a switch-off state in which the voltage is not applied to the conductive-polymer expansion/contraction plate 1311, and FIG. 32B shows a state in which the positive potential is applied to the conductive-polymer expansion/contraction plate 1311. When the voltage is applied to the conductive-polymer expansion/contraction plate 1311, the anions uniformly existing in the electrolytic solution 1313 which is the electrolyte retention layer in applying no voltage are attracted toward the conductive-polymer expansion/contraction plate 1311 on the positive electrode side, and the anions enter the inside of the conductive-polymer expansion/contraction plate 1311. The conductive-polymer expansion/contraction plate 1311 is expanded in association with the oxidation process, which allows the displacement in the expansion direction of the conductive-polymer expansion/contraction plate 1311 to be taken out by the rods 1323*a* and 1323*b*. FIG. 32C shows a state in which the negative voltage is applied to the conductive-polymer expansion/contraction plate 1311. The anions existing in the conductive-polymer expansion/contraction plate 1311 are attracted toward the counter electrode 1325 facing the conductive-polymer expansion/contraction plate 1311, and the anions withdraw into the electrolytic solution 1313 which is the electrolyte retention layer. The conductive-polymer expansion/contraction plate 1311 is contracted in association with the reduction process, which allows the displacement in the contraction direction to be taken out by the rods 1323*a* and 1323*b*.

It is known that the displacement amount or the generating force of the conductive polymer actuator operated by the entrance and exit of the anion is substantially proportional to an amount of injected charge, so that the charge amount is used as the internal state amount when the internal state is measured in the eighth embodiment.

Figure 31:
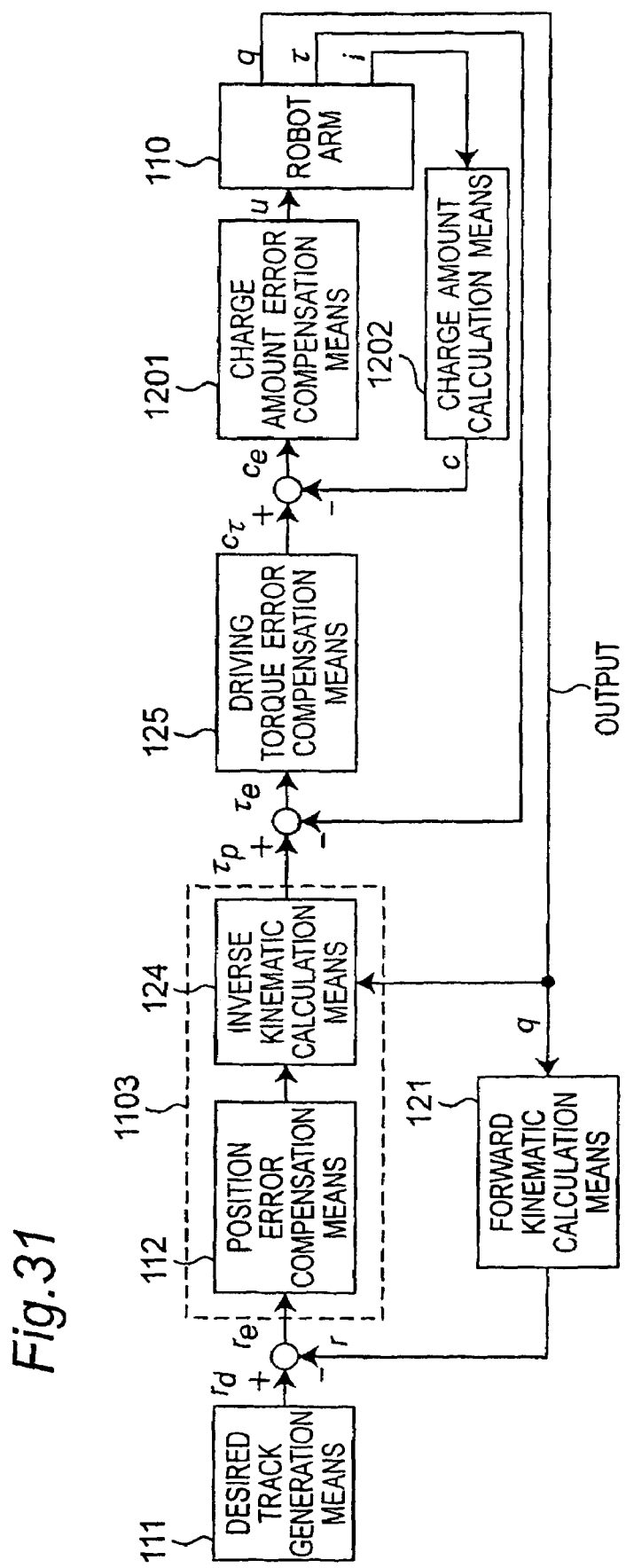
FIG. 31 is a view showing a structure of an elastic actuator drive-type movable mechanism control apparatus according to an eighth embodiment of the present invention.
Figure 34:
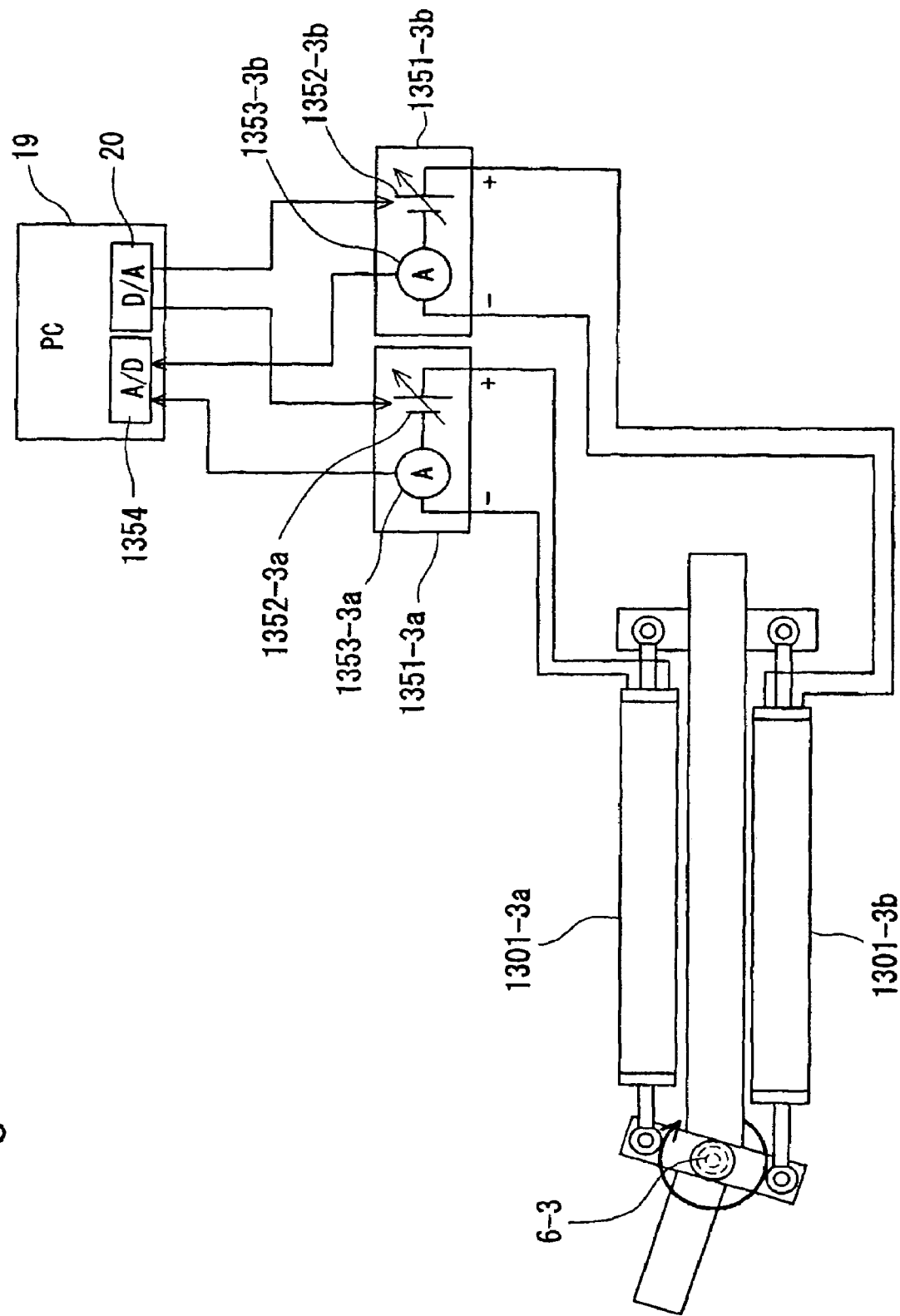
FIG. 34 is a view showing a configuration of a power supply system for driving the robot arm which is the control object of the elastic actuator drive-type movable mechanism control apparatus according to the eighth embodiment of the present invention.

FIG. 34 is a view showing a configuration of a power supply system for driving the robot arm 10A which is the control object of the apparatus for controlling the elastic actuator drive-type movable mechanism 1102 according to the eighth embodiment of the present invention. FIG. 34 shows only the portion where normal and reverse rotations at the third joint axis 6-3 of the robot arm 10A are performed, and other portions are omitted. In FIG. 34, the reference numerals 1351-3*a* and 1351-3*b* designate driving power supplies, and the driving power supplies 1351-3*a* and 1351-3*b* include voltage variable power supplies 1352-3*a* and 1352-3*b* and ammeters 1353-3*a* and 1353-3*b*, respectively. The driving power supplies 1351-3*a* and 1351-3*b* are connected to conductive polymer actuator 1301-3*a* and 1301-3*b* (examples of elastic expansion/contraction structural member 1-3*a* and elastic expansion/contraction structural member 1-3*b*) to apply the voltage. The reference numeral 19 designates the control computer which is an example of the control unit formed by, e.g., the general-purpose personal computer, and the D/A board 20 is mounted on the control computer 19. The voltage value applied to each of the conductive polymer actuators 1301-3*a* and 1301-3*b* can independently be controlled by outputting the voltage instruction value to the voltage variable power supplies 1351-3*a* and 1351-3*b*, which drives the conductive polymer actuators 1301-3*a* and 1301-3*b*. An A/D board 1354 is mounted on the control computer 19, so that current values measured by the ammeters 1353-3*a* and 1353-3*b* can be captured in the control computer 19, FIG. 31 is a view showing the configuration of the apparatus for controlling the elastic actuator drive-type movable mechanism 1102 according to the eighth embodiment of the present invention. In FIG. 31, the reference numeral 1201 designates a charge amount error compensation means which is an example of the internal state error compensation means 1106. A value (charge amount error $c_e$) in which a current charge amount c is subtracted from a torque error correction charge amount $c_\tau$ is inputted to the charge amount error compensation means 1201. The torque error correction charge amount $c_\tau$ is outputted from the driving torque error compensation means 125 which is an example of the driving torque error compensation means 1105, and the current charge amount c is obtained by integrating a current i measured by the driving power supply (the driving power supply 1351-3*a* in the case of the conductive polymer actuator 1301-3*a*, and the driving power supply 1351-3*b* in the case of the conductive polymer actuator 1301-3*b*) with a charge amount calculation means 1202. The charge amount error compensation means 1201 outputs the charge amount error correction output u to the robot arm 10A so as to compensate the error of the charge amount injected into the conductive polymer actuator 1301-3*a* or the conductive polymer actuator 1301-3*b*. The charge amount error correction output u is applied in the form of the voltage instruction value to each power supply through the D/A board 20 to perform normal and reverse rotations at the third joint axis 6-3, which operates the robot arm 10A. In other joint axes 6-1 to 6-2 and 6-4 to 6-6, the control apparatus performs the similar control to each joint axis, and thereby at each joint axis, normal and reverse rotations are performed to operate the robot arm 10A.

Thus, with the control apparatus according to the eighth embodiment, the driving torque error compensation means 125 is arranged to form the torque feedback control system which performs the feedback of the driving torque generated by the elastic actuator drive-type movable mechanism 1102, and the charge amount error compensation means 1201 is arranged between the elastic actuator drive-type movable mechanism 1102 and the driving torque error compensation means 125 to form the control system which performs the feedback of the internal state of the elastic actuator drive-type movable mechanism 1102. Therefore, the robot arm 10A can be controlled with good responsivity, small dynamic influence, and high accuracy.

In the fifth and sixth embodiments, the relationship between the joint angle and the pressure difference is approximated by the linear equation in the desired pressure difference calculation means 126. However, the approximation is not limited to the linear equation, but the approximation can obviously be performed with multi-dimensional polynomials such as the quadratic equation. Thus, in the case where the relationship between the output of the elastic actuator 1 and the internal state of the elastic actuator 1 is approximated with the polynomial, the desired internal state determination means 1105 calculates and determines the desired value of the internal state of the elastic actuator 1 from the desired value of the output of the elastic actuator 1 using the polynomial. Instead of the approximation with the polynomial, the desired internal state determination means 1105 stores the relationship between the output of the elastic actuator 1 and the internal state of the elastic actuator 1 (for example, relationship between joint angle and pressure difference) in the form of a table in the memory 19a (see FIG. 4) of the control computer 19 of the control apparatus, and the desired value of the internal state of the elastic actuator 1 (for example, desired value of pressure difference) can be adapted to be derived from the desired value of the output of the elastic actuator 1 (for example, desired value of joint angle) based on the table.

In the sixth embodiment, the desired internal state determination means 1109 is served as the desired pressure difference calculation means 126, the present invention is not limited to the desired internal state determination means 1109. For example, the same effect can also be obtained, similarly to the configuration of FIG. 22, in the configuration including the approximate inverse kinematic calculation means 127 and the desired pressure difference calculation means 126.

In the above embodiment, the output is set at the joint angle. However, the output is not limited to the joint angle. For example, the same effect can also be obtained, in the case where the displacement speed sensor which is an example of the displacement speed measurement means is used as the output measurement means 1104 and the displacement speed control is performed by setting the output value of the elastic actuator at the displacement speed thereof.

In the above embodiments, the output is set at the joint angle. However, the output is not limited to the joint angle. For example, the same effect can also be obtained, in the case where the force sensor which is an example of the force measurement means is used as the output measurement means 1104 and the force control is performed by setting the output value of the elastic actuator at the force exerted in the elastic actuator.

In the above embodiments, the sensor is provided as an example of the internal state measurement means 1108. However, the same effect can also be obtained, in the case where the observer (observation device) is provided to estimate the internal state and the estimated value of the internal state is used.

In the above embodiments, the torque sensor 7 is provided as an example of the driving force measurement means 1107. For example, the same effect can also be obtained, in the case where the observer (observation device) is provided to estimate the driving force and the estimated value of the driving force is used.

In the elastic actuator of the eighth embodiment, the conductive polymer actuator is described as an example of the actuator driven by the electrical stimulation. However, the elastic actuator is not limited to the conductive polymer actuator. For example, the same effect can also be obtained by adopting the potential or the charge amount as the internal state, in the case where the elastic body such as the dielectric polymer, or various kinds of gels is driven by the electrical stimulation.

The apparatus and method for controlling the elastic actuator of the present invention are useful in the control apparatus and control method for performing the position control of the track control of the hand position of the robot arm operated by the elastic actuator and the like. In addition to the robot arm, the apparatus and method for controlling the elastic actuator of the present invention can be applied to the control apparatus and control method for the rotation mechanism performed by the elastic actuator in production facilities and the like or to the control apparatus and control method for the direct drive mechanism such as a linear slider or a press machine which is performed by the elastic actuator.

The apparatus and method for controlling the elastic actuator drive-type movable mechanism of the present invention are useful in the control apparatus and control method for performing the position control of the track control of the hand position of the robot arm operated by the elastic actuator and the like. In addition to the robot arm, the apparatus and method for controlling the elastic actuator drive-type movable mechanism of the present invention can be applied to the control apparatus and control method for the rotation mechanism performed by the elastic actuator in production facilities and the like or to the control apparatus and control method for the direct drive mechanism such as the linear slider or the press machine which is performed by the elastic actuator.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for controlling an elastic actuator drive-type movable mechanism of an elastic actuator, comprising:
   an internal state measurement means for measuring an internal state of said elastic actuator to output a measurement value of said internal state, the internal state being changed by drive of said elastic actuator;
   driving force measurement means for measuring driving force to output a measurement value of said driving force, the driving force being generated by said elastic actuator;
   an output measurement means for measuring output of said movable mechanism to output a measurement value of the output, the movable mechanism being driven by said elastic actuator;
   an output error compensation means to which a desired value of said output of said movable mechanism driven by said elastic actuator and the measurement value of said output measured by said output measurement means are inputted, the output error compensation means outputting output error compensation information so as to compensate an output error;
   a driving force error compensation means to which an output of said output error compensation information from said output error compensation means and an output of the measurement value of said driving force from said driving force measurement means are inputted, the driving force error compensation means outputting driving force error compensation information so as to compensate a driving force error; and an internal state error compensation means to which an output of said driving force error compensation information from said driving force error compensation means and an output of the measurement value of said internal state from said internal state measurement means are inputted, the internal state error compensation means outputting internal state error compensation information so as to compensate an internal state error, wherein the apparatus performs control such that the measurement value of said output of said movable mechanism driven by said elastic actuator becomes the desired value of said output based on said internal state error compensation information outputted by said internal state error compensation means.

2. An apparatus for controlling an elastic actuator drive-type movable mechanism of an elastic actuator, comprising:

an internal state measurement means for measuring an internal state of said elastic actuator to output a measurement value of said internal state, the internal state being changed by drive of said elastic actuator;

a driving force measurement means for measuring driving force to output a measurement value of said driving force, the driving force being generated by said elastic actuator;

an output measurement means for measuring output of said movable mechanism to output a measurement value of said output, the movable mechanism being driven by said elastic actuator;

an output error compensation means to which a desired value of the output of said movable mechanism driven by said elastic actuator and the measurement value of said output measured by said output measurement means are inputted, the output error compensation means outputting output error compensation information so as to compensate an output error;

a driving force error compensation means to which an output of said output error compensation information from said output error compensation means and an output of the measurement value of said driving force from said driving force measurement means are inputted, the driving force error compensation means outputting driving force error compensation information so as to compensate a driving force error;

a desired internal state determination means for determining a desired value of said internal state of said elastic actuator to output the desired value of said internal state; and an internal state error compensation means to which an output of said driving force error compensation information from said driving force error compensation means, an output of the desired value of said internal state from said desired internal state determination means, and an output of the measurement value of said internal state from said internal state measurement means are inputted, the internal state error compensation means outputting internal state error compensation information so as to compensate an internal state error, wherein the apparatus performs control such that the measurement value of said output of said movable mechanism driven by said elastic actuator becomes the desired value of said output based on said internal state error compensation information outputted by said internal state error compensation means.

3. An apparatus for controlling an elastic actuator drive-type movable mechanism of an elastic actuator, comprising:

an internal state measurement means for measuring an internal state of said elastic actuator to output a measurement value of said internal state, the internal state being changed by drive of said elastic actuator;

a driving force measurement means for measuring driving force to output a measurement value of said driving force, the driving force being generated by said elastic actuator;

an output measurement means for measuring output of said movable mechanism to output a measurement value of said output, the movable mechanism being driven by said elastic actuator;

an output error compensation means to which a desired value of the output of said movable mechanism driven by said elastic actuator and the measurement value of said output measured by said output measurement means are inputted, the output error compensation means outputting output error compensation information so as to compensate an output error;

a driving force error compensation means to which an output of said output error compensation information from said output error compensation means and an output of the measurement value of said driving force from said driving force measurement means are inputted, the driving force error compensation means outputting driving force error compensation information so as to compensate a driving force error;

a desired internal state determination means for determining a desired value of said internal state of said elastic actuator to output the desired value of said internal state; and an internal state error compensation means to which an output of the desired value of said internal state from said desired internal state determination means and an output of the measurement value of said internal state from said internal state measurement means are inputted, the internal state error compensation means outputting internal state error compensation information so as to compensate an internal state error, wherein the apparatus performs control such that the measurement value of said output of said movable mechanism driven by said elastic actuator becomes the desired value of said output based on said internal state error compensation information outputted by said internal state error compensation means and said driving force error compensation information compensated by said driving force error compensation means.

4. The apparatus for controlling an elastic actuator drive-type movable mechanism according to claim 2, wherein the desired value of said output is inputted to said desired internal state determination means, and said desired internal state determination means determines the desired value of said internal state.

5. A method for controlling an elastic actuator drive-type movable mechanism of an elastic actuator, comprising:

measuring an internal state of said elastic actuator to obtain a measurement value of said internal state, the internal state being changed by drive of said elastic actuator;

measuring driving force to obtain a measurement value of said driving force, the driving force being generated by said elastic actuator;

measuring output of said movable mechanism to obtain a measurement value of said output, the movable mechanism being driven by said elastic actuator;

obtaining output error compensation information so as to compensate an output error from a desired value of said output of said elastic actuator and the measurement value of said output of said elastic actuator;

obtaining driving force error compensation information so as to compensate a driving force error from an output of said output error compensation information and an output of the measurement value of said driving force;

obtaining internal state error compensation information so as to compensate an internal state error from the output of said driving force error compensation information and the output of the measurement value of said internal state; and thereby performing control such that the measurement value of said output of said movable mechanism driven by said elastic actuator becomes the desired value of said output based on the internal state error compensation information.

6. A method for controlling an elastic actuator drive-type movable mechanism of an elastic actuator, comprising:

measuring an internal state of said elastic actuator to obtain a measurement value of said internal state, the internal state being changed by drive of said elastic actuator;

measuring driving force to obtain a measurement value of said driving force, the driving force being generated by said elastic actuator;

measuring output of said movable mechanism to obtain a measurement value of said output, the movable mechanism being driven by said elastic actuator;

obtaining output error compensation information so as to compensate an output error from a desired value of the output of said movable mechanism driven by said elastic actuator and the measurement value of said measured output;

obtaining driving force error compensation information so as to compensate a driving force error from an output of said output error compensation information and an output of the measurement value of said driving force;

determining a desired value of said internal state of said elastic actuator to obtain the desired value of said internal state;

obtaining internal state error compensation information so as to compensate an internal state error from an output of said driving force error compensation information, an output of the desired value of said internal state, and an output of the measurement value of said internal state; and thereby performing control such that the measurement value of said output of said movable mechanism driven by the elastic actuator becomes the desired value of said output based on said internal state error compensation information.

7. A method for controlling an elastic actuator drive-type movable mechanism of an elastic actuator, comprising:

measuring an internal state of said elastic actuator to obtain a measurement value of said internal state, the internal state being changed by drive of said elastic actuator;

measuring driving force to obtain a measurement value of said driving force, the driving force being generated by said elastic actuator;

measuring output of said movable mechanism to obtain a measurement value of said output, the movable mechanism being driven by said elastic actuator;

obtaining output error compensation information so as to compensate an output error from a desired value of the output of said movable mechanism driven by said elastic actuator and the measurement value of said output;

obtaining driving force error compensation information so as to compensate a driving force error from an output of said output error compensation information and an output of the measurement value of said driving force;

determining a desired value of said internal state of said elastic actuator to obtain the desired value of said internal state;

obtaining internal state error compensation information so as to compensate an internal state error from an output of the desired value of said internal state and an output of the measurement value of said internal state; and thereby performing control such that the measurement value of said output of said movable mechanism driven by said elastic actuator becomes the desired value of said output based on said internal state error compensation information and said driving force error compensation information.

* * * * *